US012629301B2

(12) United States Patent
Tessmer et al.

(10) Patent No.: US 12,629,301 B2
(45) Date of Patent: May 19, 2026

(54) PATIENT TRANSPORT SYSTEM INCLUDING A PATIENT TRANSPORT APPARATUS AND LOADING SYSTEM FOR THE SAME

(71) Applicant: Stryker Corporation, Portage, MI (US)

(72) Inventors: Brian J. Tessmer, Mattawan, MI (US); Sashank Manohar, Portage, MI (US); Rex Allen Powers, Jr., Kalamazoo, MI (US); Neil Feliksa, Kalamazoo, MI (US)

(73) Assignee: Stryker Corporation, Portage, MI (US)

(*) Notice: Subject to any disclaimer, the term of this patent is extended or adjusted under 35 U.S.C. 154(b) by 18 days.

(21) Appl. No.: 18/937,426

(22) Filed: Nov. 5, 2024

(65) Prior Publication Data

US 2025/0152437 A1 May 15, 2025

Related U.S. Application Data

(60) Provisional application No. 63/547,872, filed on Nov. 9, 2023.

(51) Int. Cl.
*A61G 5/06* (2006.01)
*A61G 3/02* (2006.01)

(52) U.S. Cl.
CPC ........... *A61G 5/061* (2013.01); *A61G 3/0218* (2013.01); *A61G 5/066* (2013.01)

(58) Field of Classification Search
CPC . A61G 5/00; A61G 5/06; A61G 5/061; A61G 3/0218; A61G 5/066; A61G 3/062; A61G 5/0833
See application file for complete search history.

(56) References Cited

U.S. PATENT DOCUMENTS

| | | | | |
|---|---|---|---|---|
| 5,672,041 | A | 9/1997 | Ringdahl et al. | |
| 6,648,343 | B2 * | 11/2003 | Way | A61G 5/061 280/5.22 |

(Continued)

FOREIGN PATENT DOCUMENTS

| | | |
|---|---|---|
| CN | 110338987 A | 10/2019 |

OTHER PUBLICATIONS

English language abstract and machine-assisted English translation for CN 110338987 A extracted from espacenet. com database on Mar. 28, 2025, 20 pages.

*Primary Examiner* — Fredrick C Conley
(74) *Attorney, Agent, or Firm* — Howard & Howard Attorneys PLLC

(57) ABSTRACT

A patient transport system includes a patient transport apparatus operable by a user for transporting a patient along stairs and a loading system for loading and unloading the patient transport apparatus from a vehicle cargo area. The loading system includes a brace configured to be mounted to the cargo area of the vehicle, a first arm supported for rotation between a stowed state and a deployed state, a second arm coupled to the first arm, and a receptacle coupled to the second arm. The receptacle is configured to receive and support the patient transport apparatus for movement relative to the cargo area of the vehicle as the first arm moves between the stowed state and the deployed state. The loading system further includes a ratchet assembly interposed between the brace and the first arm to selectively permit motion of the first arm between the stowed state and the deployed state.

20 Claims, 41 Drawing Sheets

(56) References Cited

U.S. PATENT DOCUMENTS

| | | | | |
|---|---|---|---|---|
| 11,304,865 | B2 * | 4/2022 | Furman | A61G 7/08 |
| 12,239,581 | B2 * | 3/2025 | Moseley | A61G 1/04 |
| 2003/0132585 | A1 * | 7/2003 | Way | A61G 5/0883 280/5.22 |
| 2006/0185079 | A1 * | 8/2006 | Walkingshaw | A61G 1/017 5/86.1 |
| 2009/0129906 | A1 | 5/2009 | Fisher et al. | |
| 2021/0196536 | A1 | 7/2021 | Tessmer et al. | |
| 2021/0196539 | A1 | 7/2021 | Wallace et al. | |

* cited by examiner

PATIENT TRANSPORT SYSTEM INCLUDING A PATIENT TRANSPORT APPARATUS AND LOADING SYSTEM FOR THE SAME

CROSS-REFERENCE TO RELATED APPLICATION

The subject patent application claims priority to and all the benefits of U.S. Provisional Patent Application No. 63/547,872 filed on Nov. 9, 2023, the disclosure of which is hereby incorporated by reference in its entirety.

BACKGROUND

In various environments, persons with limited mobility may have difficulty traversing stairs without assistance. In certain emergency situations, traversing stairs may be the only viable option for exiting a building. Here, in order for a caregiver to transport a patient along stairs in a safe and controlled manner, a stair chair or evacuation chair may be utilized to facilitate safe stair traversal. Stair chairs are adapted to transport seated patients either up or down flights of stairs, with two caregivers typically supporting, stabilizing, or otherwise carrying the stair chair with the patient supported thereon. Stair chairs can be bulky/heavy and difficult to load and unload from the cargo are of a vehicle, such as an ambulance. Thus, patient transport system and/or a loading system designed to overcome one or more of the aforementioned challenges is desired.

SUMMARY

One general aspect of the present disclosure is directed to a loading system for loading and unloading a patient transport apparatus from a cargo area of a vehicle. The loading system includes a brace defining a mounting axis. The brace is configured to be mounted to the cargo area of the vehicle. The loading system also includes a first arm supported for rotation relative to the mounting axis between a stowed state and a deployed state. The loading system further includes a second arm coupled to the first arm for pivotal movement relative to the first arm, and a receptacle coupled to the second arm. The receptacle is configured to receive and support the patient transport apparatus for movement relative to the cargo area of the vehicle as the first arm moves between the stowed state and the deployed state. The loading system also further includes a ratchet assembly interposed between the brace and the first arm to selectively permit motion of the first arm between the stowed state and the deployed state. The ratchet assembly includes a pawl supported for pivotal movement about a pawl axis between a locked state and an unlocked state. The pawl includes a pawl body, a first pawl tooth extending from the pawl body in a first direction, and a second pawl tooth spaced from the first pawl tooth and extending from the pawl body in a second direction, opposite the first direction. The ratchet assembly also includes a first plurality of teeth arranged for engagement with the first pawl tooth where the pawl is in the locked state and the first arm is in the stowed state to retain the first arm in the stowed state, and a second plurality of teeth spaced from the first plurality of teeth and arranged for engagement with the second pawl tooth where the pawl is in the locked state and the first arm is in the deployed state to retain the first arm in the deployed state.

Another general aspect of the present disclosure includes a patient transport system. The patient transport system includes a patient transport apparatus operable by a user for transporting a patient along stairs and a loading system for loading and unloading the patient transport apparatus from a cargo area of a vehicle. The patient transport apparatus includes a support structure; a seat section coupled to the support structure for supporting the patient, and a track assembly having a movable belt. The track assembly is operatively attached to the support structure and arranged for selective operation between a retracted position disposed adjacent to the support structure and a deployed position extending to engage stairs. In some versions, the patient transport apparatus is operable between: a stair configuration where the track assembly is in the deployed position for supporting the patient transport apparatus for movement along stairs and the seat section is arranged to support the patient, a chair configuration where the track assembly is in the retracted position and the seat section is arranged to support the patient, and a stowed configuration where the track assembly is in the retracted position and the seat section is folded upwards for storage. The loading system includes a brace defining a mounting axis. The brace is configured to be mounted to the cargo area of the vehicle. The loading system also includes a first arm supported for rotation relative to the mounting axis between a stowed state and a deployed state, a second arm coupled to the first arm for pivotal movement relative to the first arm, and a receptacle coupled to the second arm. The receptacle is configured to receive and support the patient transport apparatus for movement relative to the cargo area of the vehicle as the first arm moves between the stowed state and the deployed state. The loading system further includes a ratchet assembly interposed between the brace and the first arm to selectively permit motion of the first arm between the stowed state and the deployed state.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION

Figure 1:
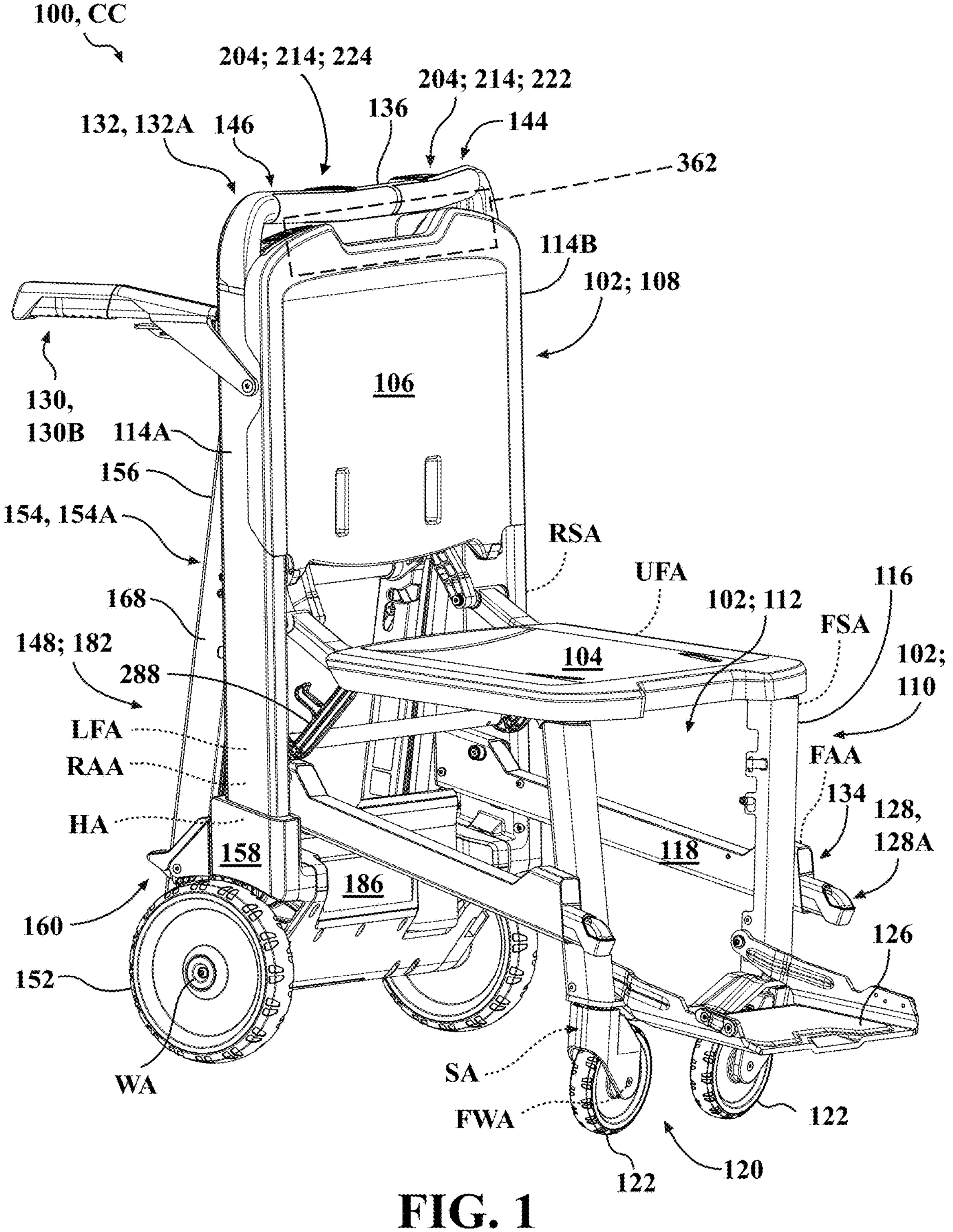
FIG. 1 is a front perspective view of a patient transport apparatus according to the present disclosure, shown arranged in a chair configuration for supporting a patient for transport along a floor surface, and shown having a track assembly disposed in a retracted position, and a handle assembly disposed in a collapsed position.

Referring now to the drawings, wherein like numerals indicate like parts throughout the several views, one aspect of the present disclosure is generally directed toward a patient transport apparatus 100 configured to allow one or more caregivers to transport a patient. To this end, the patient transport apparatus 100 is realized as a "stair chair" which can be operated in a chair configuration CC (see FIG. 1) to transport the patient across ground or floor surfaces FS (e.g., pavement, hallways, and the like), as well as in a stair configuration SC (see FIG. 2) to transport the patient along stairs ST. As will be appreciated from the subsequent description below, the patient transport apparatus 100 of the present disclosure is also configured to be operable in a stowed configuration WC (see FIG. 5) when not being utilized to transport patients (e.g., for storage in an ambulance).

As is best shown in FIG. 1, the patient transport apparatus 100 comprises a support structure 102 to which a seat section 104 and a back section 106 are operatively attached. The seat section 104 and the back section 106 are each shaped and arranged to provide support to the patient during transport. The support structure 102 generally includes a rear support assembly 108, a front support assembly 110, and an intermediate support assembly 112. The back section 106 is coupled to the rear support assembly 108 for concurrent movement. To this end, the rear support assembly 108 comprises a first rear upright 114A arranged on a first side of the rear support assembly 108. The rear support assembly 108 may further comprise a second read upright 114B on a second side of the rear support assembly 108, opposite the first side. The rear uprights 114A, 114B may extend generally vertically and are secured to the back section 106 such as with fasteners (not shown in detail).

The intermediate support assembly 112 and the seat section 104 are each pivotably coupled to the rear support assembly 108. More specifically, the seat section 104 is arranged so as to pivot about a rear seat axis RSA which extends through the rear uprights 114A, 114B (compare FIGS. 5-6A; pivoting about rear seat axis RSA not shown in detail), and the intermediate arms 118 of the intermediate support assembly 112 are arranged so as to pivot about a rear arm axis RAA which is spaced from the rear seat axis RSA and also extends through the rear uprights 114A, 114B (compare FIGS. 5-6A; pivoting about rear arm axis RAA not shown in detail). Furthermore, the intermediate support assembly 112 and the seat section 104 are also each pivotably coupled to the front support assembly 110. Here, the seat section 104 pivots about a front seat axis FSA which extends through the front struts 116 (compare FIGS. 5-6A; pivoting about front seat axis FSA not shown in detail), and the intermediate arms 118 pivot about a front arm axis FAA which is spaced from the front seat axis FSA and extends through the front struts 116 (compare FIGS. 5-6A; pivoting about front arm axis FAA not shown in detail). The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration WC (see FIG. 5) and the chair configuration CC (see FIG. 6A). While the seat section 104 is generally configured to remain stationary relative to the support structure 102 when operating in the chair configuration CC or in the stair configuration CC according to the illustrated versions, it is contemplated that the seat section 104 could comprise multiple components which cooperate to facilitate "sliding" movement relative to the seat section 104 under certain operating conditions, such as to position the patient's center of gravity advantageously for transport. Other configurations are contemplated.

Figure 2:
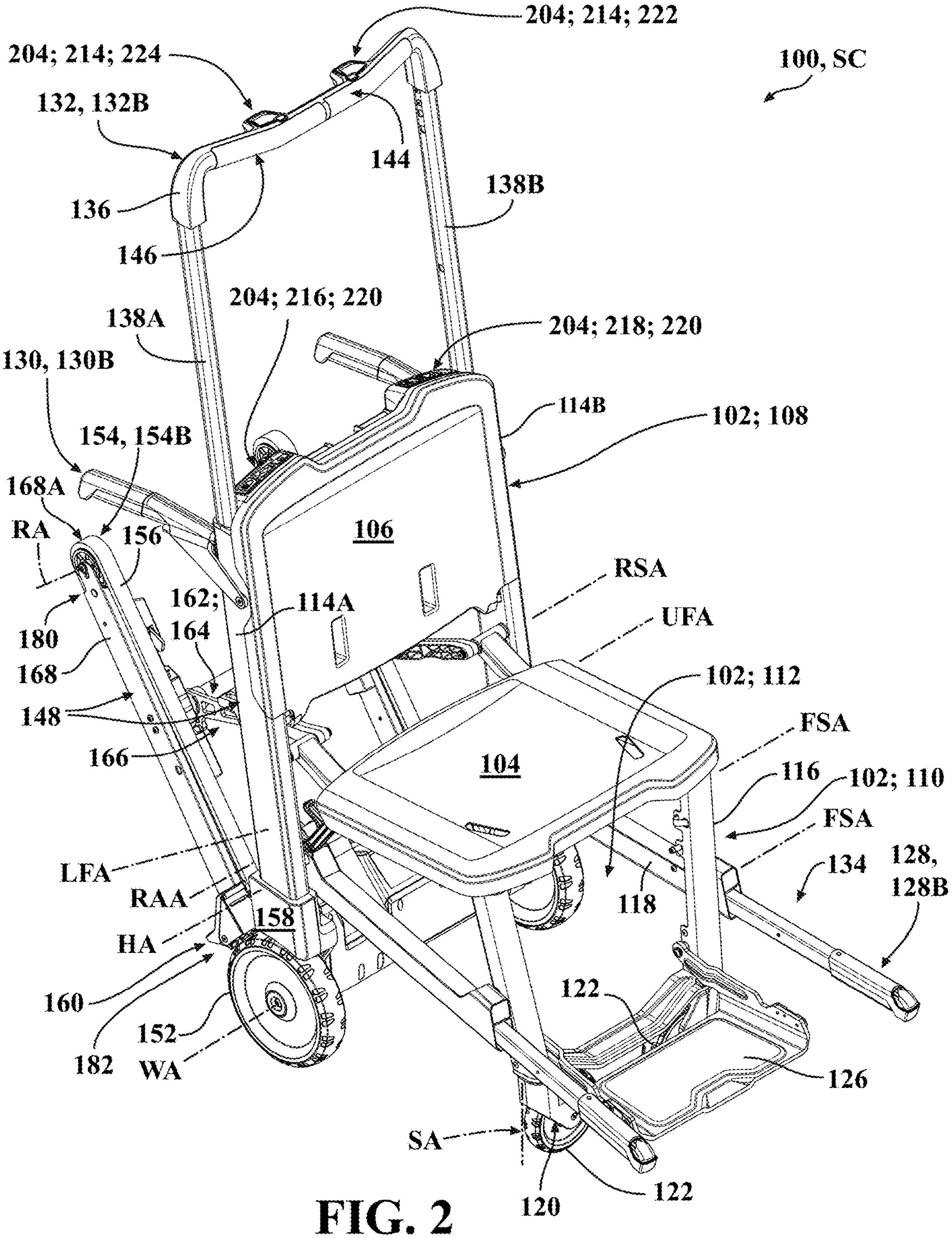
FIG. 2 is another front perspective view of the patient transport apparatus of FIG. 1, shown arranged in a stair configuration for supporting the patient for transport along stairs, and shown with the track assembly disposed in a deployed position, and with the handle assembly disposed in an extended position.
Figure 3:
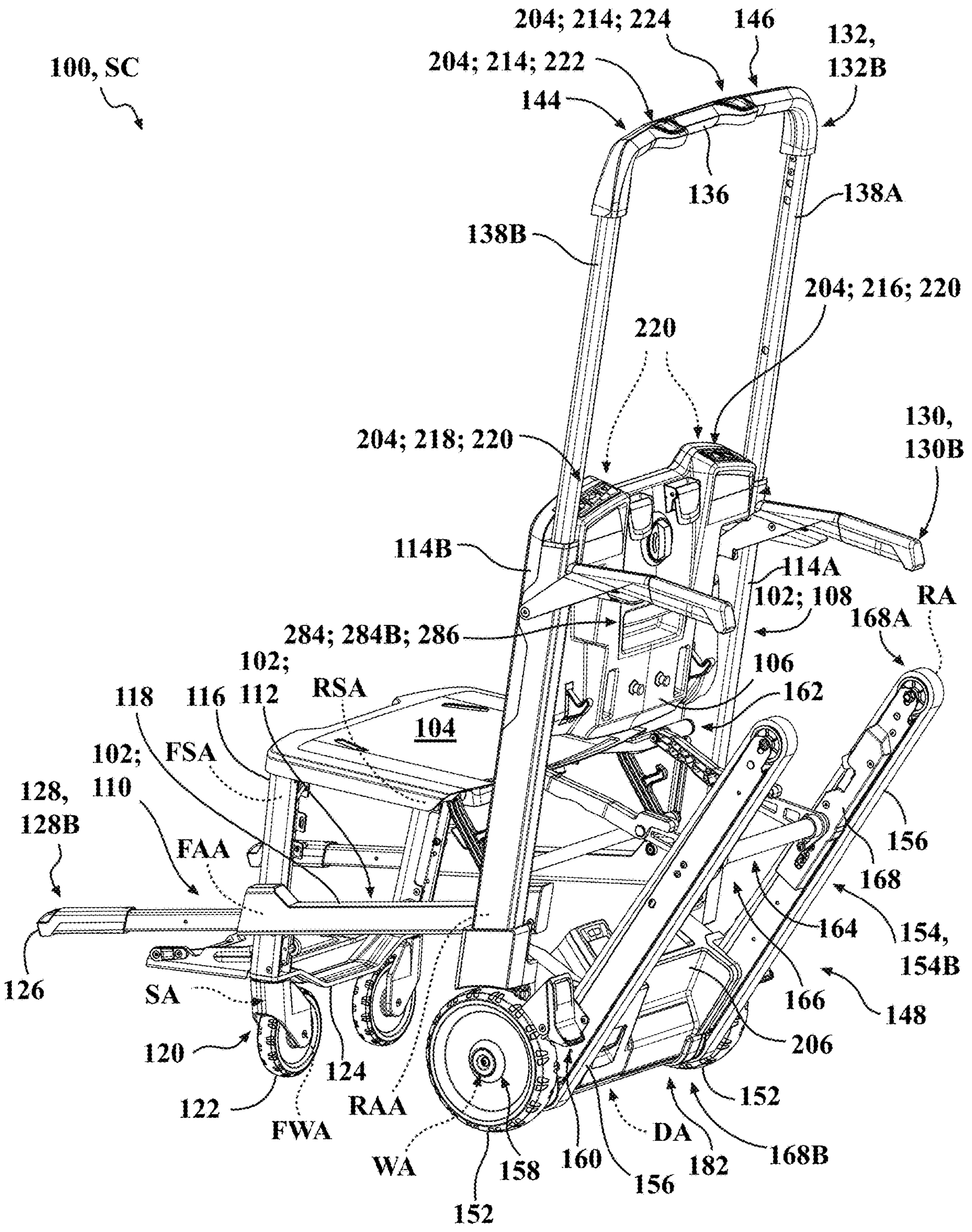
FIG. 3 is a rear perspective view of the patient transport apparatus of FIGS. 1-2, shown arranged in the stair configuration as depicted in FIG. 2, and shown having an extension lock mechanism, a folding lock mechanism, and a deployment lock mechanism.
Figure 5:
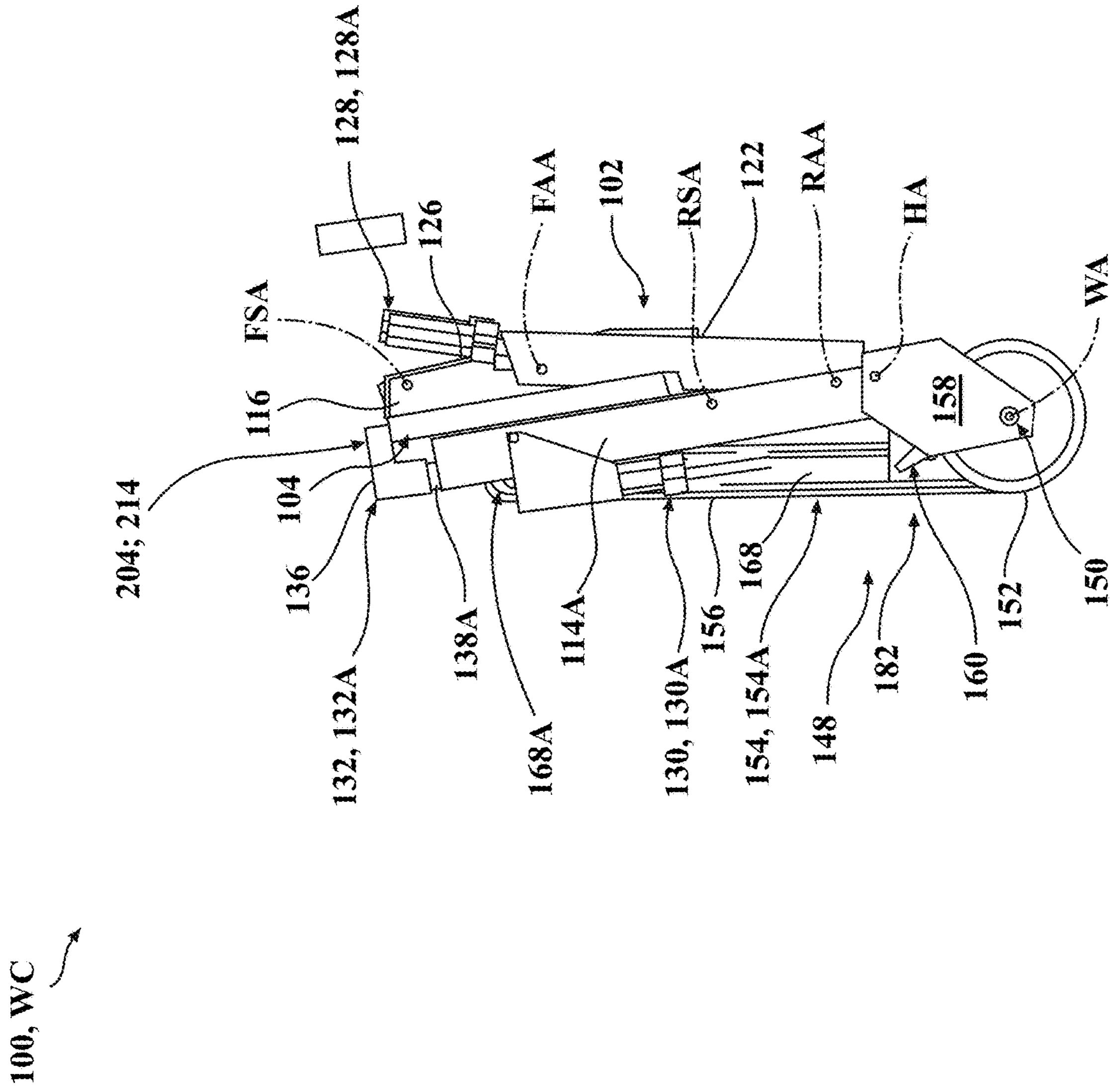
FIG. 5 is a right-side plan view of the patient transport apparatus of FIGS. 1-4, shown arranged in a stowed configuration maintained by the folding lock mechanism.
Figure 6A:
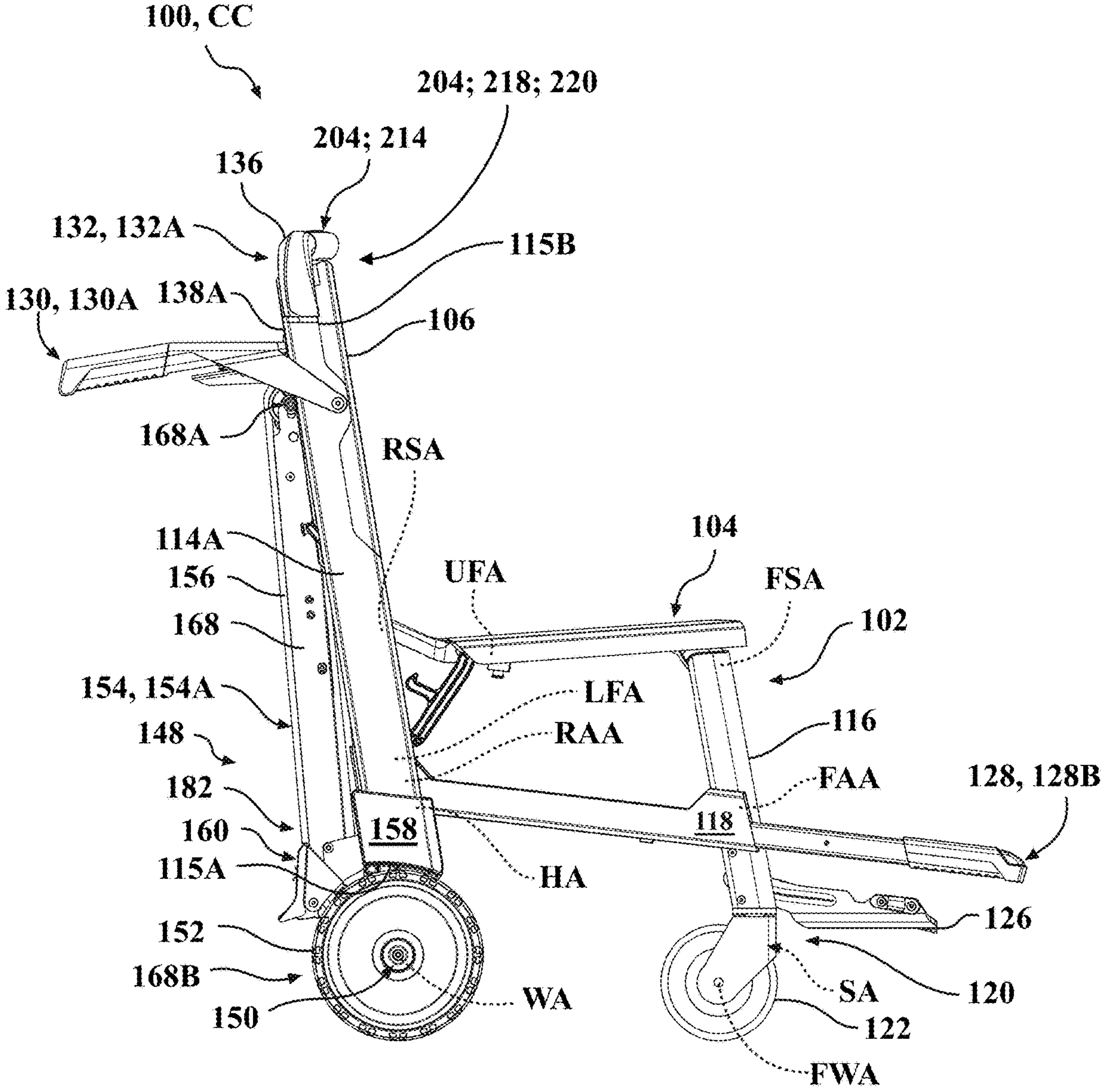
FIG. 6A is another right-side plan view of the patient transport apparatus arranged in the chair configuration and with a handle assembly in a collapsed position.
Figure 6B:
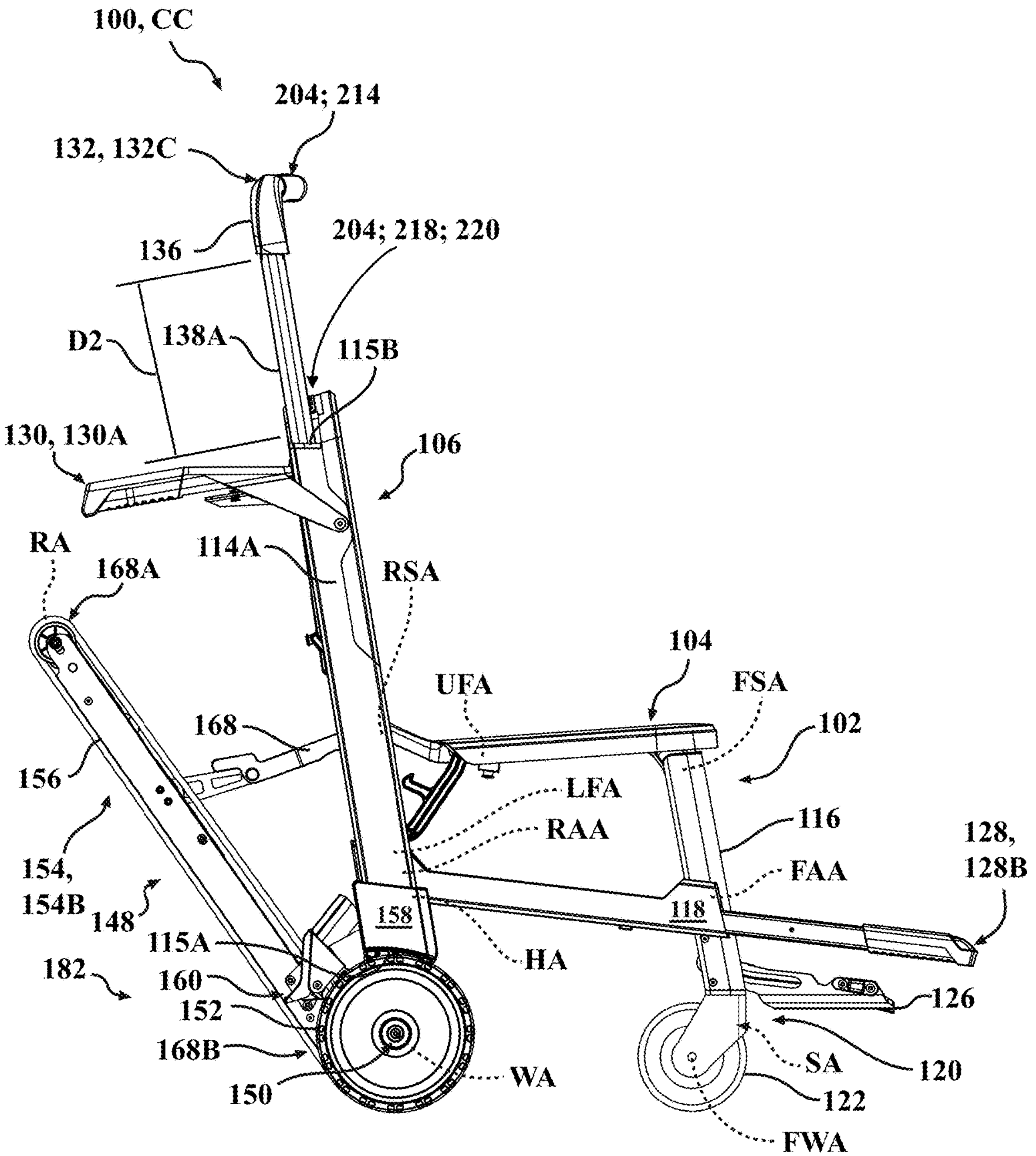
FIG. 6B is another right-side plan view of the patient transport apparatus arranged in the chair configuration and with the handle assembly in an intermediate position.
Figure 6C:
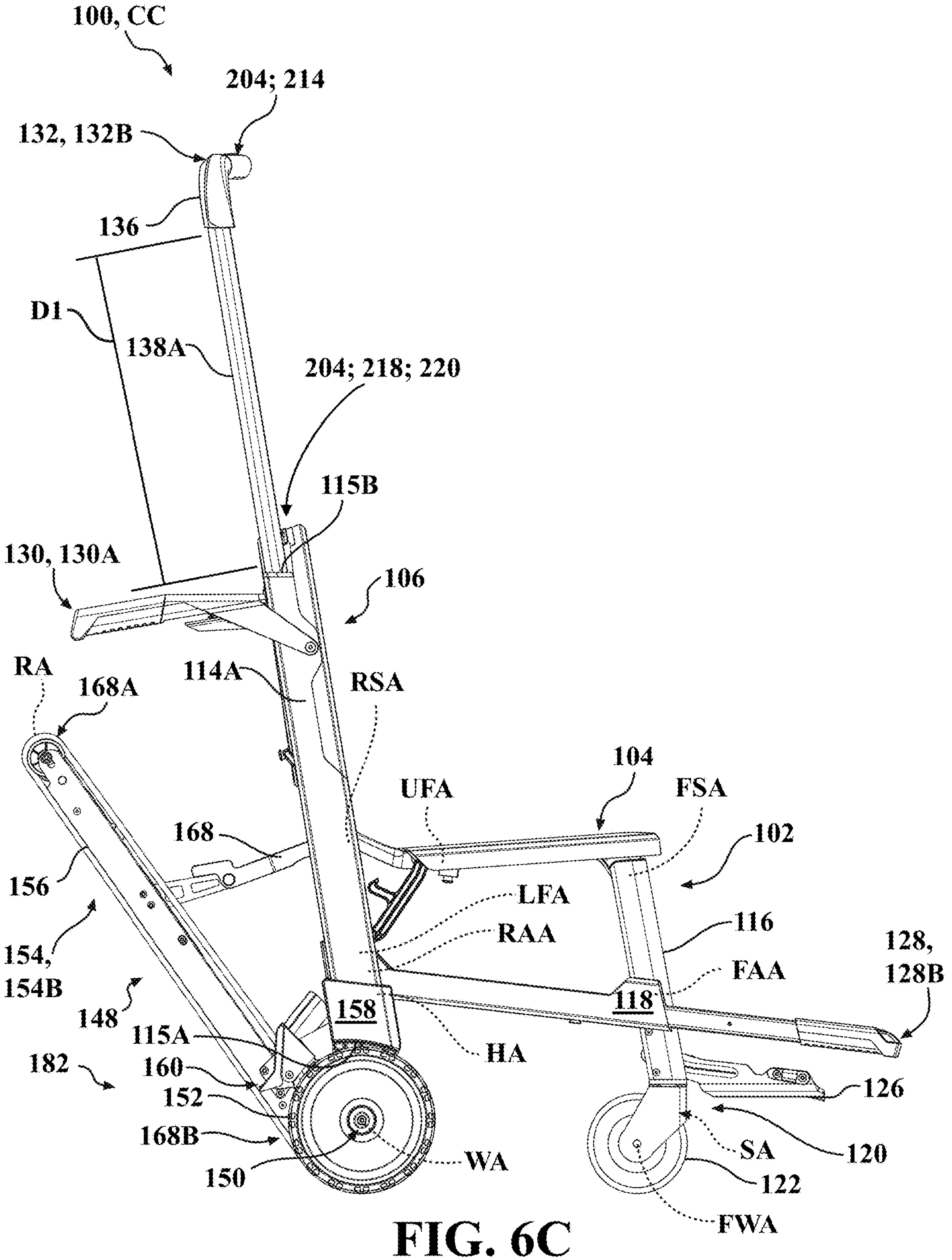
FIG. 6C is another right-side plan view of the patient transport apparatus arranged in the chair configuration and with the handle assembly in an extended position

Referring now to FIGS. 1-3, the front support assembly 110 includes a pair of caster assemblies 120 which each comprise a front wheel 122 arranged to rotate about a respective front wheel axis FWA and to pivot about a respective swivel axis SA (compare FIGS. 5-6A; pivoting about swivel axis SA not shown in detail). The caster assemblies 120 are generally arranged on opposing lateral sides of the front support assembly 110 and are operatively attached to the front struts 116. A lateral brace 124 (see FIG. 3) extends laterally between the front struts 116 to, among other things, afford rigidity to the support structure 102. Here, a foot rest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

The representative versions of the patient transport apparatus 100 illustrated throughout the drawings comprise different handles arranged for engagement by caregivers during patient transport. More specifically, the patient transport apparatus 100 comprises front handle assemblies 128, pivoting handle assemblies 130, and an upper handle assembly 132 (hereinafter referred to as "handle assembly 132"), each of which will be described in greater detail below. The front handle assemblies 128 are supported within the respective intermediate arms 118 for movement between a collapsed position 128A (see FIG. 9A) and an extended position 128B (see FIG. 9B). To this end, the front handle assemblies 128 may be slidably supported by bushings, bearings, and the like (not shown) coupled to the intermediate arms 118, and may be lockable in and/or between the collapsed position 128A and the extended position 128B via respective front handle locks 134 (see FIG. 1).

Here, a caregiver may engage the front handle locks 134 (not shown in detail) to facilitate moving the front handle assemblies 128 between the collapsed position 128A and the extended position 128B. The front handle assemblies 128 are generally arranged so as to be engaged by a caregiver during patient transport up or down stairs ST when in the extended position 128B. It will be appreciated that the front handle assemblies 128 could be of various types, styles, and/or configurations suitable to be engaged by caregivers to support the patient transport apparatus 100 for movement. While the illustrated front handle assemblies 128 are arranged for telescoping movement, other configurations are contemplated. By way of non-limiting example, the front handle assemblies 128 could be pivotably coupled to the support structure 102 or other parts of the patient transport apparatus 100. In some versions, the front handle assemblies 128 could be configured similar to as is disclosed in U.S. Pat. No. 6,648,343, the disclosure of which is hereby incorporated by reference in its entirety.

The pivoting handle assemblies 130 are coupled to the respective rear uprights 114A, 114B of the rear support assembly 108, and are movable relative to the rear uprights 114A, 114B between a stowed position 130A and an engagement position 130B. Like the front handle assemblies 128, the pivoting handle assemblies 130 are generally arranged for engagement by a caregiver during patient transport, and may advantageously be utilized in the engagement position 130B when the patient transport apparatus 100 operates in the chair configuration CC to transport the patient along floor surfaces FS. In some versions, the pivoting handle assemblies 130 could be configured similar to as is disclosed in U.S. Pat. No. 6,648,343, previously incorporated by reference. Other configurations are contemplated.

As noted above, the patient transport apparatus 100 is configured for use in transporting the patient across floor surfaces FS, such as when operating in the stair configuration SC, and for transporting the patient along stairs ST when operating in the stair configuration SC. To these ends, the illustrated patient transport apparatus 100 includes a carrier assembly 148 arranged for movement relative to the support structure 102 between the chair configuration CC and the stair configuration ST. The carrier assembly 148 generally comprises at least one shaft 150 defining a wheel axis WA, one or more rear wheels 152 supported for rotation about the wheel axis WA, at least one track assembly 154 having a belt 156 for engaging stairs ST, and one or more hubs 158 supporting the shaft 150 and the track assembly 154 and the shaft 150 for concurrent pivoting movement about a hub axis HA. Here, movement of the carrier assembly 148 from the chair configuration CC (see FIG. 1) to the stair configuration SC (see FIGS. 2 and 6B) simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

As is described in greater detail below in connection with FIGS. 9A-9F, the movement of the rear wheels 152 relative to the front wheels 122 when transitioning from the chair configuration CC to the stair configuration SC that is afforded by the patient transport apparatus 100 of the present disclosure affords significant improvements in patient comfort and caregiver usability, in that the rear wheels 152 are arranged to promote stable transport across floor surfaces FS in the chair configuration CC but are arranged to promote easy transitioning from floor surfaces to stairs ST as the patient transport apparatus 100 is "tilted" backwards about the rear wheels 152 (compare FIGS. 9D-9F). Put differently, positioning the rear wheels 152 relative to the front wheels 122 consistent with the present disclosure makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface FS as the patient transport apparatus 100 is "tilted" backwards to transition into engagement with the stairs ST.

In the representative versions illustrated herein, the carrier assembly 148 comprises hubs 158 that are pivotably coupled to the respective rear uprights 114A, 114B for concurrent movement about the hub axis HA. Here, one or more bearings, bushings, shafts, fasteners, and the like (not shown in detail) may be provided to facilitate pivoting motion of the hubs 158 relative to the rear uprights 114A, 114B. Similarly, bearings and/or bushings (not shown) may be provided to facilitate smooth rotation of the rear wheels 152 about the wheel axis WA. Here, the shafts 150 may be fixed to the hubs 158 such that the rear wheels 152 rotate about the shafts 150 (e.g., about bearings supported in the rear wheels 152), or the shafts 150 could be supported for rotation relative to the hubs 158. Each of the rear wheels 152 is also provided with a wheel lock 160 coupled to its respective hub 158 to facilitate inhibiting rotation about the wheel axis WA. The wheel locks 160 are generally pivotable relative to the hubs 158, and may be configured in a number of different ways without departing from the scope of the present disclosure. While the representative version of the patient transport apparatus 100 illustrated herein employs hubs 158 with "mirrored" profiles that are coupled to the respective rear uprights 114A, 114B and support discrete shafts 150 and wheel locks 160, it will be appreciated that a single hub 158 and/or a single shaft 150 could be employed. Other configurations are contemplated.

Figure 7A:
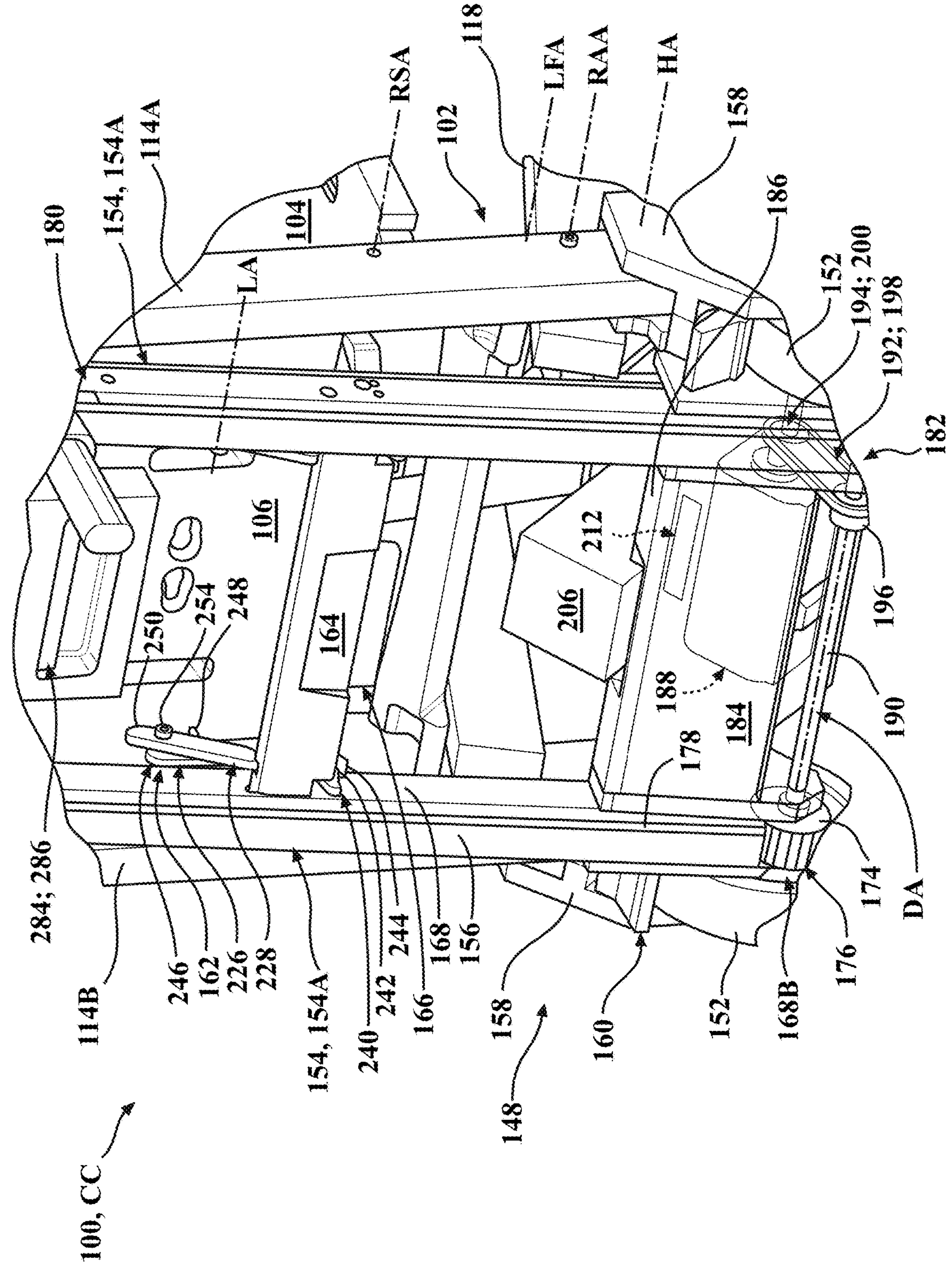
FIG. 7A is a partial rear perspective view of the patient transport apparatus of FIGS. 1-6B, shown arranged in the chair configuration as depicted in FIG. 1, with the deployment lock mechanism shown retaining the track assembly in the retracted position.
Figure 7B:
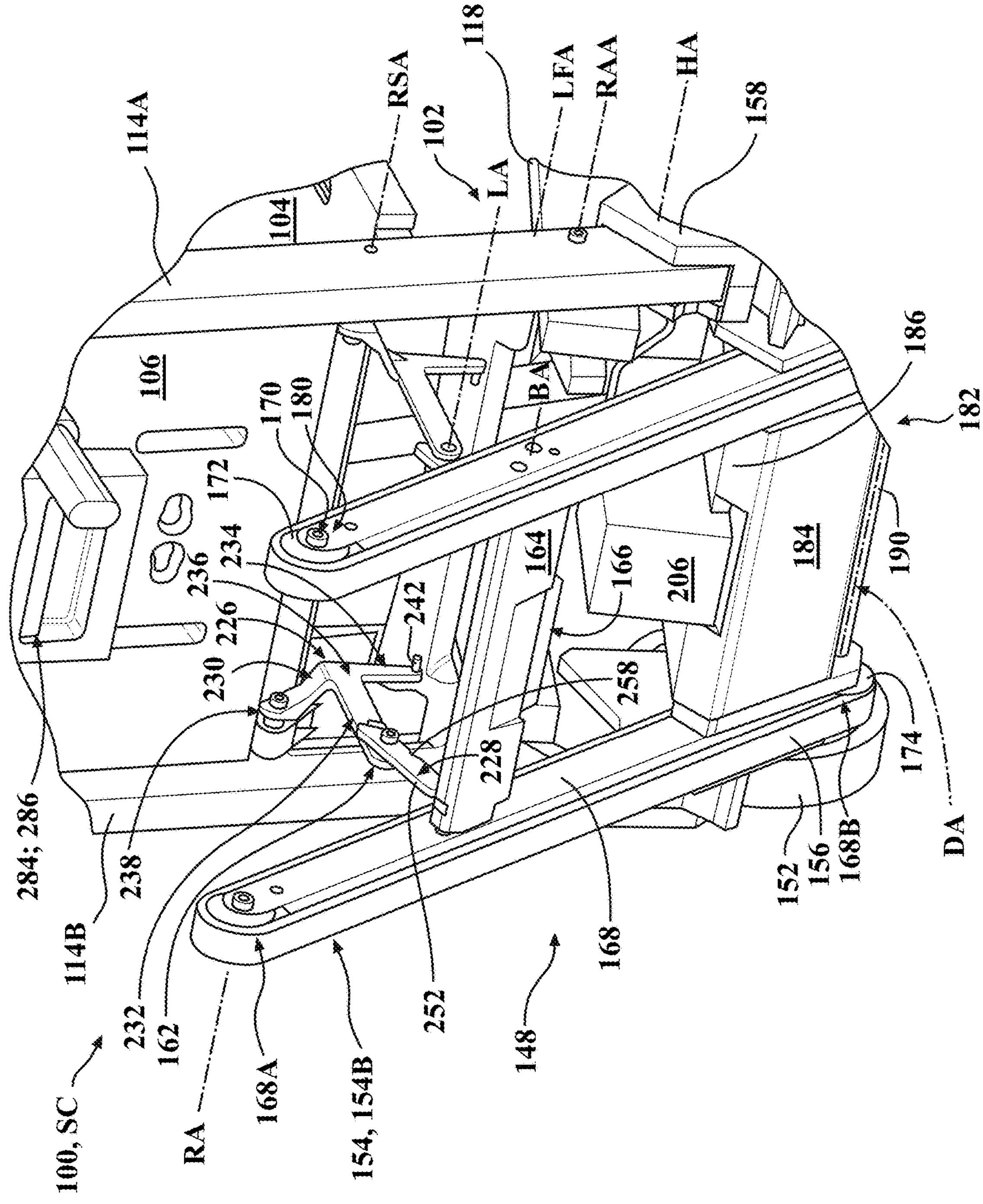
FIG. 7B is another partial rear perspective view of the patient transport apparatus of FIG. 7A, shown arranged in the stair configuration as depicted in FIGS. 2-3, with the deployment lock mechanism shown retaining the track assembly in the deployed position.

Referring now to FIGS. 7A-7B, as noted above, the track assemblies 154 move concurrently with the hubs 158 between the chair configuration CC and the stair configuration SC. Here, the track assemblies 154 are arranged in a retracted position 154A when the carrier assembly 148 is disposed in the chair configuration CC, and are disposed in a deployed position 154B when the carrier assembly 148 is disposed in the stair configuration SC. As is described in greater detail below, the illustrated patient transport apparatus 100 comprises a deployment linkage 162 and a deployment lock mechanism 164 with a deployment lock release 166 arranged for engagement by the caregiver to facilitate changing between the retracted position 154A and the deployed position 154B (and, thus, between the chair configuration CC and the stair configuration SC).

In the illustrated version, the patient transport apparatus 100 comprises laterally-spaced track assemblies 154 each having a single belt 156 arranged to contact stairs ST. However, it will be appreciated that other configurations are contemplated, and a single track assembly 154 and/or track assemblies with multiple belts 156 could be employed. The track assemblies 154 each generally comprise a rail 168 extending between a first rail end 168A and a second rail end 168B. The second rail end 168B is operatively attached to the hub 158, such as with one or more fasteners (not shown in detail). An axle 170 defining a roller axis RA is disposed adjacent to the first rail end 168A of each rail 168, and a roller 172 is supported for rotation about the roller axis RA. For each of the track assemblies 154, the belt 156 is disposed in engagement with the roller 172 and is arranged for movement relative to the rail 168 in response to rotation of the roller 172 about the roller axis RA.

Adjacent to the second rail end 168B of each rail 168, a drive pulley 174 is supported for rotation about a drive axis DA and is likewise disposed in engagement with the belt 156 (see FIGS. 7A-7B; rotation about drive axis DA not shown in detail). Here, the drive pulley 174 comprises outer teeth 176 which are disposed in engagement with inner teeth 178 formed on the belt 156. The track assemblies 154 each also comprise a belt tensioner, generally indicated at 180, configured to adjust tension in the belt 156 between the roller 172 and the drive pulley 174.

In the representative version illustrated herein, the patient transport apparatus 100 comprises a drive system, generally indicated at 182, configured to facilitate driving the belts 156 of the track assemblies 154 relative to the rails 168 to facilitate movement of the patient transport apparatus 100 up and down stairs ST. To this end, and as is depicted in FIG. 7A, the drive system 182 comprises a drive frame 184 and a cover 186 which are operatively attached to the hubs 158 of the carrier assembly 148 for concurrent movement with the track assemblies 154 between the retracted position 154A and the deployed position 154B. A motor 188 (depicted in phantom in FIG. 7A) is coupled to the drive frame 184 and is concealed by the cover 186. The motor 188 is configured to selectively generate rotational torque used to drive the belts 156 via the drive pulleys 174, as described in greater detail below. To this end, a drive axle 190 is coupled to each of the drive pulleys 174 and extends along the drive axis DA laterally between the track assemblies 154. The drive axle 190 is rotatably supported by the drive frame 184, such as by one or more bearings, bushings, and the like (not shown in detail). A geartrain 192 is disposed in rotational communication between the motor 188 and the drive axle 190. To this end, in the version depicted in FIG. 7A, the geartrain 192 comprises a first sprocket 194, a second sprocket 196, and an endless chain 198. Here, the motor 188 comprises an output shaft 200 to which the first sprocket 194 is coupled, and the second sprocket 196 is coupled to the drive axle 190. The endless chain 198, in turn, is supported about the first sprocket 194 and the second sprocket 196 such that the drive axle 190 and the output shaft 200 rotate concurrently. The geartrain 192 may be configured so as to adjust the rotational speed and/or torque of the drive axle 190 relative to the output shaft 200 of the motor, such as by employing differently-configured first and second sprockets 194, 196 (e.g., different diameters, different numbers of teeth, and the like).

While the representative version of the drive system 182 illustrated herein utilizes a single motor 188 to drive the belts 156 of the track assemblies 154 concurrently using a chain-based geartrain 192, it will be appreciated that other configurations are contemplated. By way of non-limiting example, multiple motors 188 could be employed, such as to facilitate driving the belts 156 of the track assemblies 154 independently. Furthermore, different types of geartrains 192 are contemplated by the present disclosure, including without limitation the geartrains 192 which comprise various arrangements of gears, planetary gearsets, and the like.

Figure 4:
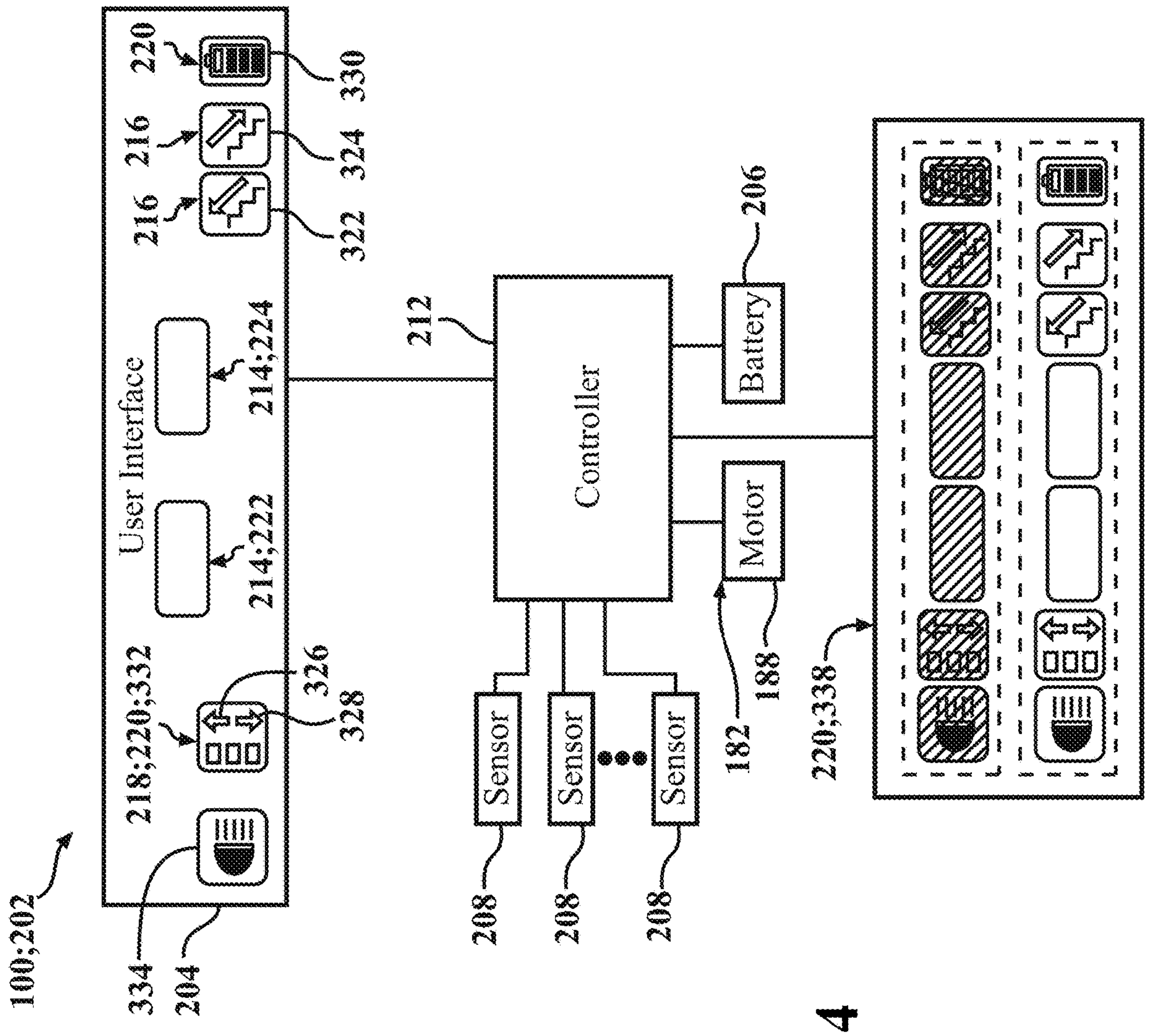
FIG. 4 is a partial schematic view of a control system of the patient transport apparatus of FIGS. 1-3, shown with a controller disposed in communication with a battery, a user interface, and a drive system.

The patient transport apparatus 100 comprises a control system 202 to, among other things, facilitate control of the track assemblies 154. To this end, and as is depicted schematically in FIG. 4, the representative version of the control system 202 generally comprises a user interface 204, a battery 206, one or more sensors 208, and one or more back light modules 210 which are disposed in electrical communication with a controller 212. As will be appreciated from the subsequent description below, the controller 212 may be of a number of different types, styles, and/or configurations, and may employ one or more microprocessors for processing instructions or an algorithm stored in memory to control operation of the motor 188, the light modules 210, and the like. Additionally or alternatively, the controller 212 may comprise one or more sub-controllers, microcontrollers, field programmable gate arrays, systems on a chip, discrete circuitry, and/or other suitable hardware, software, and/or firmware that is capable of carrying out the functions described herein.

The controller 212 is coupled to various electrical components of the patient transport apparatus 100 (e.g., the motor 188) in a manner that allows the controller 212 to control or otherwise interact with those electrical components the (e.g., via wired and/or wireless electrical communication). In some versions, the controller 212 may generate and transmit control signals to the one or more powered devices, or components thereof, to drive or otherwise facilitate operating those powered devices, or to cause the one or more powered devices to perform one or more of their respective functions.

The controller 212 may utilize various types of sensors 208 of the control system 202, including without limitation force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. One or more sensors 208 may be used to detect mechanical, electrical, and/or electromagnetic coupling between components of the patient transport apparatus 100. Other types of sensors 208 are also contemplated. Some of the sensors 208 may monitor thresholds movement relative to discrete reference points. The sensors 208 can be located anywhere on the patient transport apparatus 100, or remote from the patient transport apparatus 100. Other configurations are contemplated.

The battery 206 provides power to the controller 212, the motor 188, the light modules 210, and other components of the patient transport apparatus 100 during use, and is removably attachable to the cover 186 of the drive system 182 in the illustrated version (see FIG. 7A; attachment not shown in detail). The user interface 204 is generally configured to facilitate controlling the drive direction and drive speed of the motor 188 to move the belts 156 of the track assembly 154 and, thus, allow the patient transport apparatus 100 to ascend or descend stairs ST. Here, the user interface 204 may comprise one or more activation input controls 214 to facilitate driving the motor 188 in response to engagement by the caregiver, one or more direction input controls 216 to facilitate changing the drive direction of the motor 188 in response to engagement by the caregiver, and/or one or more speed input controls 218 to facilitate operating the motor 188 at different predetermined speeds selectable by the caregiver. The user interface 204 may also comprise various types of indicators 220 to display information to the caregiver. It will be appreciated that the various components of the control system 202 introduced above could be configured and/or arranged in a number of different ways, and could communicate with each other via one or more types of electrical communication facilitated by wired and/or wireless connections. Other configurations are contemplated.

In the illustrated versions, the patient transport apparatus 100 is configured to limit movement of the belts 156 relative to the rails 168 during transport along stairs ST in an absence of engagement with the activation input controls 214 by the caregiver. Put differently, one or more of the controller 212, the motor 188, the geartrain 192, and/or the track assemblies 154 may be configured to "brake" or otherwise prevent movement of the belts 156 unless the activation input controls 214 are engaged. To this end, the motor 188 may be controlled via the controller 212 to prevent rotation (e.g., driving with a 0% pulse-width modulation PWM signal) in some versions. However, other configurations are contemplated, and the patient transport apparatus 100 could be configured to prevent movement of the belts 156 in other ways. By way of non-limiting example, a mechanical brake system (not shown) could be employed in some versions.

Referring now to FIG. 7A, the patient transport apparatus 100 employs the deployment lock mechanism 164 to releasably secure the track assembly 154 in the retracted position 154A and in the deployed position 154B. The deployment lock release 166 is arranged for engagement by the caregiver to move between the retracted position 154A and the deployed position 154B. The deployment lock mechanism 164 is coupled to the track assemblies 154 for concurrent movement, and the deployment linkage 162 is coupled between the deployment lock mechanism 164 and the support structure 102. The illustrated deployment linkage 162 generally comprises connecting links 226 which are pivotably coupled to the support structure 102, and brace links 228 which are coupled to the deployment lock mechanism 164 and are respectively pivotably coupled to the connecting links 226.

The connecting links 226 each comprise or otherwise define a forward pivot region 230, a connecting pivot region 232, a trunnion region 234, and an interface region 236. The forward pivot regions 230 extend from the interface regions 236 to forward pivot mounts 238 which are pivotably coupled to the rear uprights 114A, 114B about the rear seat axis RSA, such as by one or more fasteners, bushings, bearings, and the like (not shown in detail). Here, because the rear uprights 114A, 114B are spaced laterally away from each other at a distance large enough to allow the track assemblies 154 to "nest" therebetween in the retracted position 154A (see FIG. 7A), the forward pivot regions 230 of the connecting links 226 extend at an angle away from the rear uprights 114A, 114B at least partially laterally towards the track assemblies 154.

The trunnion regions 234 extend generally vertically downwardly from the interface regions 236 to trunnion mount ends 240, and comprise trunnions 242 which extend generally laterally and are arranged to abut trunnion catches 244 of the deployment lock mechanism 164 to retain the track assemblies 154 in the retracted position 154A (see FIG. 7A). The connecting pivot regions 232 extend longitudinally away from the interface regions 236 to rearward pivot mounts 246 which pivotably couple to the brace links 228 about a link axis LA. The connecting links 226 are each formed as separate components with mirrored profiles in the illustrated versions, but could be realized in other ways, with any suitable number of components.

The brace links 228 each generally extend between an abutment link end 250 and a rearward link mount 252, with a forward link mount 254 arranged therebetween. The forward link mounts 254 are pivotably coupled to the rearward pivot mounts 246 of the connecting links 226 about the link axis LA, such as by one or more fasteners, bushings, bearings, and the like (not shown in detail). The rearward link mounts 252 are each operatively attached to the deployment lock mechanism 164 about a barrel axis BA. The brace links 228 each define a link abutment surface 256 disposed adjacent to the abutment link end 250 which are arranged to abut the link stops 248 of the connecting links 226 in the deployed position 154B (see FIG. 7B). The brace links 228 also define a relief region 258 formed between the forward link mount 254 and the rearward link mount 252. The relief regions 258 are shaped to at least partially accommodate the link stops 248 of the connecting links 226 when the track assemblies 154 are in the retracted position 154A (not shown in detail). The deployment linkage 162, the deployment lock mechanism 164, and the deployment lock release 166 may be similar to as is disclosed by U.S. Patent Application Publication No. 2021/0196536, the disclosure of which is hereby incorporated by reference in its entirety.

Figure 8:
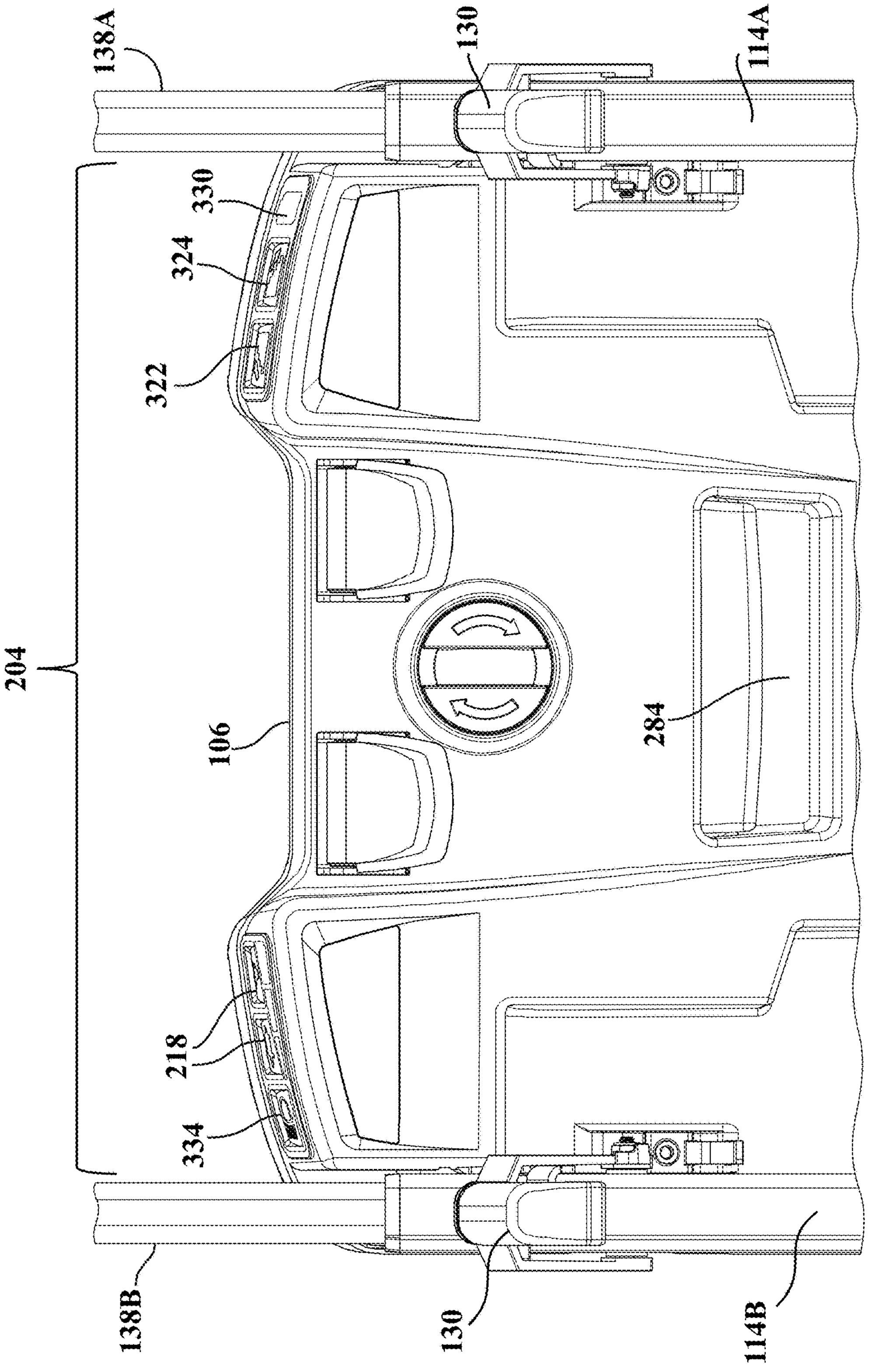
FIG. 8 is a rear view of the back side of the patient transport apparatus of FIG. 1 depicting the user interface.

With continued reference to FIGS. 7A and 7B and additional reference to FIG. 8, the patient transport apparatus 100 employs a folding lock mechanism 284 to facilitate changing between the stowed configuration WC (see FIG. 5) and the chair configuration CC (see FIG. 6A). To this end, the folding lock mechanism 284 generally comprises a folding lock release 286 operatively attached to the back section 106 and arranged for engagement by the caregiver to releasably secure the folding lock mechanism 284 between a stow lock configuration to maintain the stowed configuration WC, and a use lock configuration to prevent movement to the stowed configuration WC from the chair configuration CC or from the stair configuration SC. The folding lock mechanism 284 may incorporate features as disclosed in U.S. Pat. No. 6,648,343 previously incorporated by reference and as disclosed in U.S. Patent Application Publication No. 2021/0196536, previously incorporated by reference.

The drive system 182 may include various components not specifically illustrated or be configured in various ways not discussed in detail but described in U.S. Patent Application Publication No. 2021/0196536, previously referenced and incorporated by reference. In a version, the motor 188 may be supported on an adjustable platform that is movable relative to the drive frame 184 to adjust slack in the endless chain. This arrangement helps to optimize power density and minimize weight in the drive system 182. It will be appreciated that this arrangement could be utilized with other types of geartrains 192, such as where a belt drive (not shown) would replace the endless chain 198. Other configurations are contemplated.

In some versions, the geartrain 192 may be configured with a direct drive gearbox coupled to one of the rails 168 of the track assembly 154. Here, the drive axle 190 extends through the direct drive gearbox, and the motor 188 may be coupled to the direct drive gearbox. In some versions, the patient transport apparatus 100 may include a "passive brake" that allows the speed of the patient transport apparatus 100 to be controlled when on stairs ST even when the battery 206 is of low charge, dead, or not connected to the drive system 182 (e.g., inadvertently removed).

Figure 9A:
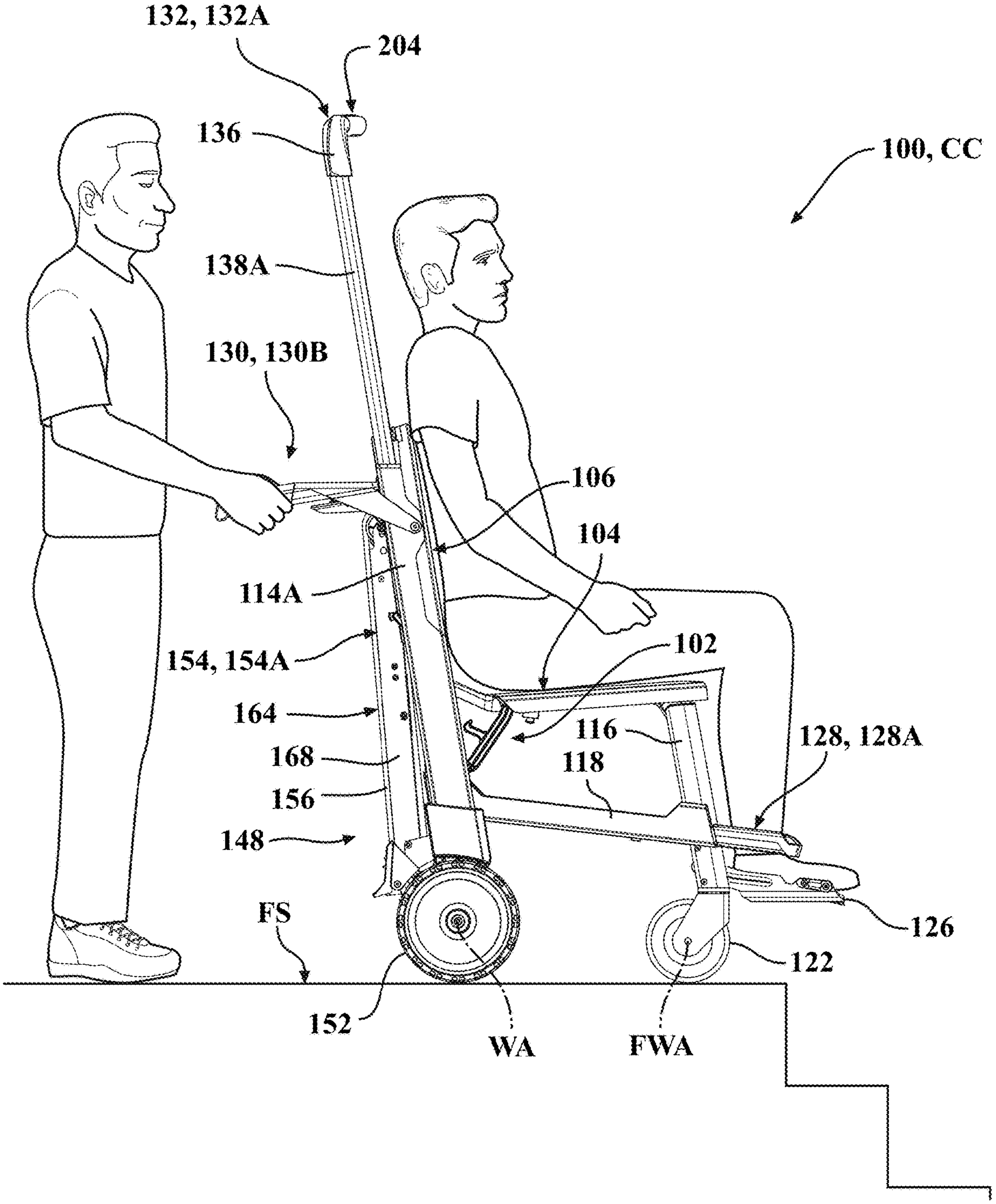
FIG. 9A is a right-side plan view of the patient transport apparatus of FIG. 1, shown supporting a patient in the chair configuration on a floor surface adjacent to stairs, and shown with a first caregiver engaging a pivoting handle assembly.
Figure 9B:
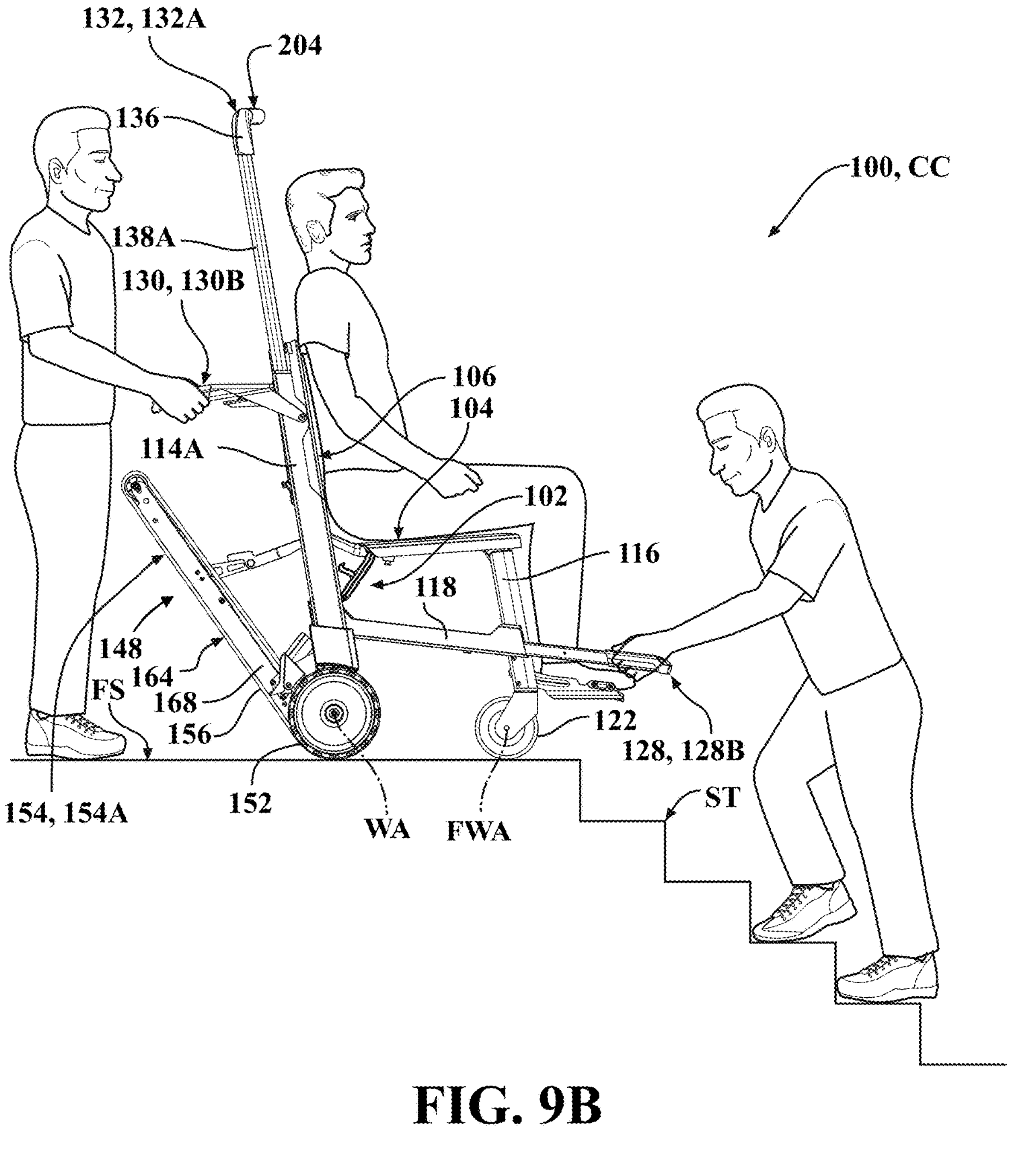
FIG. 9B is another right-side plan view of the patient transport apparatus of FIG. 9A, shown with the first caregiver having engaged the deployment lock mechanism to move the track assembly out of the retracted position and a second caregiver engaging a front handle assembly in an extended position.
Figure 9C:
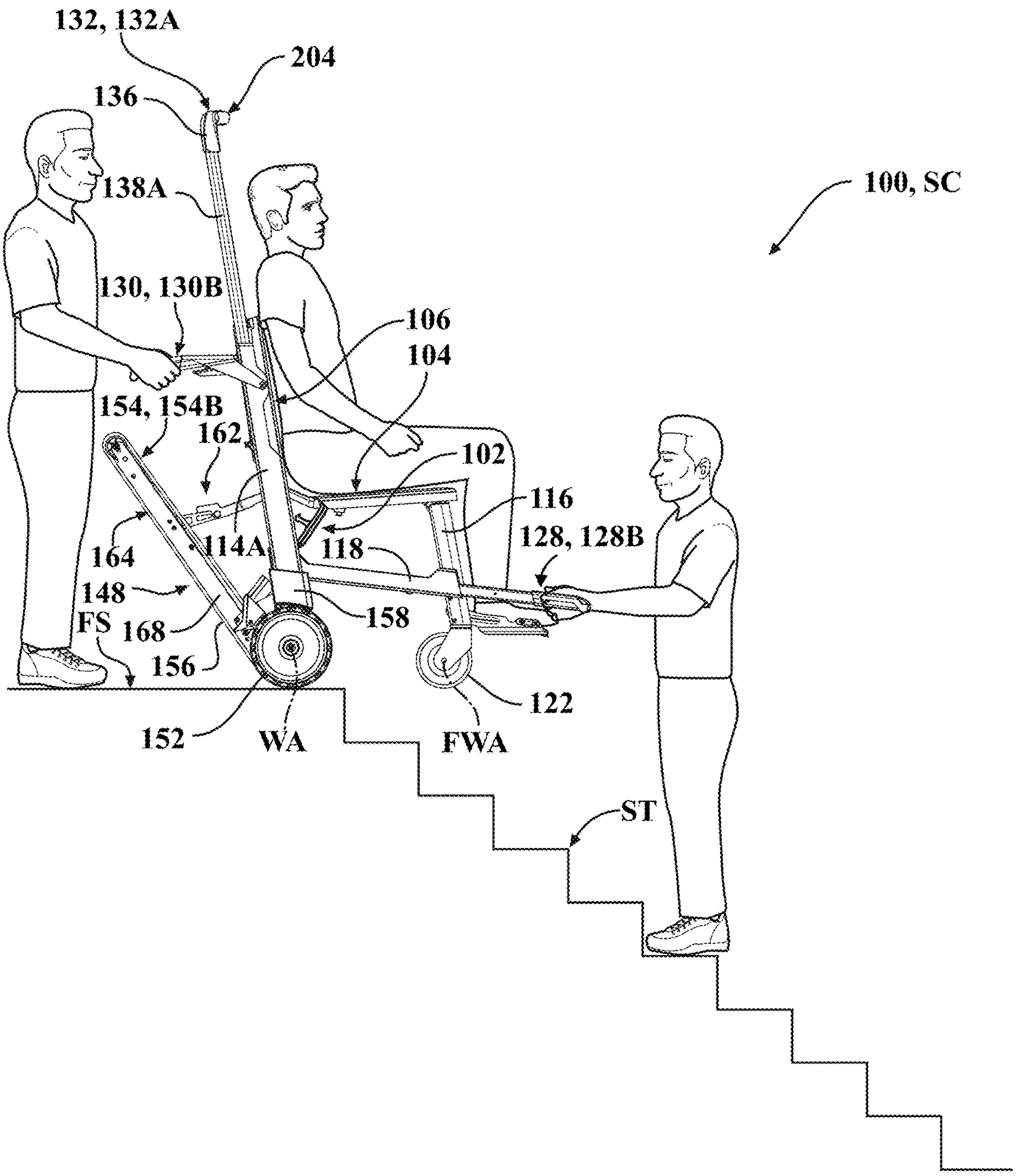
FIG. 9C is another right-side plan view of the patient transport apparatus of FIG. 9B, shown having moved towards the stairs for descent while supported by the first and second caregivers.
Figure 9D:
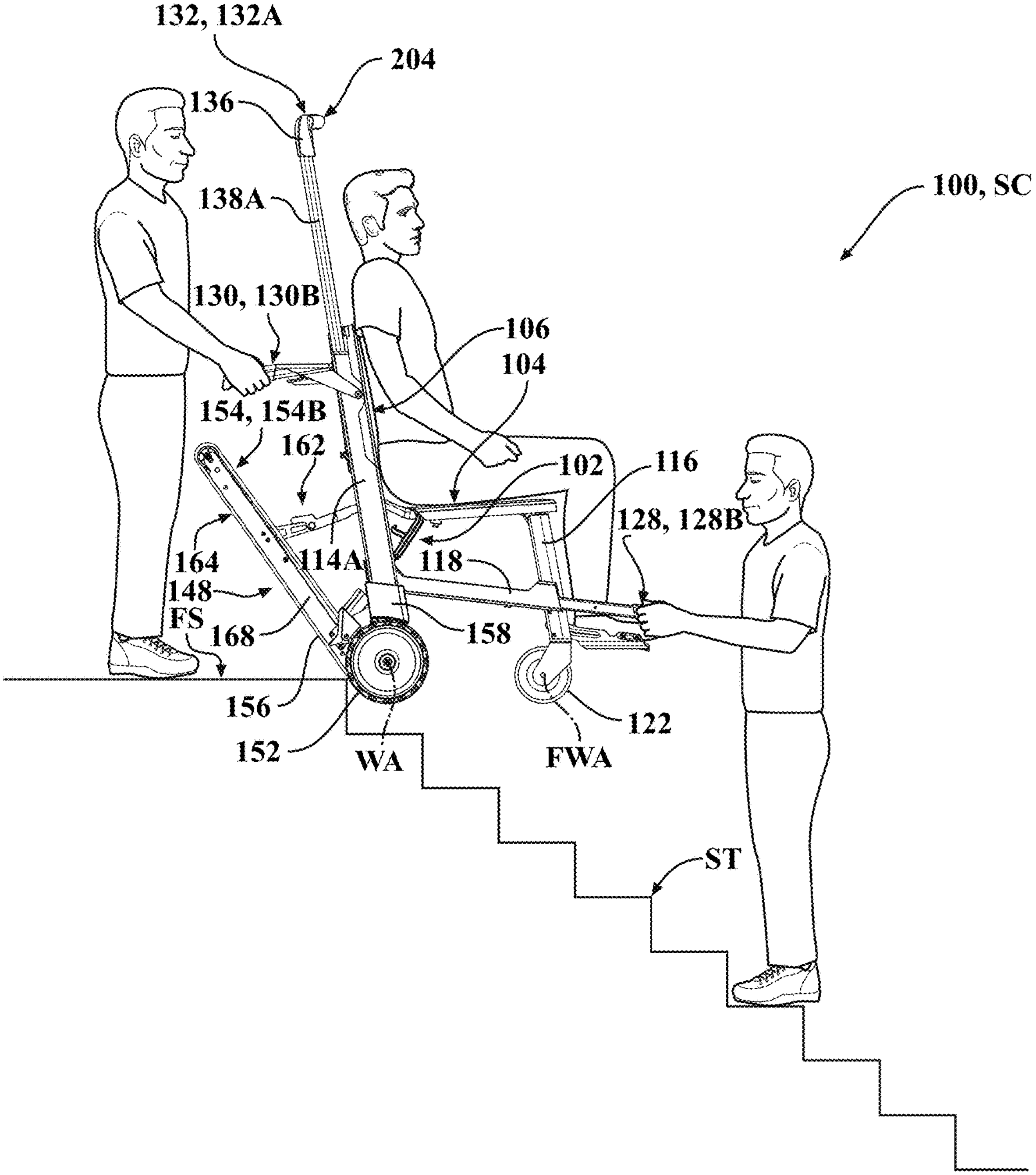
FIG. 9D is another right-side plan view of the patient transport apparatus of FIG. 9C, shown having moved initially down the stairs for descent to bring a belt of the track assembly into contact with the stairs while still supported by the first and second caregivers.

FIGS. 9A-9F successively depict exemplary steps of transporting a patient supported on the patient transport apparatus 100 down the stairs ST. In FIG. 9A, a first caregiver is shown engaging the pivoting handle assemblies 130 in the engagement position 130B to illustrate approaching stairs ST while the patient transport apparatus 100 is moved along floor surfaces FS in the chair configuration CC. In FIG. 9B, the patient transport apparatus 100 has been moved closer to the stairs with a second caregiver engaging the front handle assemblies 128 after having moved them to the extended position 128B. The deployment lock release 166 was also deployed by the first caregiver to move the patient transport apparatus 100 into the stair configuration SC as shown. As shown in the stair configuration SC, the track assemblies 154 are arranged in the deployed position 154B. Here, the rear wheels 152 are positioned significantly closer to the front wheels 122 compared to operation in the chair configuration CC, and are also arranged further under the seat section 104. It will be appreciated that transitioning the patient transport apparatus 100 from the chair configuration CC to the stair configuration SC has resulted in minimal patient movement relative to the support structure 102 as the carrier assembly 148 pivots about the hub axis HA and moves the rear wheels 152 closer to the front wheels 122 in response to movement of the track assemblies 154 to the deployed position 154B.

Furthermore, while the arrangement of the patient's center of gravity has not changed significantly relative to the support structure 102, the longitudinal distance which extends between the patient's center of gravity and the location at which the rear wheels 152 contact the floor surface FS has shortened considerably. Because of this, the process of "tilting" the patient transport apparatus 100 (e.g., about the rear wheels 152) to transition toward contact between the track assemblies 154 and the stairs ST, as depicted in FIG. 9C, is significantly more comfortable for the patient than would otherwise be the case if the patient transport apparatus 100 were "tilted" about the rear wheels 152 from the chair configuration CC (e.g., with the rear wheels 152 positioned further away from the front wheels 122). Put differently, the arrangement depicted in FIG. 9C is such that the patient is much less likely to feel uncomfortable, unstable, or as if they are "falling backwards" during the "tilting" process. Here too, the caregivers are afforded with similar advantages in handling the patient transport apparatus 100, as the arrangement of the rear wheel 152 described above also makes the "tilting" process easier to control and execute. In FIG. 9D, the caregivers are shown continuing to support the patient transport apparatus 100 in the stair configuration SC as the belts 156 of the track assemblies 154 are brought into contact with the edge of the top stair ST.

Figure 9E:
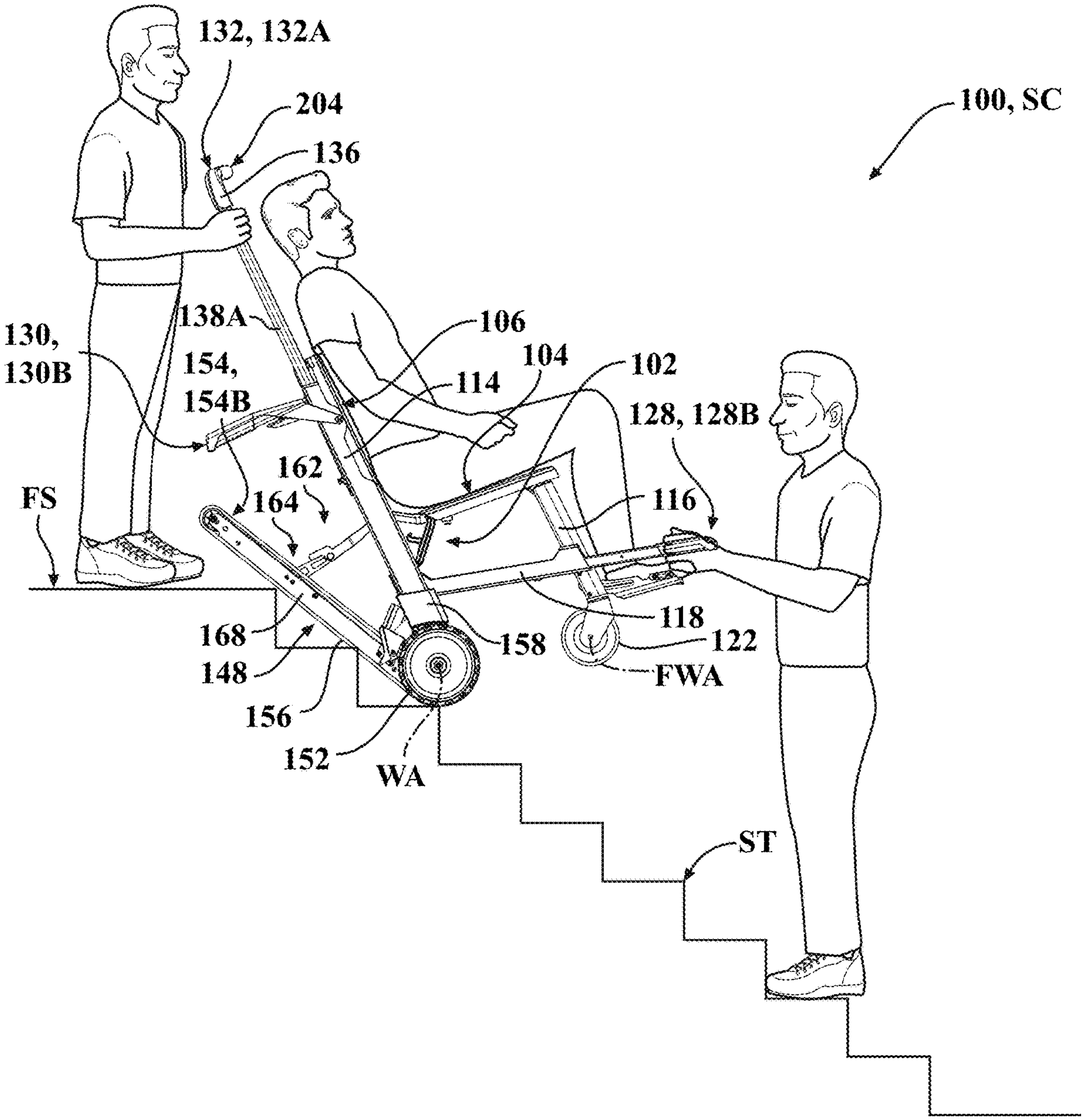
FIG. 9E is another right-side plan view of the patient transport apparatus of FIG. 9D, shown with the belt of the track assembly in contact with the stairs while still supported by the first and second caregivers.
Figure 9F:
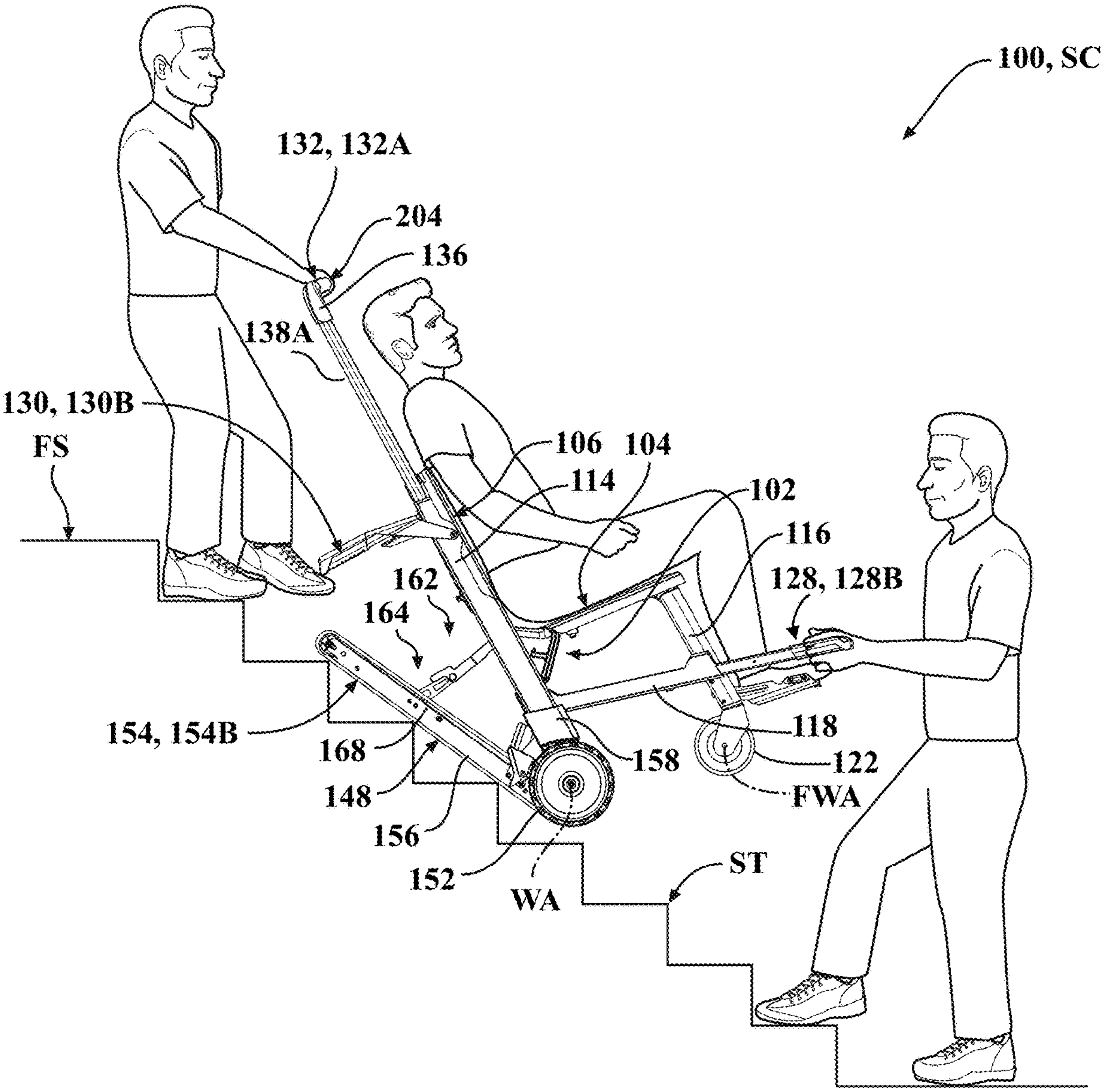
FIG. 9F is another right-side plan view of the patient transport apparatus of FIG. 9D, shown with the belt of the track assembly in contact with the stairs while still supported by the first and second caregivers and with first.

In FIGS. 9E and 9F, the caregivers are shown continuing to support the patient transport apparatus 100 in the stair configuration SC as the belts 156 of the track assemblies 154 contact multiple stairs ST during descent.

The patient transport apparatus 100 is configured to operate in a variety of states and modes in certain versions, including for example in or between one or more inactive states SI and/or one or more active states SA. During the inactive state SI, power consumption of the patient transport apparatus 100 is limited as the motor is not controlling movement of the belt during this state, and during the active state SA the controller 212 may be utilized to control movement of the belt 156 with the motor 188 of the patient transport apparatus 100.

It will be appreciated that the controller 212 may be configured to operate in a variety of inactive states SI and active states SA. The controller 212 may be configured to operate in (or between) a sleep mode MS of the inactive state SI and an active mode MS of the inactive state SI. The controller 212 may also operate in a variety of inactive states, for example, a low charge mode MLC of the inactive state SI, and/or a battery disconnect mode MBD of the inactive state SI which are discussed in detail in U.S. Patent Application Publication No. 2021/0196539A1, the disclosure of which is hereby incorporated by reference in its entirety.

During the sleep mode MS of the inactive state SI, power consumption of the patient transport apparatus 100 is limited. In some versions, power consumption of the patient transport apparatus 100 may be limited by only allowing the controller 212 to provide power from the battery 206 to certain components of the patient transport apparatus 100. For example, during the sleep mode MS, the controller 212 may be unable to generate and transmit control signals to some of the one or more powered devices, or components thereof, to drive the patient transport apparatus 100. Here, however, the controller 212 may be configured to provide power to the user interface 204. In the sleep mode MS, the user interface 204 may be prevented from emitting light, but may be configured to receive input generate by user engagement of any portion of the user interface 204. Additionally, in some instances of the sleep mode MS, one or more of the controller 212, the motor 188, the geartrain 192, and/or the track assemblies 154 may also be configured to “brake” or otherwise prevent movement of the belts 156.

During active mode MA of the inactive state, the controller 212 may not limit power consumption of any component of the patient transport apparatus 100. For example, the user interface 204 may emit light for a predetermined period of time in response to user engagement of one of the input controls 214, 216, 218, 222, 224, 322, 324, 326, 328, and 334. Various other components of the patient transport apparatus 100 may be provided power upon demand without limitation during the active mode MA of the inactive state SI.

The controller 212 may be configured to operate in a drive mode MD during the active state SA to control a direction of movement of the belt 156. In some versions, the controller 212 may be configured to additionally operate in additional modes to the drive mode during the active state SA such as a hold mode MH of the active state SA for limiting movement of the belt 156 to facilitate a controlled descent of the patient transport apparatus 100 along stairs ST. The hold mode is disclosed by the discussed in detail in U.S. Patent Application Publication No. 2021/0196539A1, previously incorporated by reference.

In some versions, the user interface 204 may comprise one or more light modules 210 realized as backlight modules 338 arranged to illuminate various input controls 214, 216, 218, 222, 224, 322, 324, 326, 328, 334 and/or indicators 220, 330, 32 under certain operating conditions. In some versions, the user interface 204 may comprise one or more light modules 210 configured to, among other things, provide status information to the caregiver.

In the representative version illustrated herein, the controller 212 may be operable in sleep mode in which power consumption is limited, and the active mode SA in which power consumption is not limited such as when the controller 212 controls movement of the belt 156 with the motor 188 of the patient transport apparatus 100. As previously described, the controller 212 may be configured to operate in a variety of other modes/states not explicitly discussed herewith but discussed in greater detail in U.S. Patent Application Publication No. 2021/0196539A1, previously incorporated by reference.

As noted above, the direction input controls 216 may include the first direction input control 322 and the second direction input control 324. Here, the first direction input control 322 may be configured to select a drive direction of the motor 188 in order to ascend stairs. The second direction input control 324 may be configured to select a drive direction of the motor 188 in order to descend stairs.

The one or more speed input controls 218 may be configured to select between the plurality of drive speeds DS1, DS2, DS3 of the motor 188. The speed indicator 332 may be disposed adjacent to the one or more speed input controls 218. The speed indicator 332 may be configured to display the selected one of the plurality of drive speeds DS1, DS2, DS3 of the motor 188 to the user.

The plurality of drive speeds DS1, DS2, DS3 may correspond to predetermined speed settings (a specific RPM setting) stored in memory of the controller 212. The plurality of drive speeds DS1, DS2, DS3 may include a first drive speed DS1, a second drive speed DS2, and a third drive speed DS3. The first drive speed DS1 corresponds to the lowest of the plurality of drive speeds DS1, DS2, DS3. The third drive speed DS3 corresponds to the highest drive speed of the plurality of drive speeds DS1, DS2, DS3. The second drive speed DS2 corresponds to a speed in between the first drive speed DS1 and the third drive speed DS3. It will be appreciated that the forgoing are non-limiting, illustrative examples of three discreet drive speeds, and other configurations are contemplated, including without limitation additional and/or fewer drive speeds, drive speeds defined in other ways, and the like.

As noted above, the one or more speed input controls 218 may include a first speed input control 326 and a second speed input control 328. The controller 212 may be configured to increase the selected speed to the next higher drive speed setting in response to the user engagement of the first speed input control 326. For example, in response to receiving user input generated by user engagement of the first speed input control 326 when the current selected drive speed is the first drive speed DS1, the controller 212 may set the current speed to the second drive speed DS2. The controller 212 may be configured to decrease the selected drive speed to the next lower drive speed setting in response to user engagement of the second speed input control 328. For example, when the current selected drive speed is the second drive speed DS2, the controller 212 may set the current speed to the first drive speed DS1 in response to user engagement of the second speed input control 328.

In some versions, the controller 212 may be configured to initially select the first drive speed DS1 of the plurality of drive speeds DS1, DS2, DS3 in response to user engagement of the direction input controls 216 following the change in operation from the inactive state SI to the active state SA. However, it is contemplated that the controller 212 may be configured alternatively, such as to initially select the second drive speed DS2 or the third drive speed DS3 of the plurality of drive speeds DS1, DS2, DS3.

The controller 212 may be configured to selectively permit operation of the motor 188 in response to receiving user input generated by engagement of one of the activation input controls 214 (e.g., the first activation input control 222 or the second activation input control 224). For example, the controller 212 may be configured to permit operation of the motor 188 in response to user engagement of at least one of the activation input controls 214 following user engagement of the direction input control 216 to drive the belt 156 in a selected drive direction. In another example, the controller 212 may be configured to permit operation of the motor 188 in response to user engagement of the activation input controls 214 within a predetermined period following engagement of the direction input control 216. After the predetermined period following user engagement of the direction input control 216 has elapsed, the controller 212 may prevent operation of the motor 188 even when one of the activation input controls 214 is engaged. The controller 212 may also be configured to limit operation of the motor 188 in response to receiving the user input before receiving the user input generated by user selection of one of the direction input controls 216.

As is best depicted in FIG. 6B, the rear uprights 114A, 114B each generally extend between a lower upright end 115A and an upper upright end 115B, with the hub axis HA arranged adjacent to the lower upright end 115A. The lower upright end 115A is supported for movement within the hub 158, which may comprise a hollow profile or recess defined by multiple hub housing components. In the illustrated version, the hub axis HA is arranged generally vertically between the rear arm axis RAA and the wheel axis WA.

Figure 10:
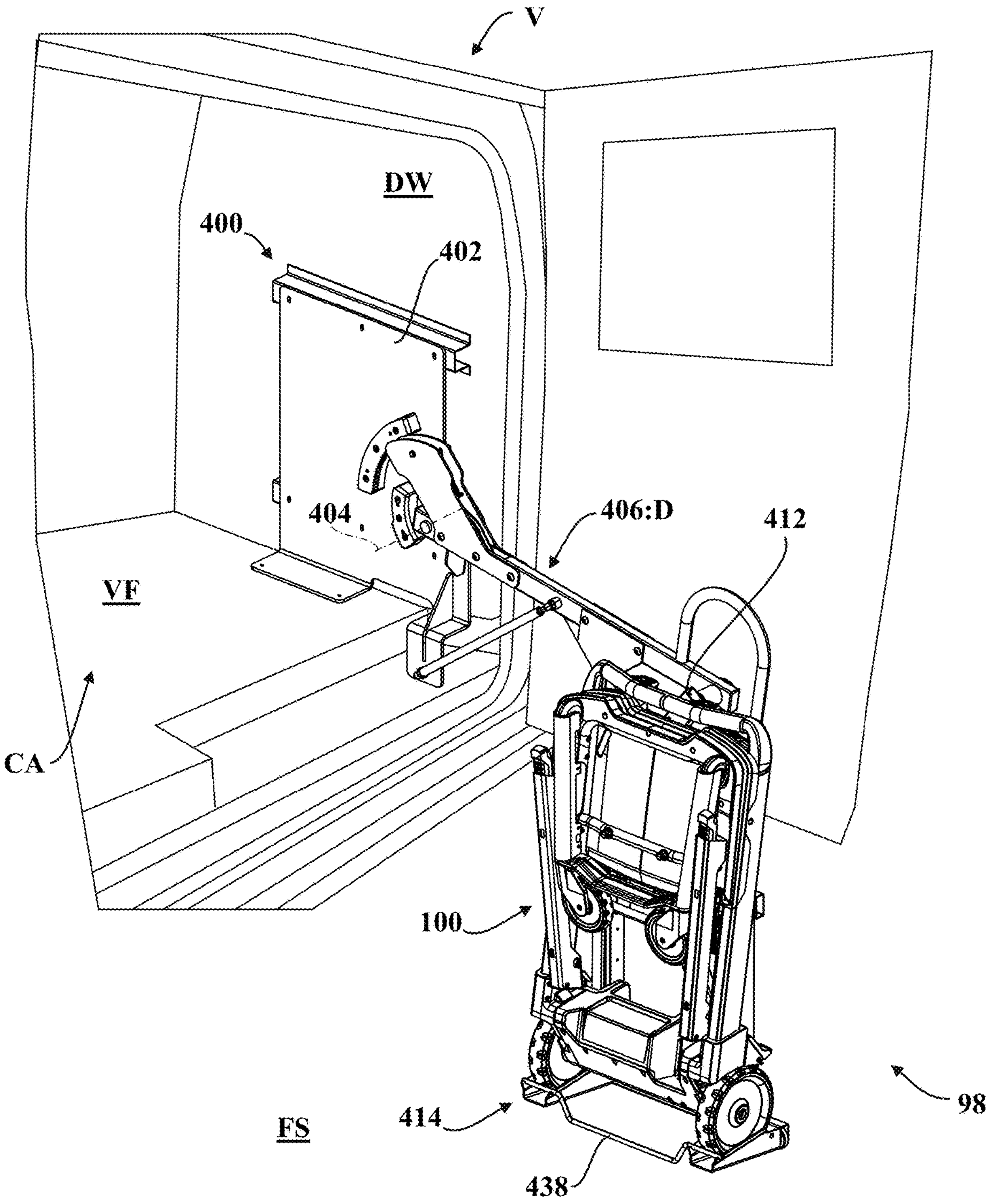
FIG. 10 is a perspective view of a loading system of the present disclosure installed in a cargo are of a vehicle, with a first arm of the loading system in a deployed state to unload a patient transport apparatus from the cargo area of the vehicle.
Figure 11A:
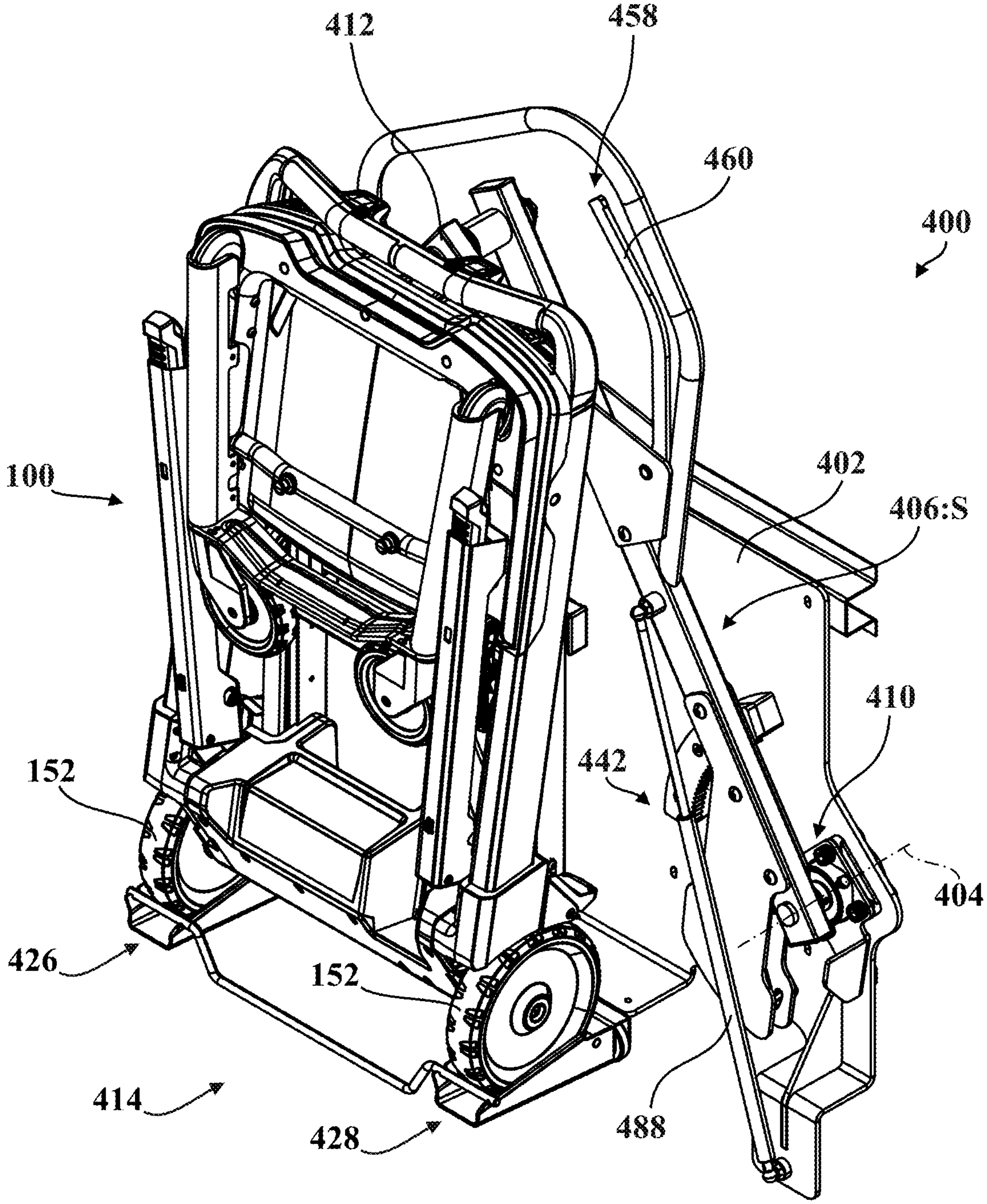
FIG. 11A is a perspective view of the loading system supporting the patient transport apparatus with the first arm in the stowed state.
Figure 11B:
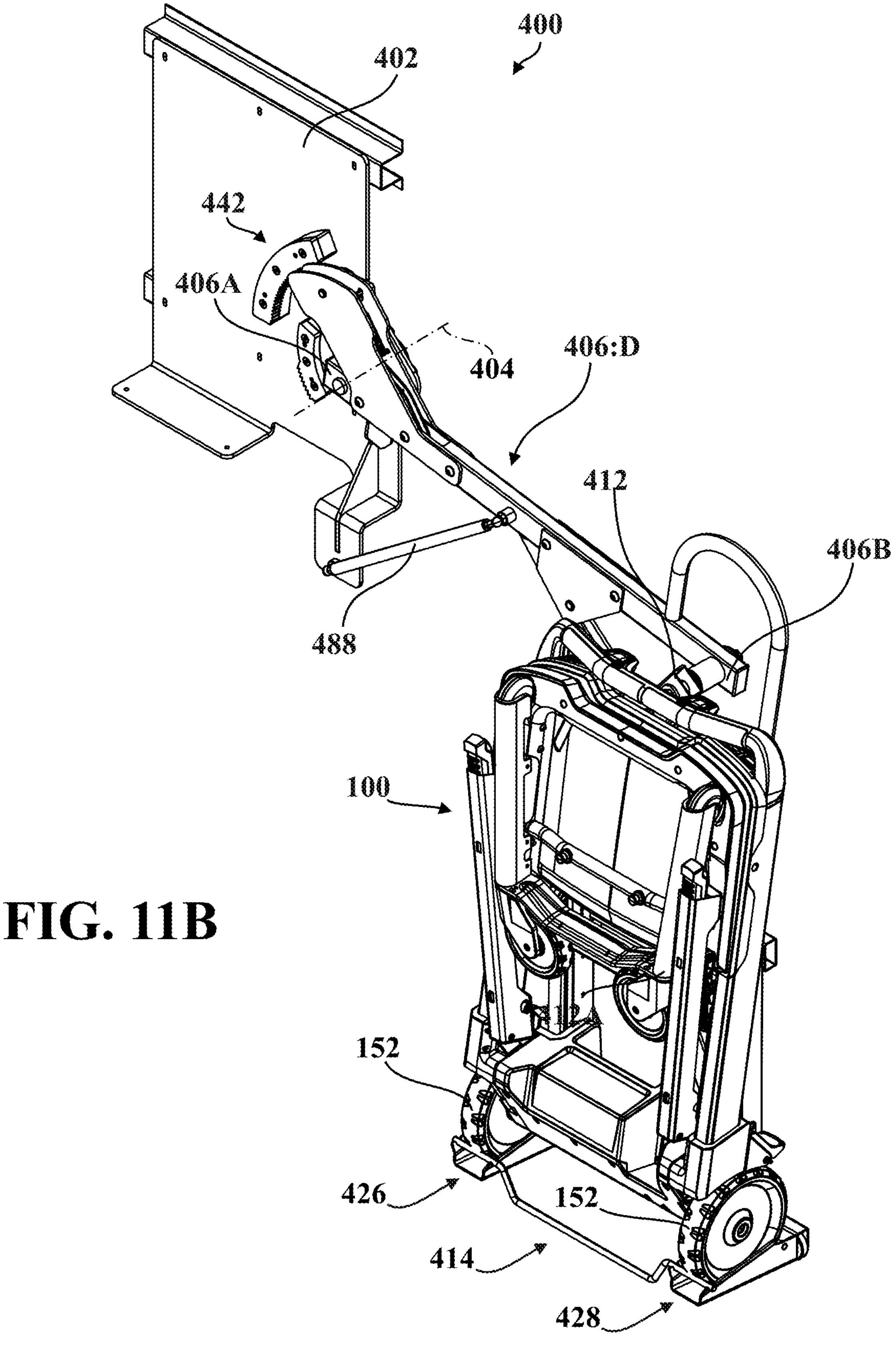
FIG. 11B is a perspective view of the loading system supporting the patient transport apparatus with the first arm in the deployed state.
Figure 12A:
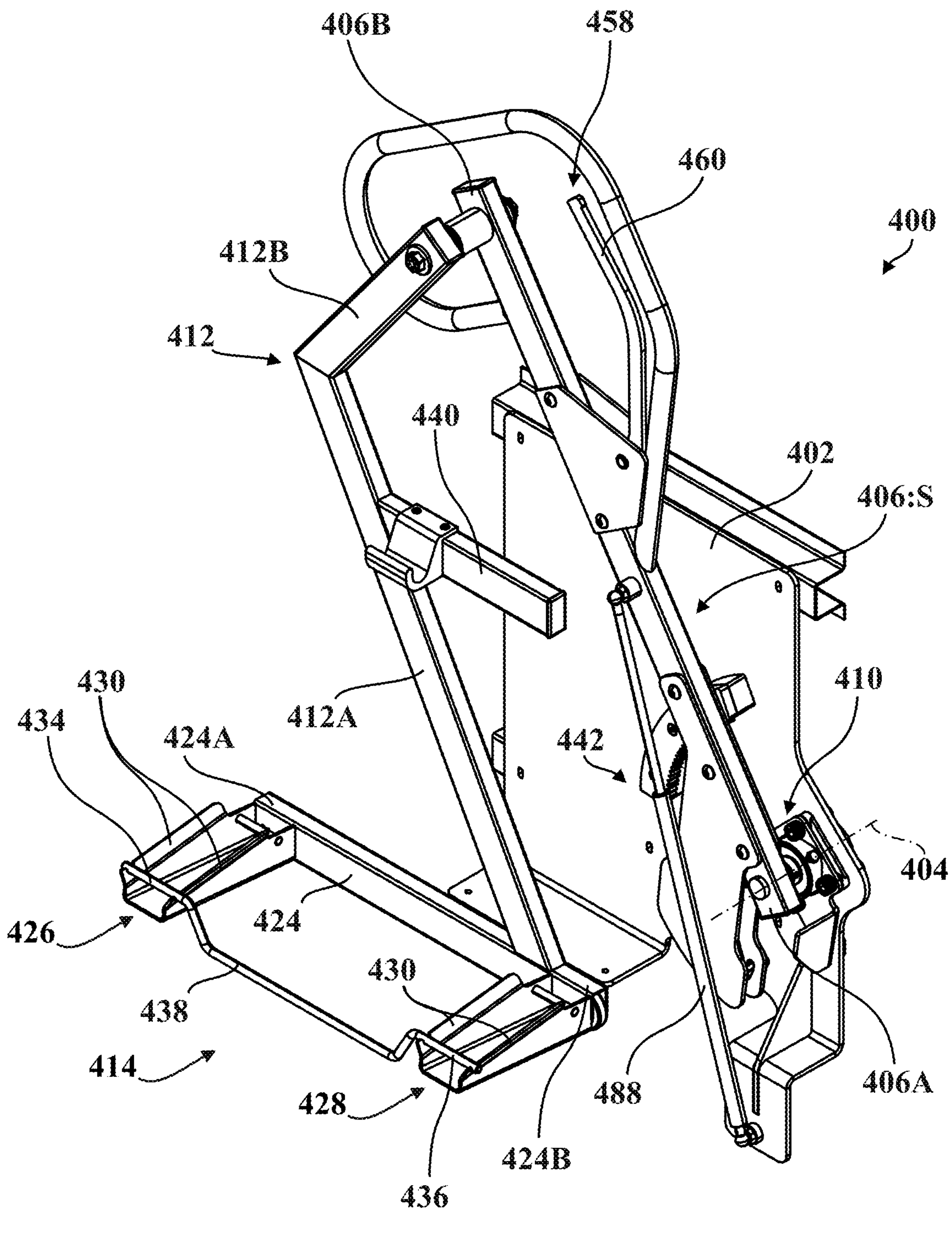
FIG. 12A is a perspective view of the loading system with the first arm in the stowed state.
Figure 12B:
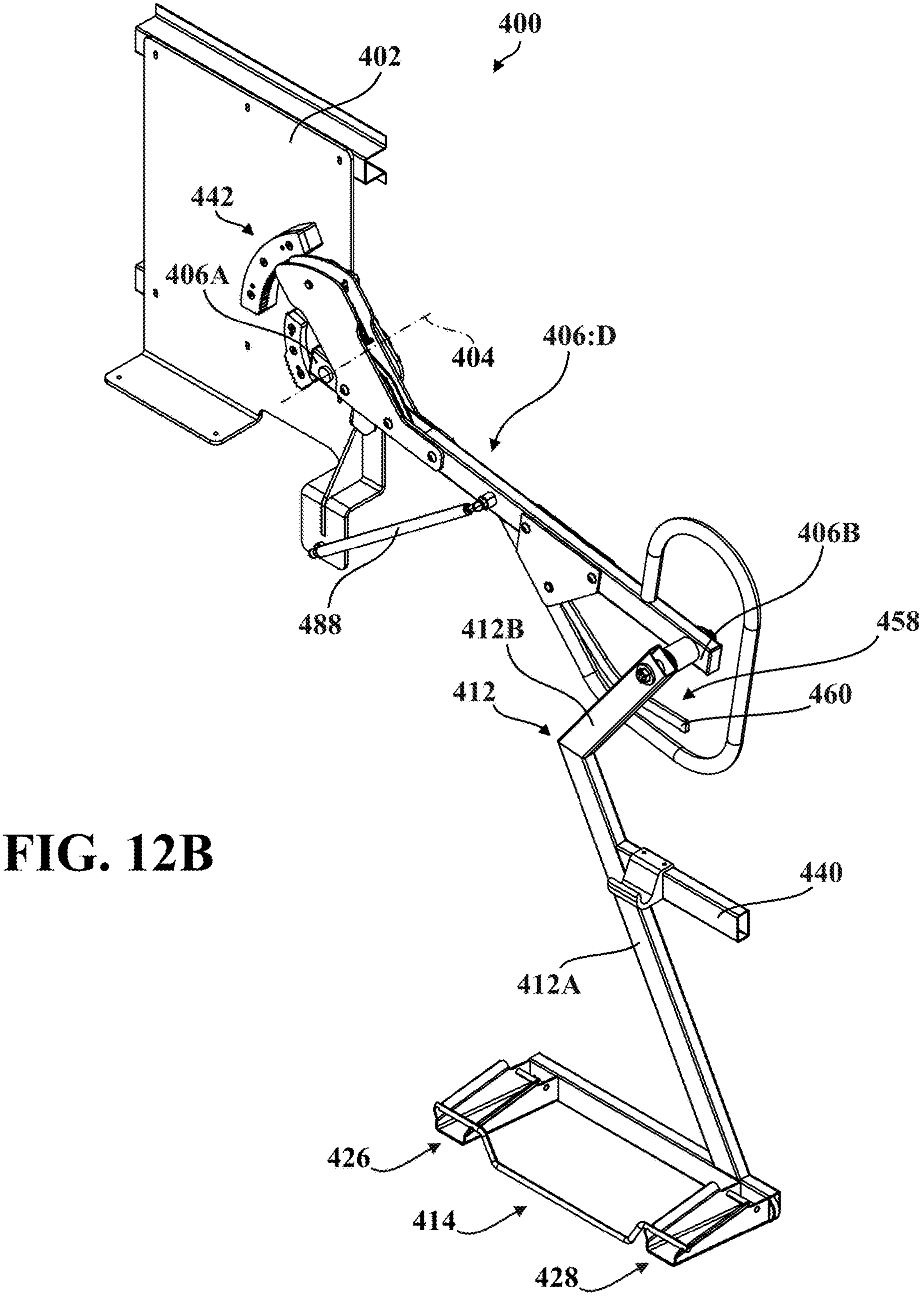
FIG. 12B is a perspective view of the loading with the first arm in the deployed state.

The rear uprights 114A, 114B may each comprise a generally hollow, extruded profile which supports various components of the patient transport apparatus 100. Referring to FIG. 10, the first rear upright 114A defines a first support channel 350A. Likewise, the second rear upright 114B may define a second support channel 350B. For example, the first and/or second rear uprights 114A, 114B may each include a front wall 352, a rear wall 354 spaced from the front wall 352, a first lateral wall 356 extending between the front wall 352 and the rear wall 354, and a second lateral wall 358 spaced from the first lateral wall 356 and extending between the front wall 352 and the rear wall 354. Cumulatively, the front wall 352, the rear wall 354, and the first lateral wall 356, and the second lateral wall 358 may define the first and/or second support channel 350A, 350B. In some examples, the first and/or second support channel 350A, 350B may define a rounded rectangular profile.

As best shown in FIGS. 6A and 6B, the handle assembly 132 includes an upper grip 136. The upper grip 136 is operatively attached to a first extension post 138A. The first extension post 138A is disposed within the first support channel 350A of the first rear upright 114A. Accordingly, the first extension post 138A supports the upper grip 136 for movement of the handle assembly 132 between a collapsed position 132A where the upper grip is disposed adjacent to the user interface (see FIG. 1) and an extended position 132B where the upper grip is spaced from the user interface (see FIG. 2). In some examples, the upper grip 136 may extend between a first upper grip end 136A and a second upper grip end 136B. The first extension post 138A may be operatively attached to the first upper grip end 136A. The handle assembly 132 may further include a second extension post 138B operatively attached to the second upper grip end 136B. Together, the first and second extension posts 138A, 138B may support the upper grip 136 for movement of the handle assembly 132 between the collapsed position 132A and the extended position 132B. The first and/or second extension posts 138A, 138 may define a rounded rectangular profile corresponding to the profile of the first and/or second support channel 350A, 350B.

In the representative version illustrated herein, the upper grip 136 generally comprises a first hand grip region 144 arranged adjacent to the first extension posts 138A, and a second hand grip region 146 arranged adjacent to the second extension post 138B, each of which may be engaged by the caregiver to support the patient transport apparatus 100 for movement, such as during patient transport up or down stairs ST (see FIGS. 9A-9F). The activation input controls 214 may be arranged in various locations about the patient transport apparatus. In the illustrated versions, a first activation input control 222 is disposed adjacent to the first hand grip region 144 of the handle assembly 132, and a second activation input control 224 is disposed adjacent to the second hand grip region 146 (best shown in FIG. 1). In the illustrated version, the user interface 204 is configured such that the caregiver can engage either of the activation input controls 222, 224 with a single hand grasping the upper grip 136 (described below) of the handle assembly 132 during use.

The activation input controls 214 may be arranged between the first and second hand grip regions 144, 146 in order to facilitate user engagement of the activation input controls 214 from either of the first and second hand grip regions 144, 146. As previously discussed, the activation input controls 214 include the first activation input control 222 and the second activation input control 224. The first activation input control 222 may be disposed adjacent the first hand grip region 144 so as to facilitate user engagement of the first activation input control 222 from the first hand grip region 144. The second activation input control 224 may be disposed adjacent to the second hand grip region 146 so as to facilitate user engagement of the second activation input control 224 from the second hand grip region 146. Here, it will be appreciated that the user can engage either of the first and second hang grip regions 144, 146 with one of their hands to support the patient transport apparatus 100 while, at the same, using that same hand to activate one of the first and second activation input controls 222, 224 (e.g., reaching with their thumb). The first activation input control 222 and the second activation input control 224 may be spaced apart by a predetermined distance (e.g., several inches) and may be wired in parallel in some versions (not shown in detail).

Referring to FIGS. 10 through 24, another general aspect of the present disclosure includes a loading system 400 for loading and unloading the patient transport apparatus 100 from a cargo area CA of a vehicle V. It should be appreciated that the loading system 400 and the patient transport apparatus 100 may be included cumulatively as part of a greater patient transport system 98 for providing patient care.

As best shown in FIG. 10, the loading system 400 includes a brace 402 configured to be mounted to the cargo area CA of the vehicle V. The brace 402, for example, may comprise a metal plate coupled to a divider wall DW between the cargo area CA of the vehicle V and the passenger cabin of the vehicle V. Other configurations are contemplated. Additionally, damping elements may be interposed between the brace 402 and the cargo area CA to reduce noise/vibration. Generally, the brace 402 is arranged in proximity to a threshold of the vehicle V (such as a side door or rear lift gate). The brace 402 defines a mounting axis 404.

The loading system 400 also includes a first arm 406. The first arm 406 is supported for rotation relative to the mounting axis 404 between a stowed state 406S and a deployed state 406D. In the stowed state 406S, the first arm 406 may be disposed within the cargo area CA of the vehicle V (best shown in FIG. 24), and in the deployed state 406D, the first arm 406 may extend from the cargo area CA of the vehicle to unload the patient transport apparatus 100 from the cargo area CA of the vehicle V (best shown in FIG. 10). As described in further detail below, the first arm 406, a second arm 412, and a receptacle 414 cooperate to load and/or unload the patient transport apparatus 100 from the cargo area CA of the vehicle V.

The first arm 406 may extend between a bottom end portion 406A operatively attached to the brace 402 and a top end portion 406B. A variety of configurations for supporting the first arm 406 for rotation relative to the mounting axis 404 are contemplated. For example, the bottom end portion 406A of the first arm 406 may define a bottom projection 408 configured to be operatively attached to the brace 402 to support the first arm 406 for rotation about the mounting axis 404. In this example, the loading system 400 may further include a bearing assembly 410 interposed between the brace 402 and the bottom projection 408 of the first arm 406. Here, the bearing assembly 410 may be shaped to receive the bottom projection 408 of the first arm 406 to support the first arm 406 for rotation about the mounting axis 404. In some examples, the bearing assembly 410 may include ball bearings, journal bearings, or the like. Other configurations are contemplated.

With continued reference to FIGS. 10 through 24, the loading system 400 further includes a second arm 412 coupled to the first arm 406 for pivotal movement relative to the first arm 406, and a receptacle 414 coupled to the second arm 412 (described in further detail below). The second arm 412 may be operatively attached to the top end portion 406B of the first arm 406. In one configuration, for example, as best shown in FIG. 19, the top end portion 406B of the first arm 406 may include bushings 416 arranged to receive a second arm connection projection 418 extending from the second arm 412. Here, a bolt 420 may be disposed through both the second arm connection projection 418 and the top end portion 406B to couple the second arm 412 to the first arm 406 for pivotal movement relative to the first arm 406. Other configurations of coupling the second arm 412 to the first arm 406 for pivotal movement relative to the first arm 406 are contemplated. As shown in the transition between FIGS. 11A and 11B, as well as the transition between FIGS. 12A and 12B, the second arm 412 is configured to pivot relative to the first arm 406 as the first arm 406 moves between the stowed state 406S and the deployed state 406D such that the receptacle 414 remains level to support the patient transport apparatus 100, as described in further detail below.

Figure 23:
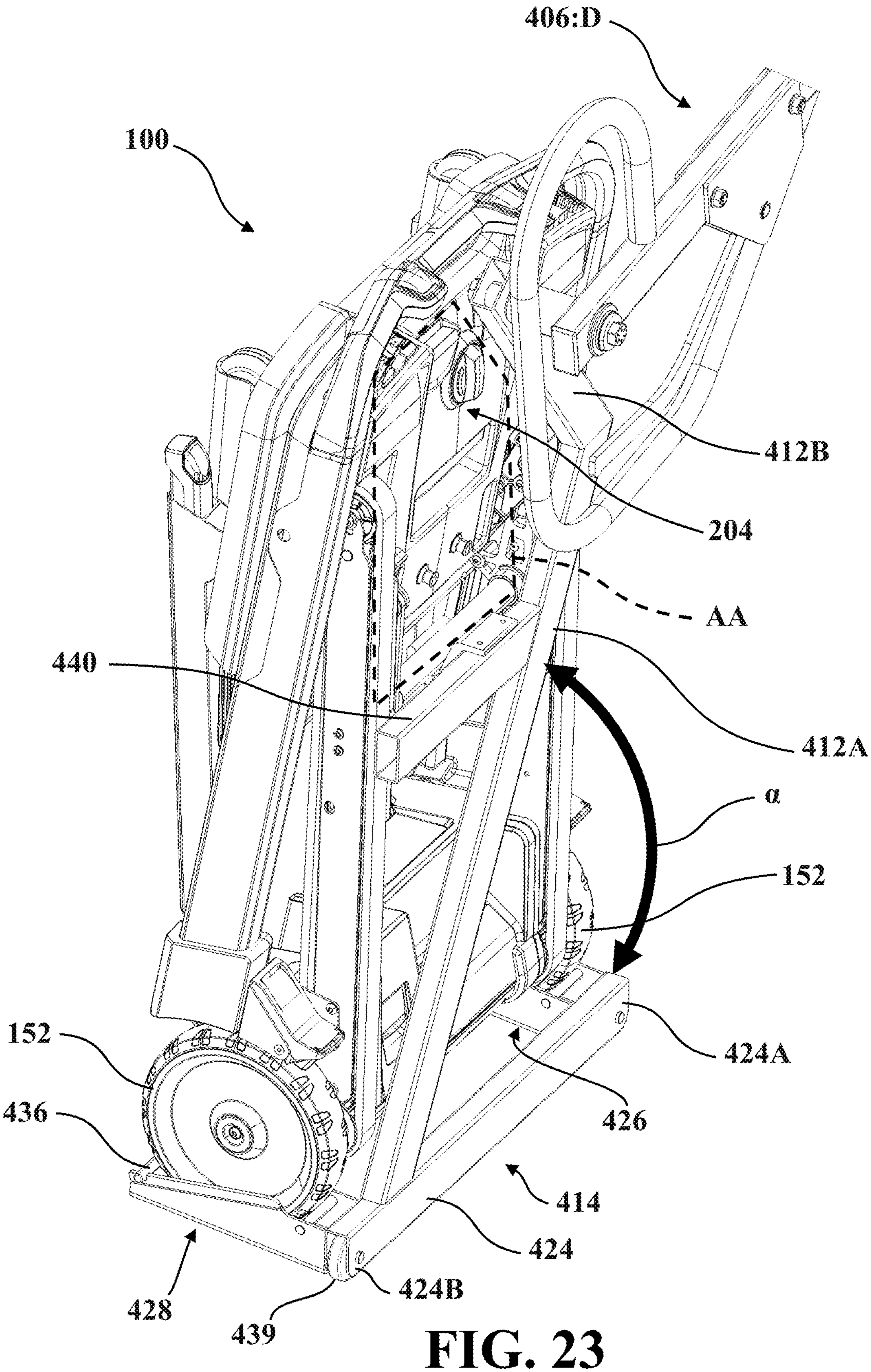
FIG. 23 is a rear perspective view of the loading system supporting the patient transport apparatus.

As best shown in FIG. 23, in some examples, the second arm 412 may include a connection portion 412A extending from the receptacle 414 at an acute angle α to define an access area AA (illustrated in phantom) sized to permit user engagement with the user interface 204 of the patient transport apparatus 100, and an intermediate portion 412B extending between the connection portion 412A and the top end portion 406B of the first arm 406. It should be appreciated that the connection portion 412A and the intermediate portion 412B may be sized and arranged relative to each other such that the cumulative center of gravity of the second arm 412 and the receptacle 414 are aligned substantially vertically with the top end portion 406B of the first arm 406, and, thus, the receptacle 414 remains parallel with the floor surface as the first arm 406 moves between the stowed state 406S and the deployed state 406D. Additionally, in some versions, again referring to FIG. 19, the loading system 400 may further include a friction member 422 interposed between the top end portion 406B of the first arm 406 and the second arm 412 to at least partially inhibit rotation of the second arm 412 relative to the top end portion 406B of the first arm 406. For example, the friction member 422 may inhibit excessive swinging of the receptacle 414 as the first arm 406 moves between the stowed state 406S and the deployed state 406D. The friction member 422 may be a wave spring or the like.

As best shown in FIG. 10, the receptacle 414 is configured to receive and support the patient transport apparatus 100 for movement relative to the cargo area CA of the vehicle V as the first arm 406 moves between the stowed state 406S and the deployed state 406D. In some versions, such as best shown in FIGS. 20-23, the receptacle 414 may include a base member 424 extending between a first end 424A and a second end 424B. The receptacle 414 may further include a first wheel tray 426 attached to the first end 424A of the base member 424, and a second wheel tray 428 attached to the second end 424B of the base member 424. Here, the first wheel tray 426 and the second wheel tray 428 are each arranged to receive a respective wheel 152 of the patient transport apparatus 100 to support the patient transport apparatus 100 for movement relative to the cargo area CA of the vehicle V as the first arm 406 moves between the stowed state 406S and the deployed state 406D.

Figure 22:
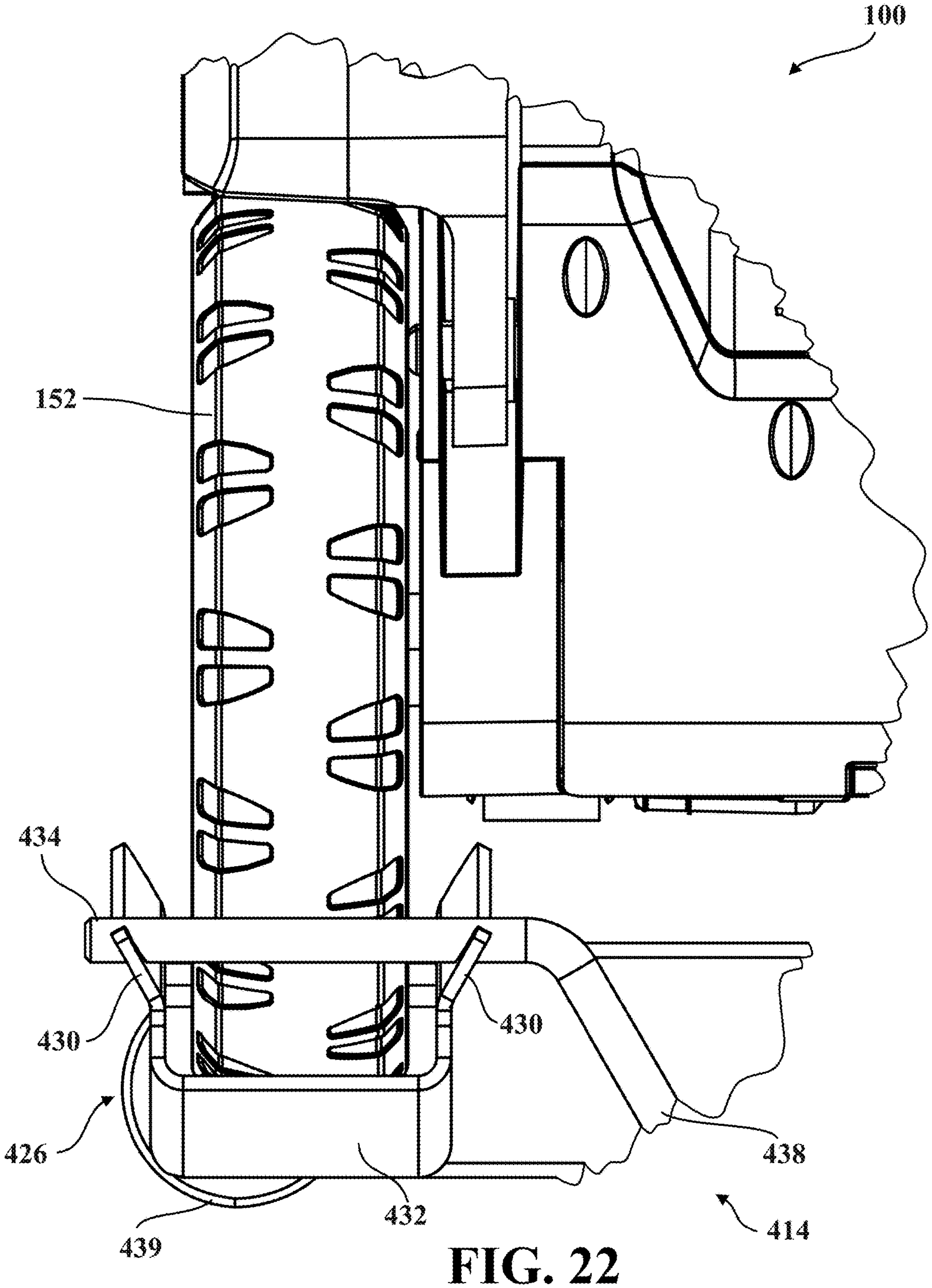
FIG. 22 is an enlarged front view of the loading system illustrating a wheel of the patient transport apparatus supported by a wheel tray of the receptacle.

Referring to FIG. 22, each of the first wheel tray 426 and the second wheel tray 428 may include lateral walls 430 to constrain lateral movement of the respective wheels 152 of the patient transport apparatus 100. Additionally, referring to FIG. 22, in some versions, each of the first wheel tray 426 and the second wheel tray 428 may include a tapered floor portion 432 angled toward the base member 424 (i.e., upward from the floor surface) to constrain fore and aft movement of the respective wheels 152 of the patient transport apparatus 100. The lateral walls 430 and/or the tapered floor portion 432 serve to retain the patient transport apparatus 100 within the receptacle 414 such that the receptacle 414 supports the patient transport apparatus 100 for movement relative to the cargo area CA of the vehicle V as the first arm 406 moves between the stowed state 406S and the deployed state 406D.

Figure 21:
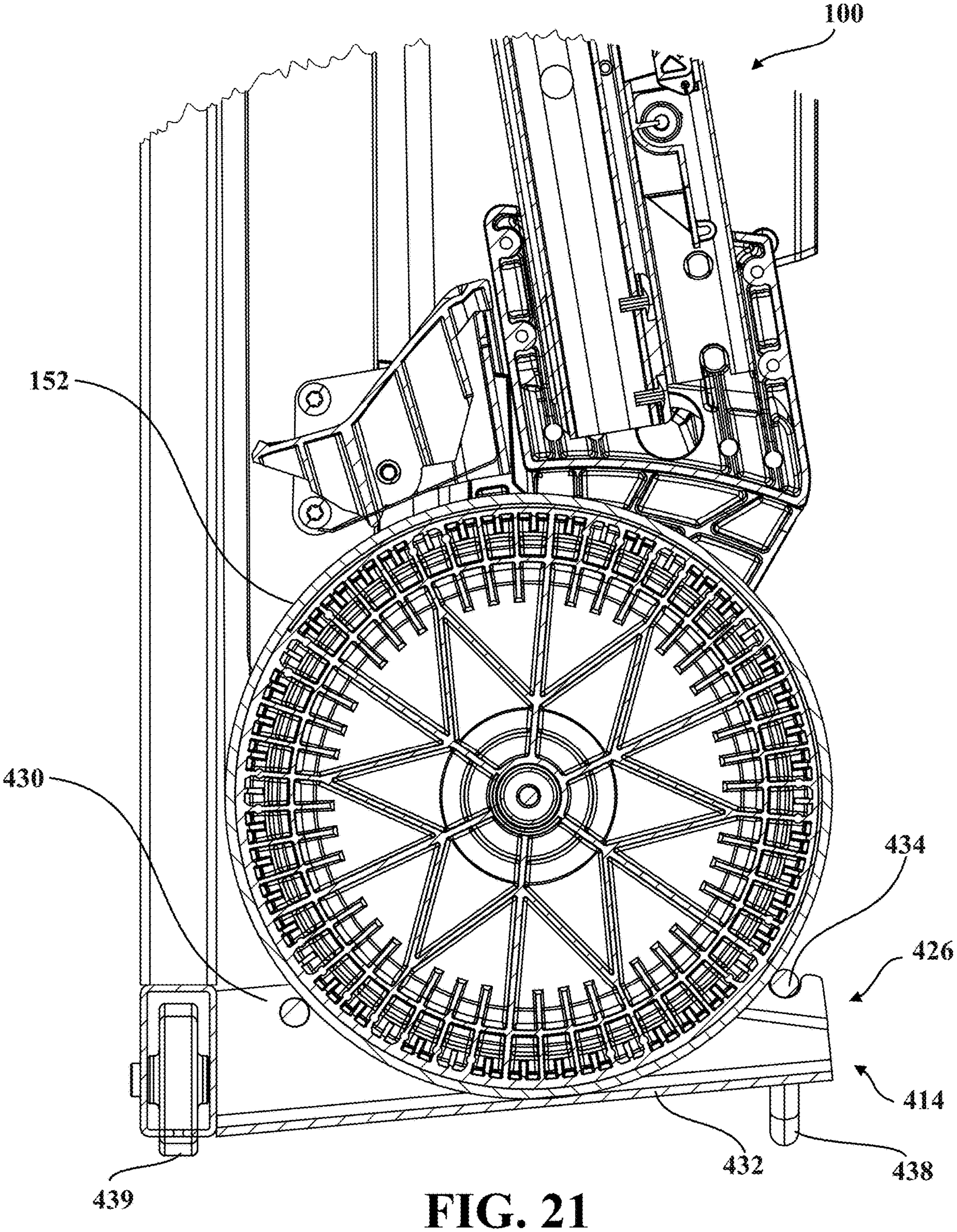
FIG. 21 is a cross-sectional representation taken through line A-A of FIG. 20 to reveal a wheel of the patient transport apparatus supported by a receptacle of the loading system.

Furthermore, in some versions, the receptacle 414 may further include a first wheel chock member 434 coupled to the first wheel tray 426 to constrain the respective wheel 152 of the patient transport apparatus 100 relative to the first wheel tray 426. Likewise, the receptacle 414 may further include a second wheel chock member 436 coupled to the second wheel tray 428 to constrain the respective wheel 152 of the patient transport apparatus 100 relative to the second wheel tray 428. Here, the first wheel chock member 434 and the second wheel chock member 436 are realized as rods coupled to and extending between the lateral walls 430. However, other configurations are contemplated. For example, in some versions, the first wheel chock member 434 and the second wheel chock member 436 may be realized as other shapes (e.g., as a wedge) and/or be removably coupled to the first wheel tray 426 and the second wheel tray 428, respectively. In some versions, as best shown in FIG. 10, the receptacle 414 may also further include a step member 438 extending between the first wheel chock member 434 and the second wheel chock member 436. Here, the step member 438 is arranged to be stepped on by a user to inhibit movement of the receptacle 414 upward relative to a floor surface FS where the first arm 406 is in the deployed state 406D. Additionally, as best shown in FIGS. 21 and 22, the receptacle 414 may also include floor rollers 439 arranged to engage a floor surface to allow the receptacle 414 to move laterally along the floor surface as the first arm 406 moves toward the deployed state 406D.

In some examples, the receptacle 414 may be configured to receive and support the patient transport apparatus 100 in either the chair configuration CC or the stowed configuration WC. In other words, the receptacle 414 may be configured to receive and support the patient transport apparatus 100 where the track assembly 154 is in the retracted position 154A. In some versions, such as shown in FIG. 23, the second arm 412 (particularly the connection portion 412A) may include a support projection 440 arranged to abut the patient transport apparatus 100 (e.g., the track assembly 154 of the patient transport apparatus 100) to align the patient transport apparatus 100 with the receptacle 414.

As best shown in FIGS. 13 through 18D, the loading system 400 also includes a ratchet assembly 442 interposed between the brace 402 and the first arm 406 to selectively permit motion of the first arm 406 between the stowed state 406S and the deployed state 406D. The ratchet assembly 442 may include a pawl 444. The pawl 444 may be supported for pivotal movement about a pawl axis 446 between a locked state 444L (best shown in FIGS. 18A and 18D) and an unlocked state 444U (best shown in FIGS. 18B and 18C). For example, referring to FIG. 14, the pawl 444 may be supported for pivotal movement about the pawl axis 446 by the first arm 406. Referring to Figured 18A through 18D, the pawl 444 may include a pawl body 448, a first pawl tooth 450 extending from the pawl body 448 in a first direction D1, and a second pawl tooth 452 extending from the pawl body 448 in a second direction D2, opposite the first direction D1. The ratchet assembly 442 may also include a first plurality of teeth 454 arranged for engagement with the first pawl tooth 450 where the pawl 444 is in the locked state 444L and the first arm 406 is in the stowed state 406S (shown in FIG. 18A). The ratchet assembly 442 may also include a second plurality of teeth 456 spaced from the first plurality of teeth 454. The second plurality of teeth 456 may be arranged for engagement with the second pawl tooth 452 where the pawl 444 is in the locked state 444L and the first arm 406 is in the deployed state 406D (shown in FIG. 18D). Accordingly, in the ratchet assembly 442 of the present configuration, the first pawl tooth 450 engages the first plurality of teeth 454 to retain the first arm 406 in the stowed state 406S, and the second pawl tooth 452 engages the second plurality of teeth 456 to retain the first arm 406 in the deployed state 406D.

Figure 18A:
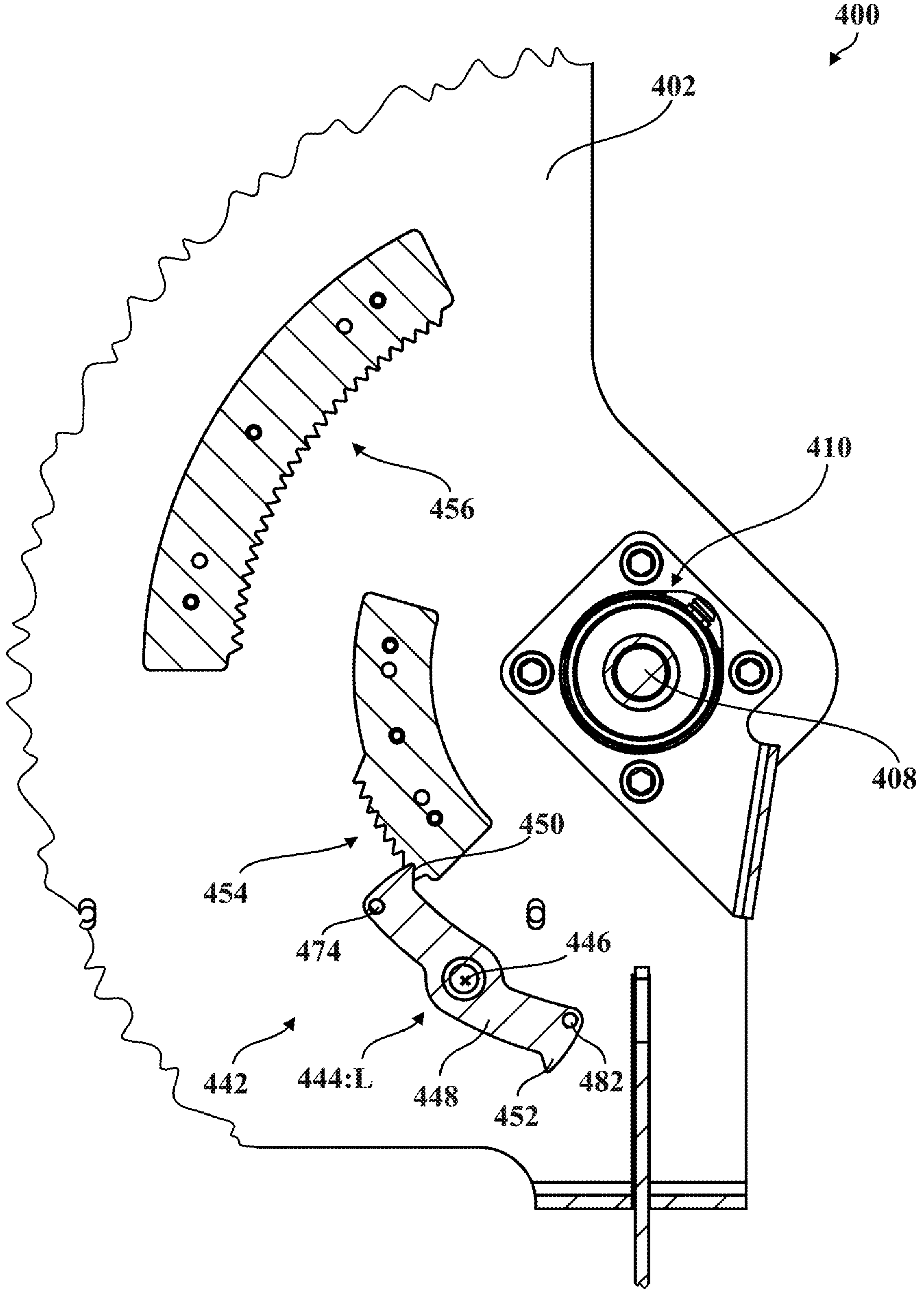
FIG. 18A is a cross-sectional representation taken through the pawl and a first plurality of teeth and a second plurality of teeth, with the pawl in a locked state such that a first pawl tooth is engaged with the first plurality of teeth.
Figure 18B:
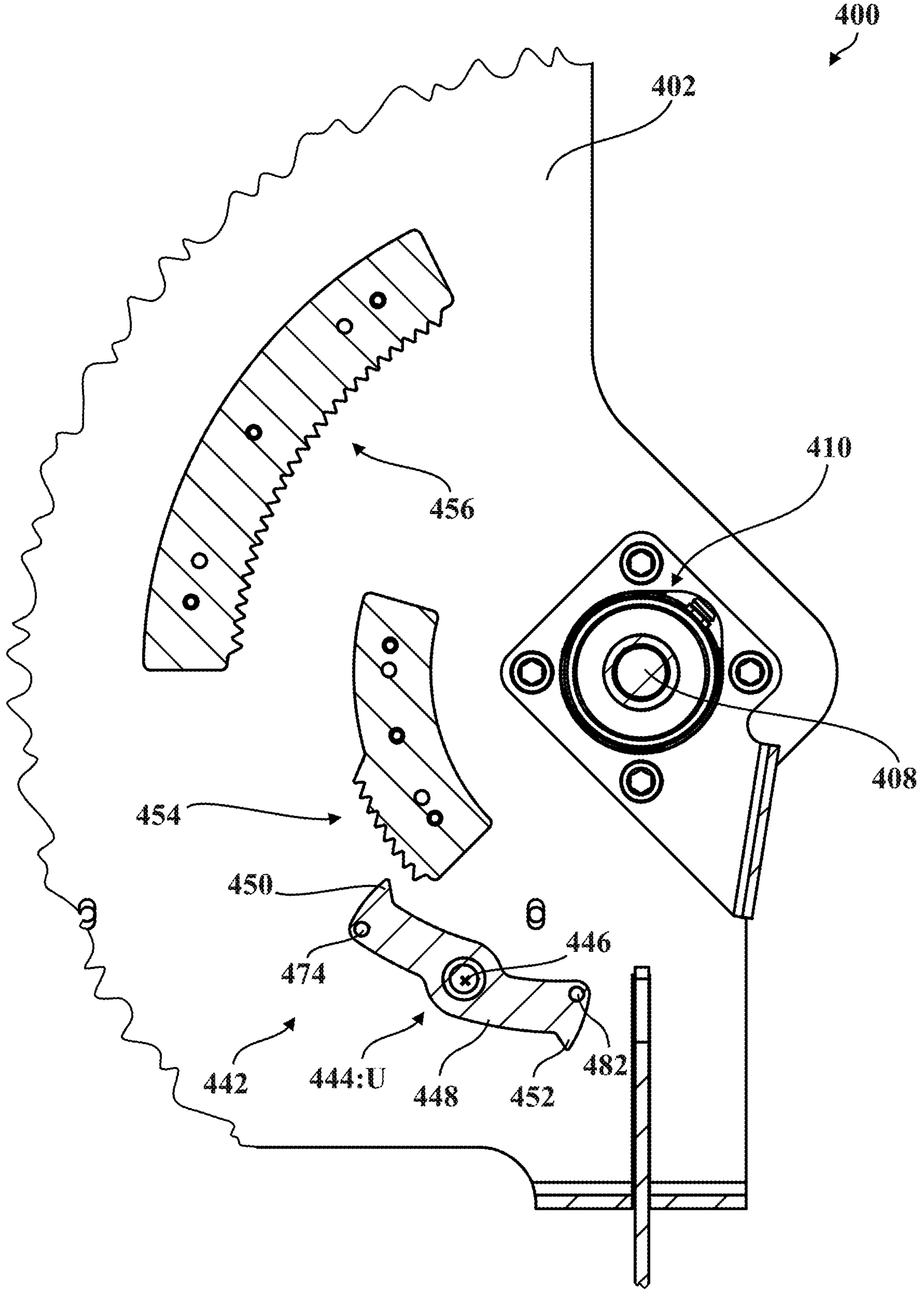
FIG. 18B is a cross-sectional representation taken through the pawl and the first plurality of teeth and the second plurality of teeth, with the pawl in an unlocked state such that the first pawl tooth is spaced from the first plurality of teeth.
Figure 18C:
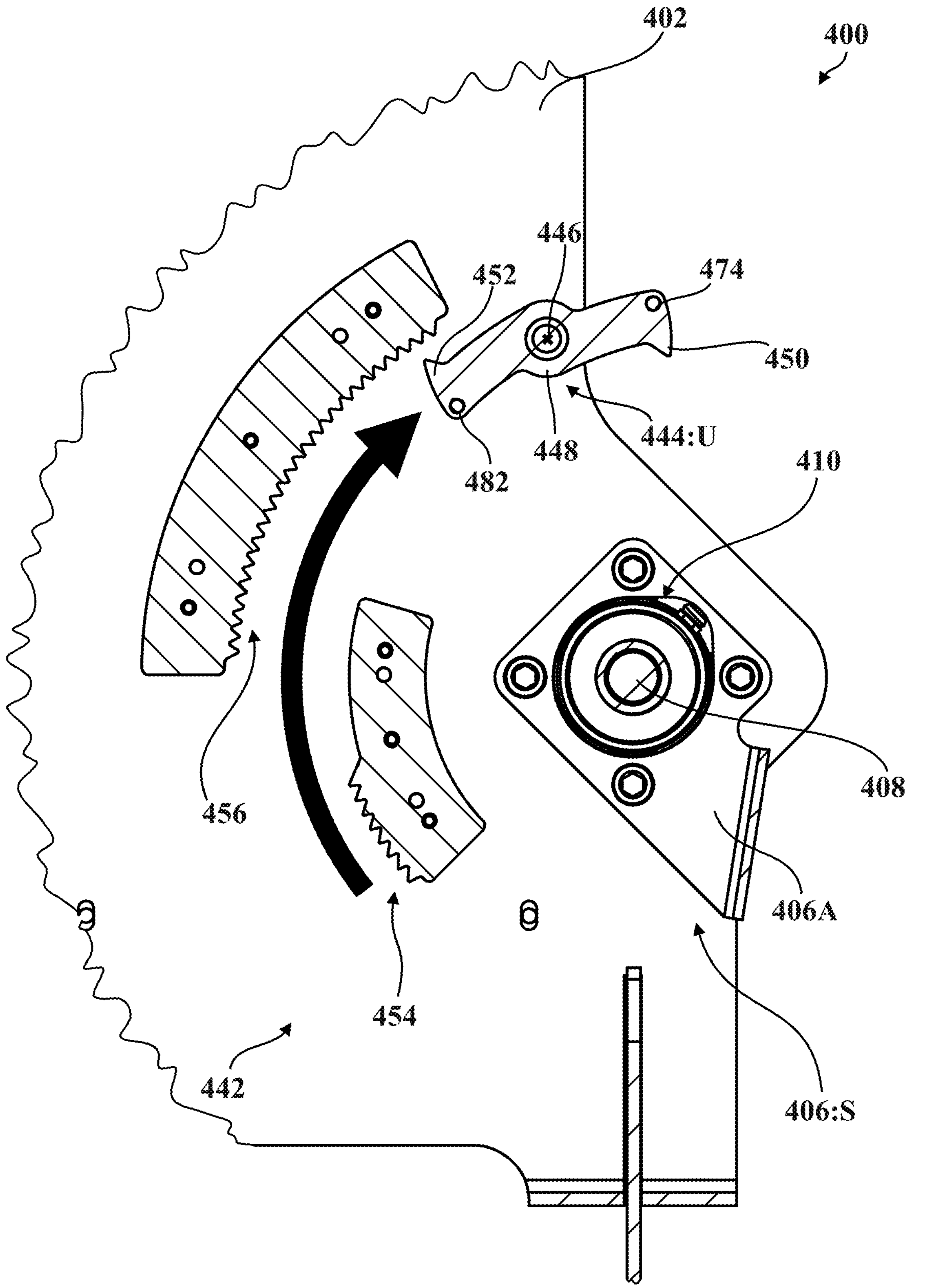
FIG. 18C is a cross-sectional representation taken through the pawl and the first plurality of teeth and the second plurality of teeth, with the pawl in an unlocked state such that the second pawl tooth is spaced from the second plurality of teeth.
Figure 18D:
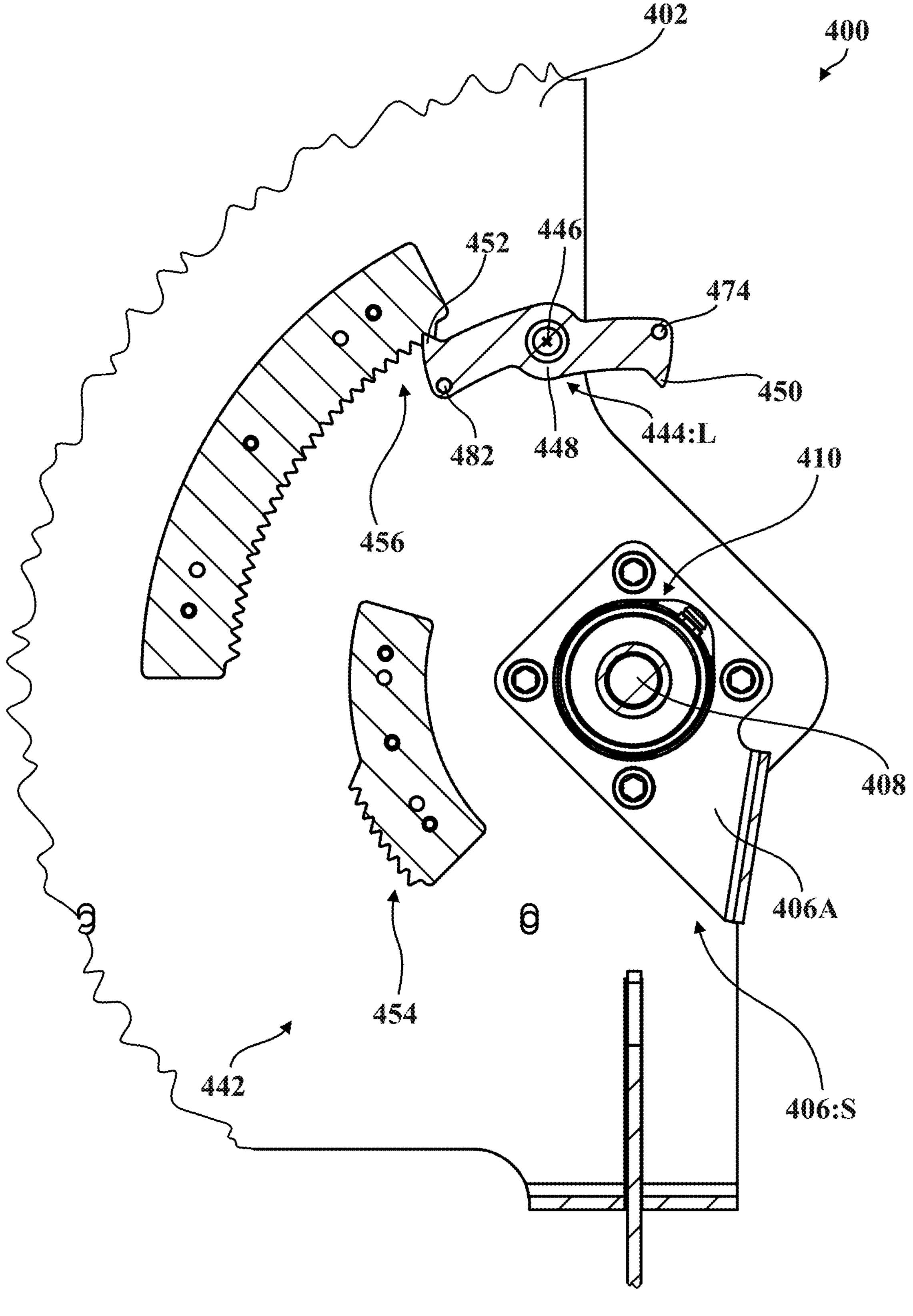
FIG. 18D is a cross-sectional representation taken through the pawl and the first plurality of teeth and the second plurality of teeth, with the pawl in a locked state such that the second pawl tooth is engaged with the second plurality of teeth.
Figure 19:
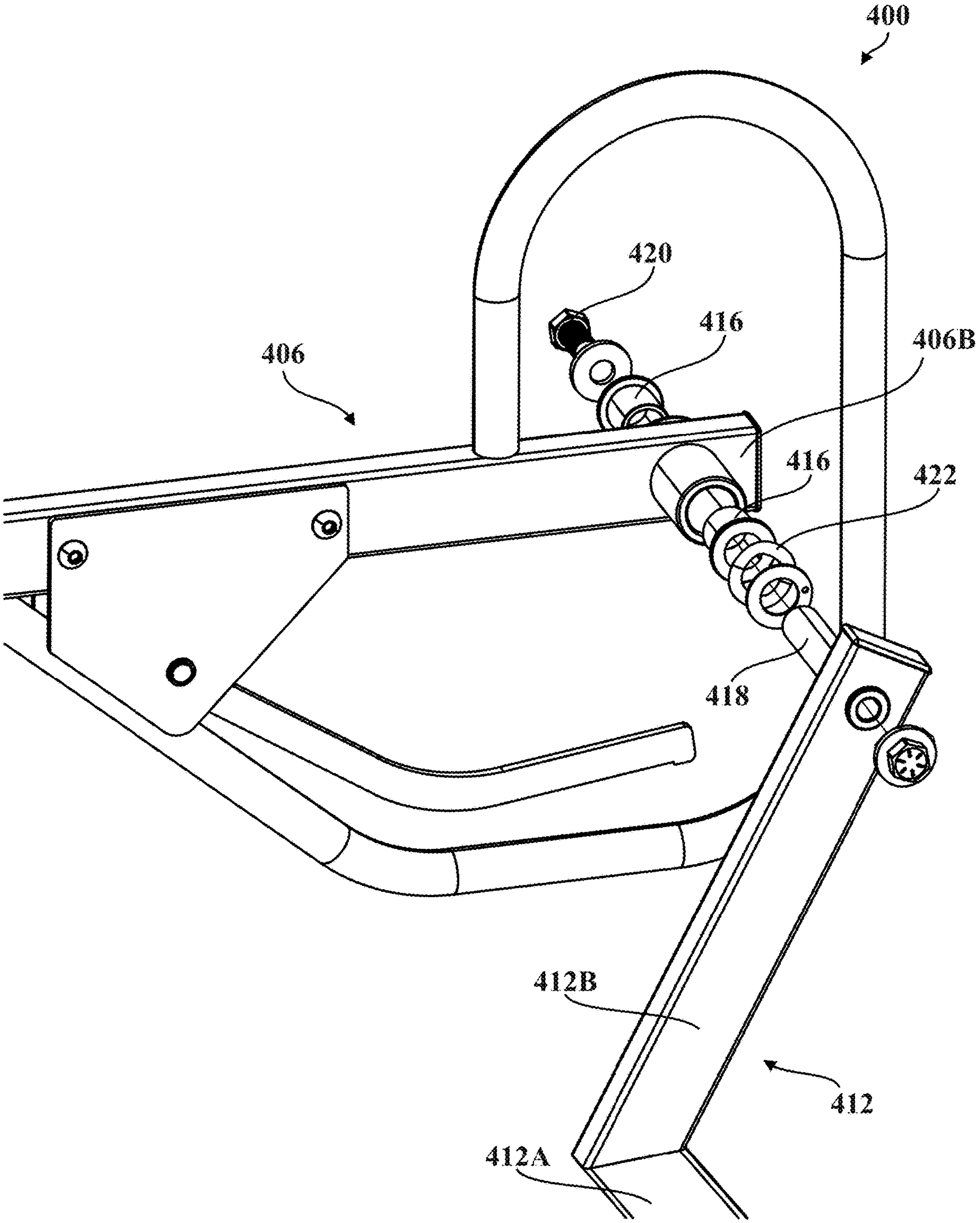
FIG. 19 is an exploded view illustrating the connection of the first arm to a second arm.
Figure 20:
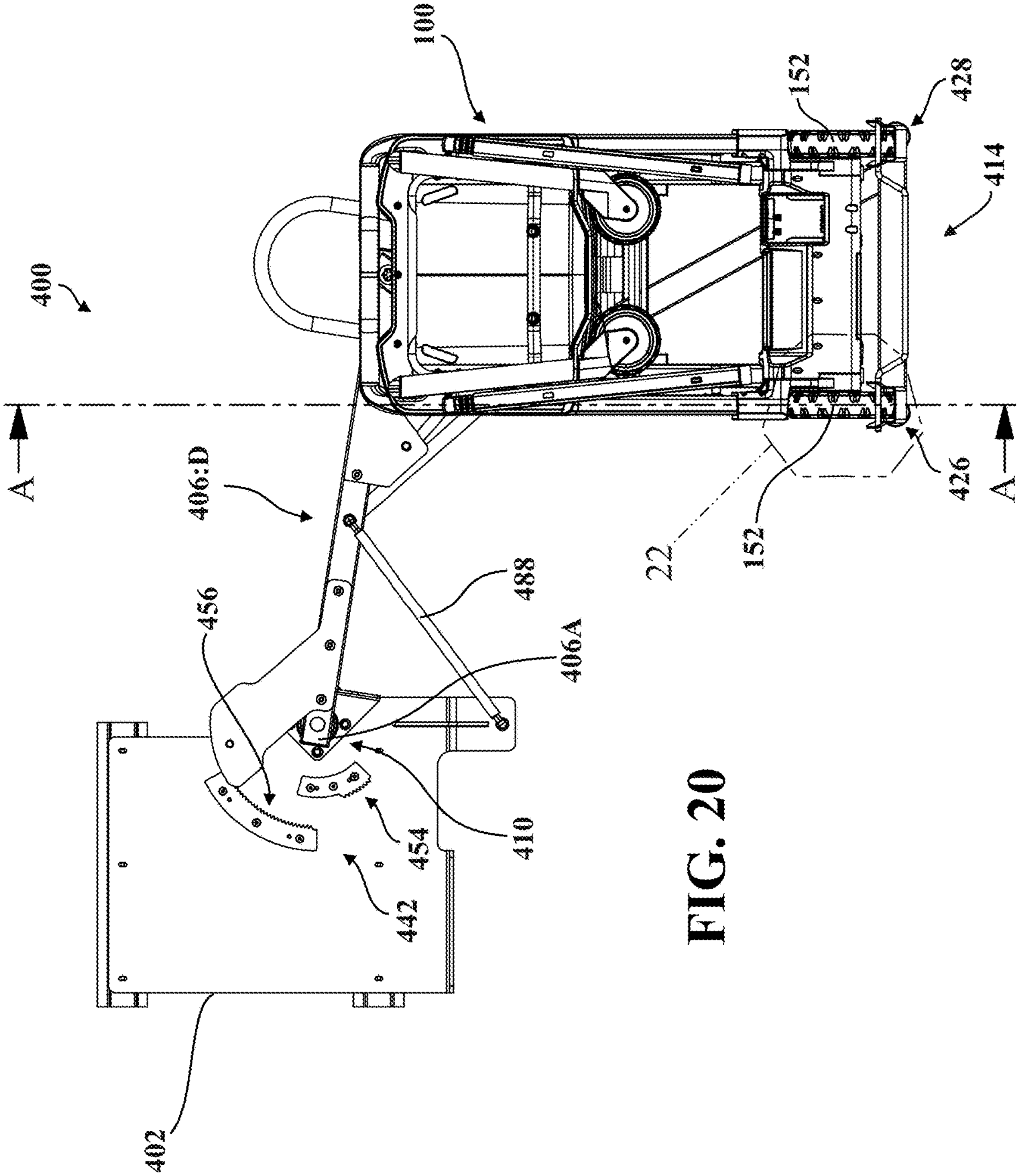
FIG. 20 is a front view of the loading system supporting the patient transport apparatus with the first arm in the deployed state.

With continued reference to FIGS. 18A and 18D, the first plurality of teeth 454 and the second plurality of teeth 456 may each be operatively attached to the brace 402. For example, the first plurality of teeth 454 and the second plurality of teeth 456 may be fastened to the brace 402, welded to the brace 402, integrally formed with the brace 402, etc. As described above, the second plurality of teeth 456 are spaced from the first plurality of teeth 454. In some examples, the first plurality of teeth 454 and the second plurality of teeth 456 may be arranged to face different directions. For example, referring to FIGS. 18A through 18D, in the illustrated version, the first pawl tooth 450 extends toward the mounting axis 404, and the first plurality of teeth 454 extend away from the mounting axis 404. Accordingly, the first plurality of teeth 454 are arranged to face the first pawl tooth 450 such that the first plurality of teeth 454 are arranged for engagement with the first pawl tooth 450 where the pawl 444 is in the locked state 444L and the first arm 406 is in the stowed state 406S (shown in FIG. 18A). With continued reference to FIGS. 18A through 18D, in the illustrated version, the second pawl tooth 452 extends away from the mounting axis 404, and the second plurality of teeth 456 extend toward the mounting axis 404. Accordingly, the second plurality of teeth 456 are arranged to face the second pawl tooth 452 such that the second plurality of teeth 456 are arranged for engagement with the second pawl tooth 452 where the pawl 444 is in the locked state 444L and the first arm 406 is in the deployed state 406D (shown in FIG. 18D).

As best shown in FIGS. 13 through 17D, the loading system 400 may also include a release mechanism 458 operatively attached to the pawl 444 to move the pawl 444 from the locked state 444L to the unlocked state 444U in response to user engagement to permit movement of the first arm 406 between the stowed state 406S and the deployed state 406D. The release mechanism 458 may include a release handle 460. The release handle 460 may be supported for pivotal movement relative to the first arm 406 between an engaged position 460E (best shown in FIGS. 17B and 17C) and a disengaged position 460D (best shown in FIGS. 17A and 17D). The release mechanism 458 may also include a linkage 462 supported for movement relative to the first arm 406. The linkage 462 may extend between a first end portion 462A operatively attached to the release handle 460 and a second end portion 462B operatively attached to the pawl 444. Accordingly, the linkage 462 may be configured to move the pawl 444 from the locked state 444L to the unlocked state 444U in response to the release handle 460 moving from the disengaged position 460D to the engaged position 460E.

Figure 17A:
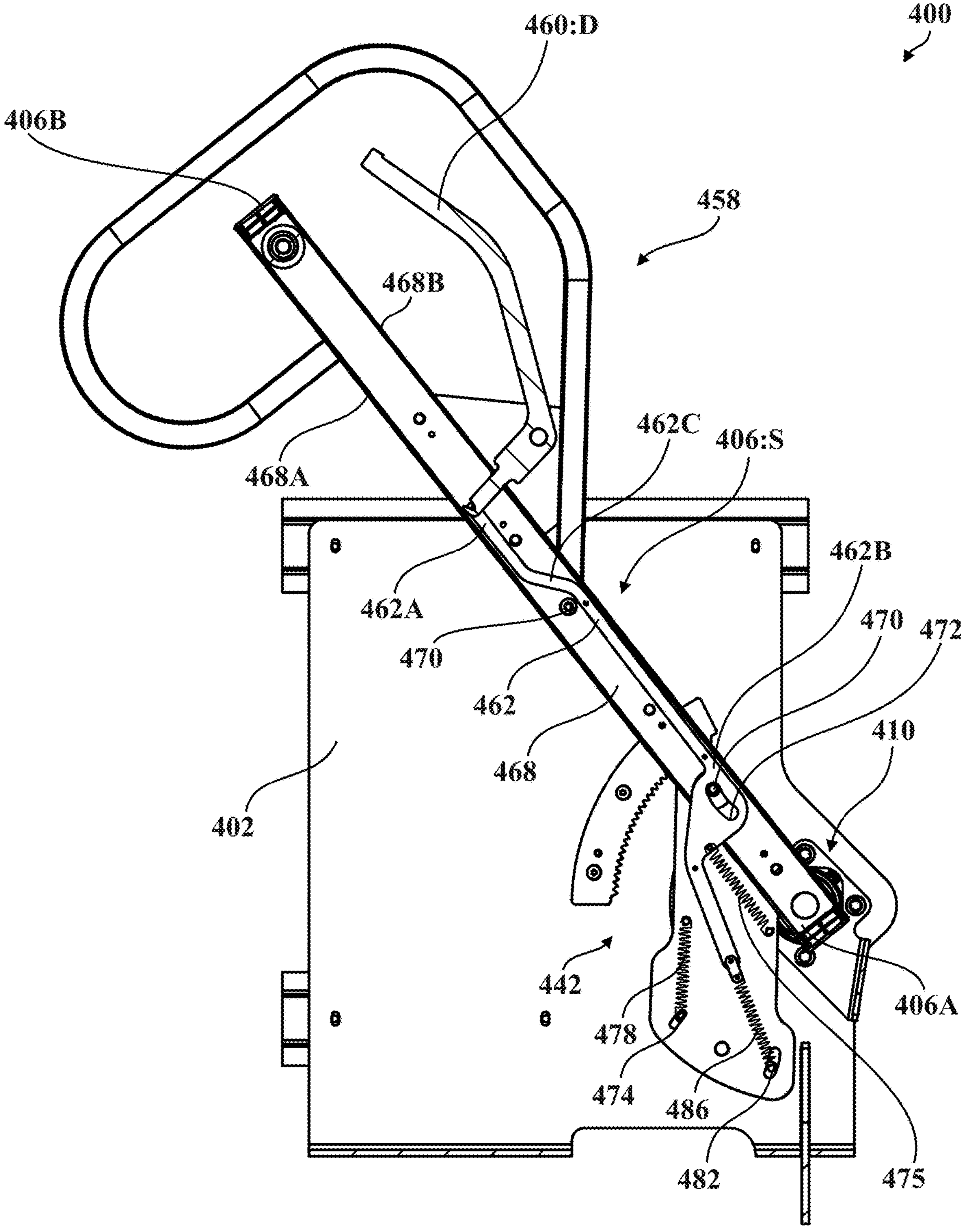
FIG. 17A is a cross-sectional representation take though the first arm in the stowed state to reveal a linkage and a release handle in a disengaged state.
Figure 17B:
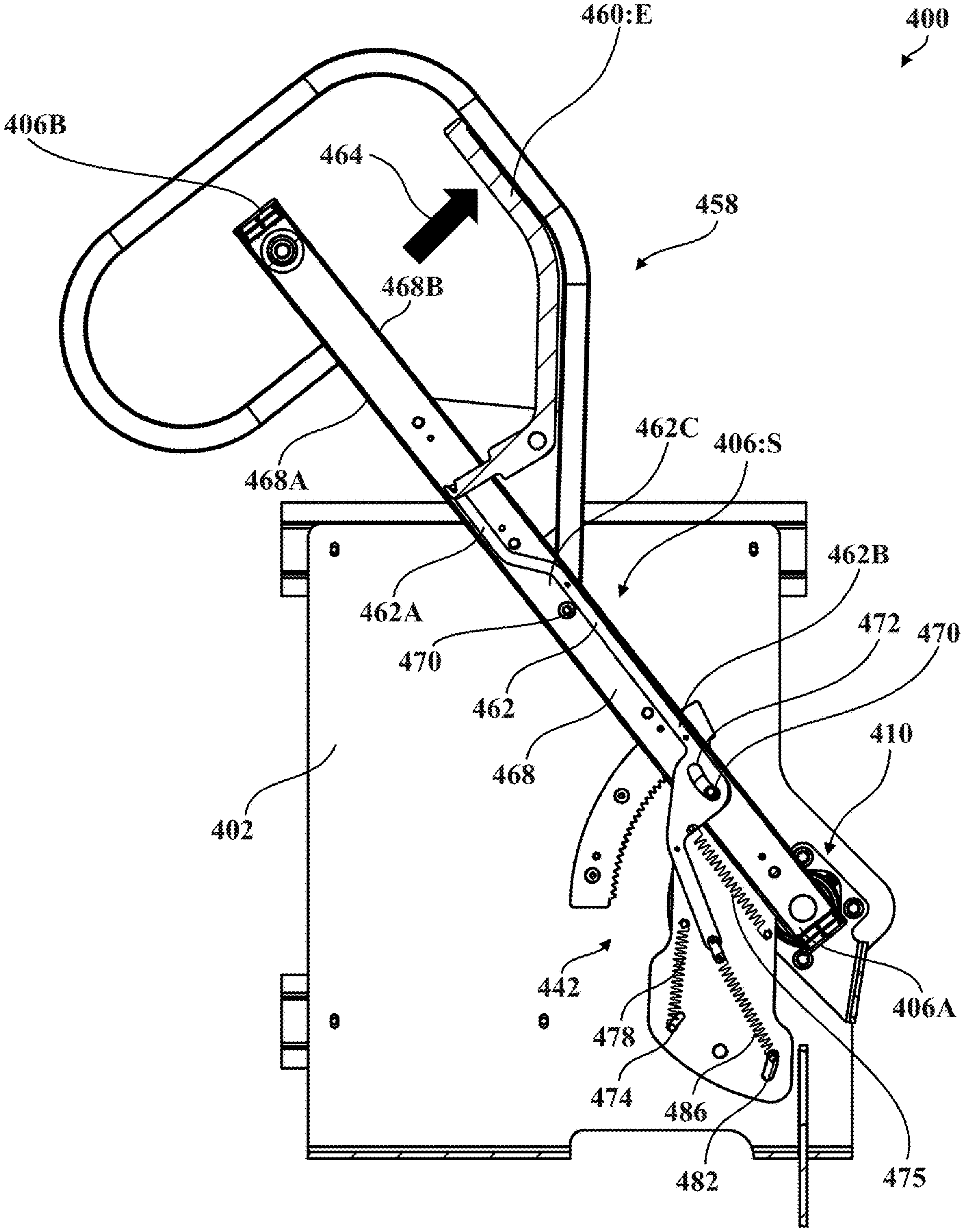
FIG. 17B is a cross-sectional representation taken though the first arm in the stowed state to reveal the linkage and the release handle in an engaged state.
Figure 17C:
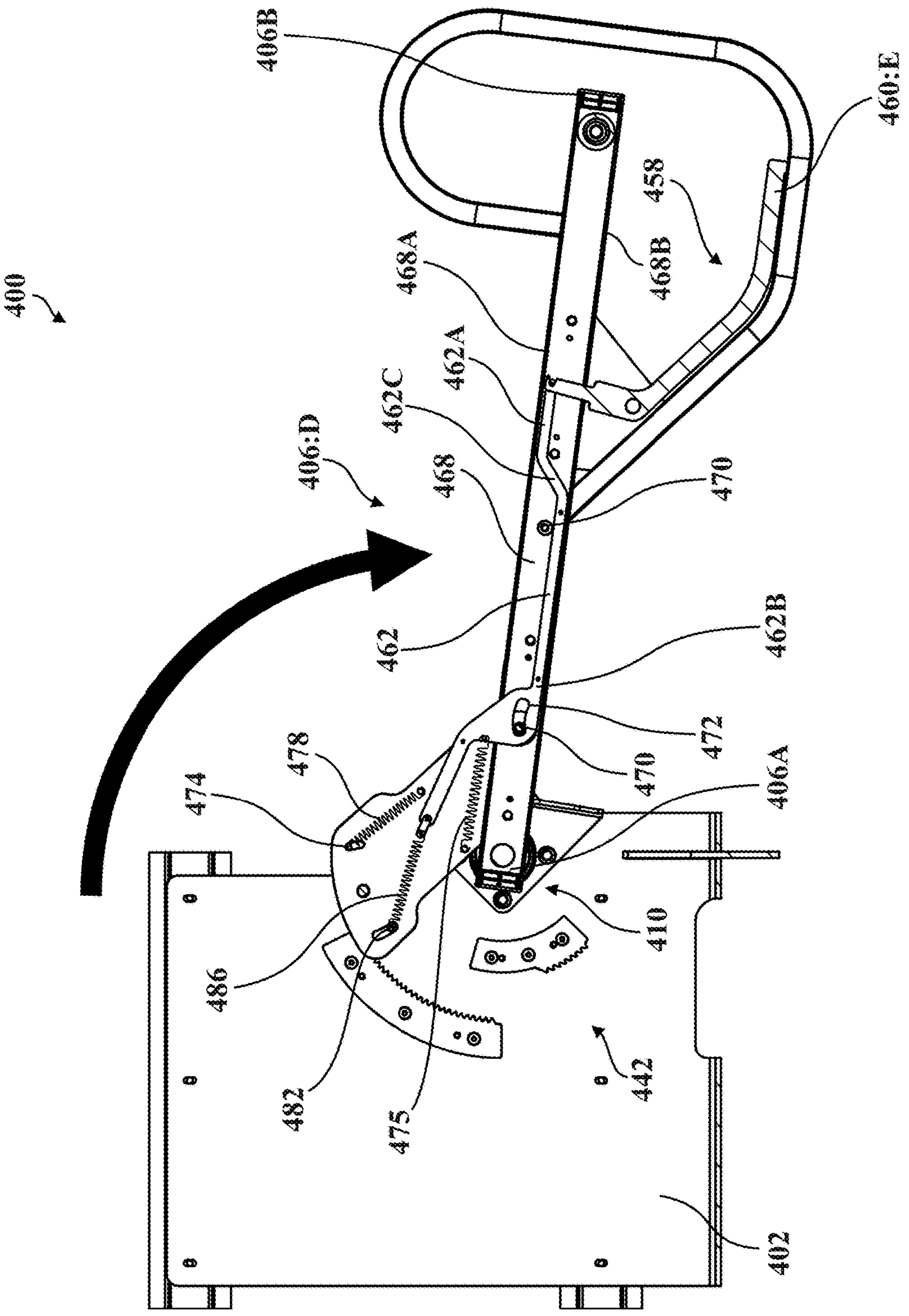
FIG. 17C is a cross-sectional representation taken though the first arm in the deployed state to reveal the linkage and the release handle in the engaged state.
Figure 17D:
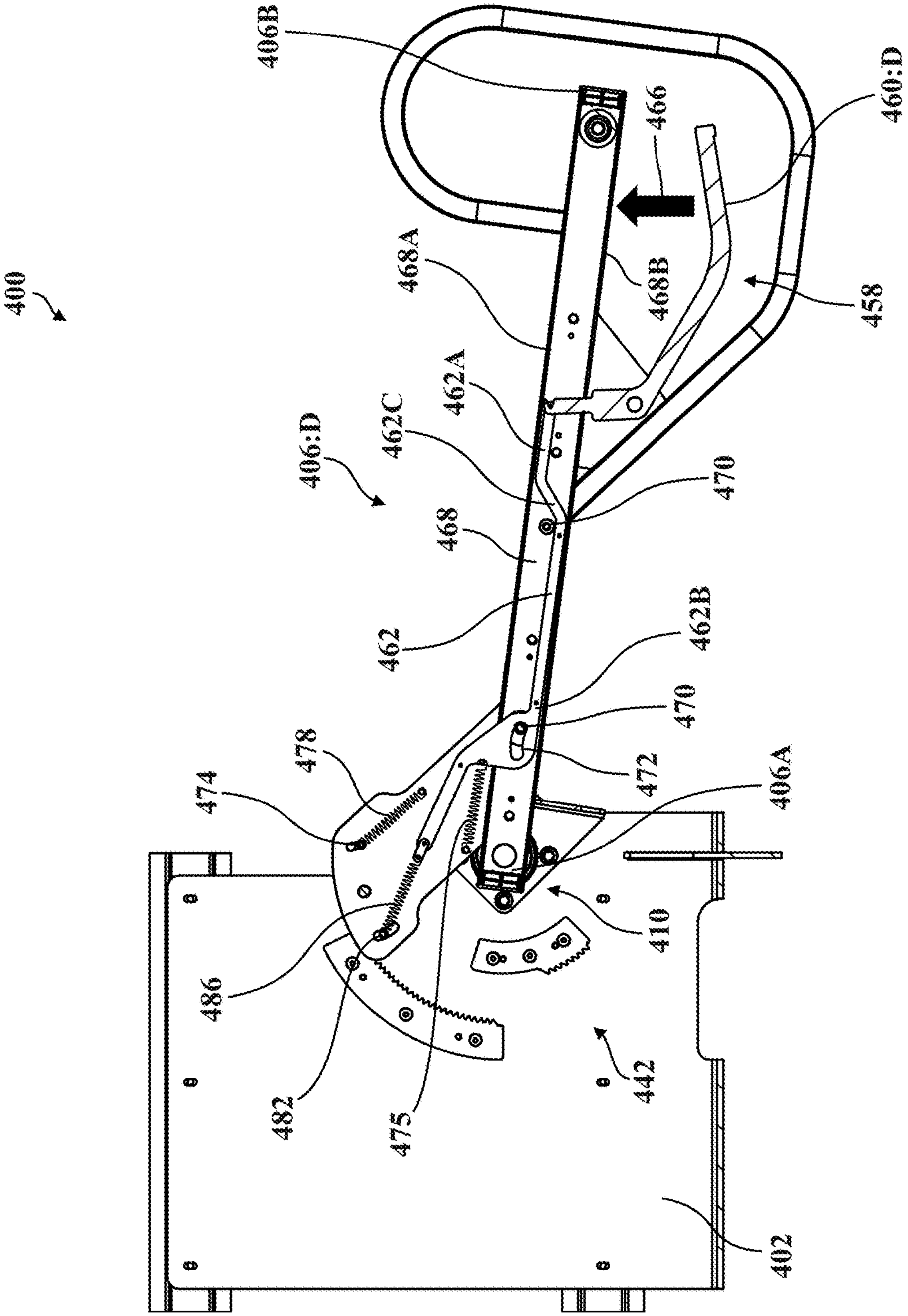
FIG. 17D is a cross-sectional representation taken though the first arm in the deployed state to reveal the linkage and the release handle in the disengaged state.

The sequence between FIGS. 17A and 18D illustrate operation of the release mechanism 458. FIGS. 17A and 18A show the first arm 406 in the stowed state 406S and the release handle 460 in the disengaged position 460D (FIG. 17A) such that the pawl 444 in the locked state 444L and the first pawl tooth 450 is engaged with the first plurality of teeth 454 (FIG. 18B). Referring next to FIGS. 17B and 18B, in response to user engagement with the release handle 460 (indicated with arrow 464) to move the release handle 460 from the disengaged position 460D to the engaged position 460E (FIG. 17B), the linkage 462 moves the pawl 444 from the locked state 444L to the unlocked state 444U such that the first pawl tooth 450 is spaced from the first plurality of teeth 454 (FIG. 18B). Accordingly, referring to FIGS. 17C and 18C, with the pawl 444 in the unlocked state 444U, the first arm 406 is free to move between the stowed state 406S and the deployed state 406D. Referring to FIGS. 17D and 18D, where the first arm 406 has been moved to the deployed state 406D, the user may release engagement with the release handle 460 (indicated with arrow 466) such that the release handle 460 moves from the engaged position 460E to the disengaged state 406D (FIG. 17D). As a result, the linkage 462 moves the pawl 444 from the unlocked state 444U to the locked state 444L such that the second pawl tooth 452 is engaged with the second plurality of teeth 456 (FIG. 18B) to retain the first arm 406 in the deployed state 406D. Of course, it should be appreciated that this sequence may be executed in reverse order to move the first arm 406 from the deployed state 406D to the stowed state 406S.

A variety of configurations for the linkage 462 are contemplated. For example, the linkage 462 may be disposed outside of the first arm 406 for movement relative to the first arm 406. In some versions, however, such as illustrated in the Figures, the first arm 406 may define a linkage void 468 configured to house the linkage 462 within the first arm 406. In these examples, the first arm 406 may include one or more rollers 470 disposed within the linkage void 468 and arranged to support the linkage 462 for movement relative to the first arm 406. The linkage 462 may also be shaped to move within the linkage void 468. In some examples, the linkage void 468 defines a first wall 468A arranged on one side of the mounting axis 404 and a second wall 468B, spaced from the first wall 468A and arranged on the other side of the mounting axis 404. Here, the linkage 462 may include a first portion (e.g., the first end portion 462A) arranged adjacent to the first wall 468A and a second portion (e.g., the second end portion 462B) arranged adjacent to the second wall 468B and a bent portion 462C between the first end portion 462A and the second end portion 462B. By arranging the first end portion 462A adjacent to the first wall 468A, the moment arm and travel of the release handle 460 when moving the linkage 462 is advantageously increased. In some examples, the second end portion 462B may also define a slot 472 defining an arc. In these examples, one of the one or more rollers 470 may be engaged with the slot 472 such that the slot 472 guides movement of the linkage 462 relative to the first arm 406.

Figure 14:
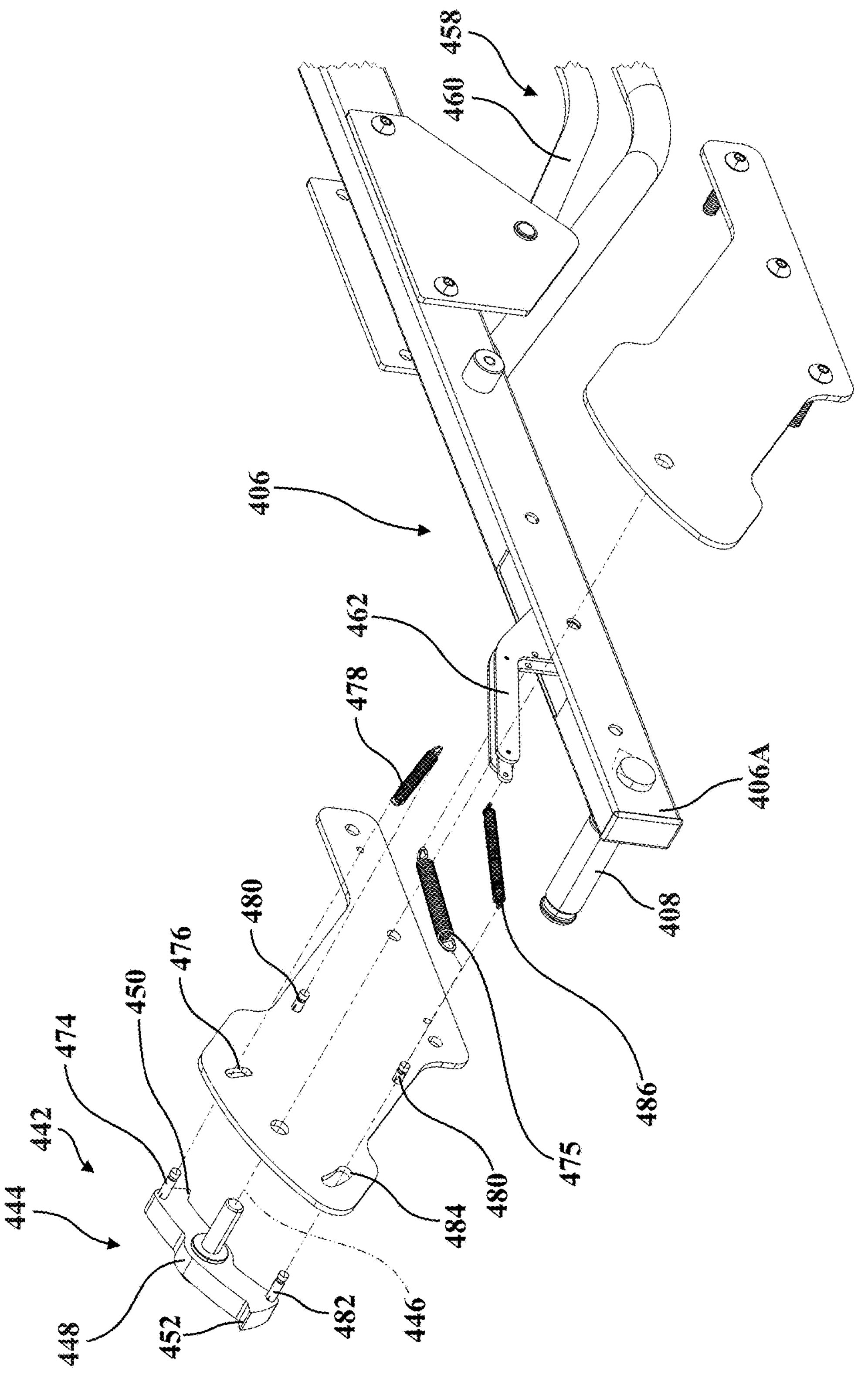
FIG. 14 is an enlarged exploded view of the first arm and a pawl of the loading system.
Figure 15:
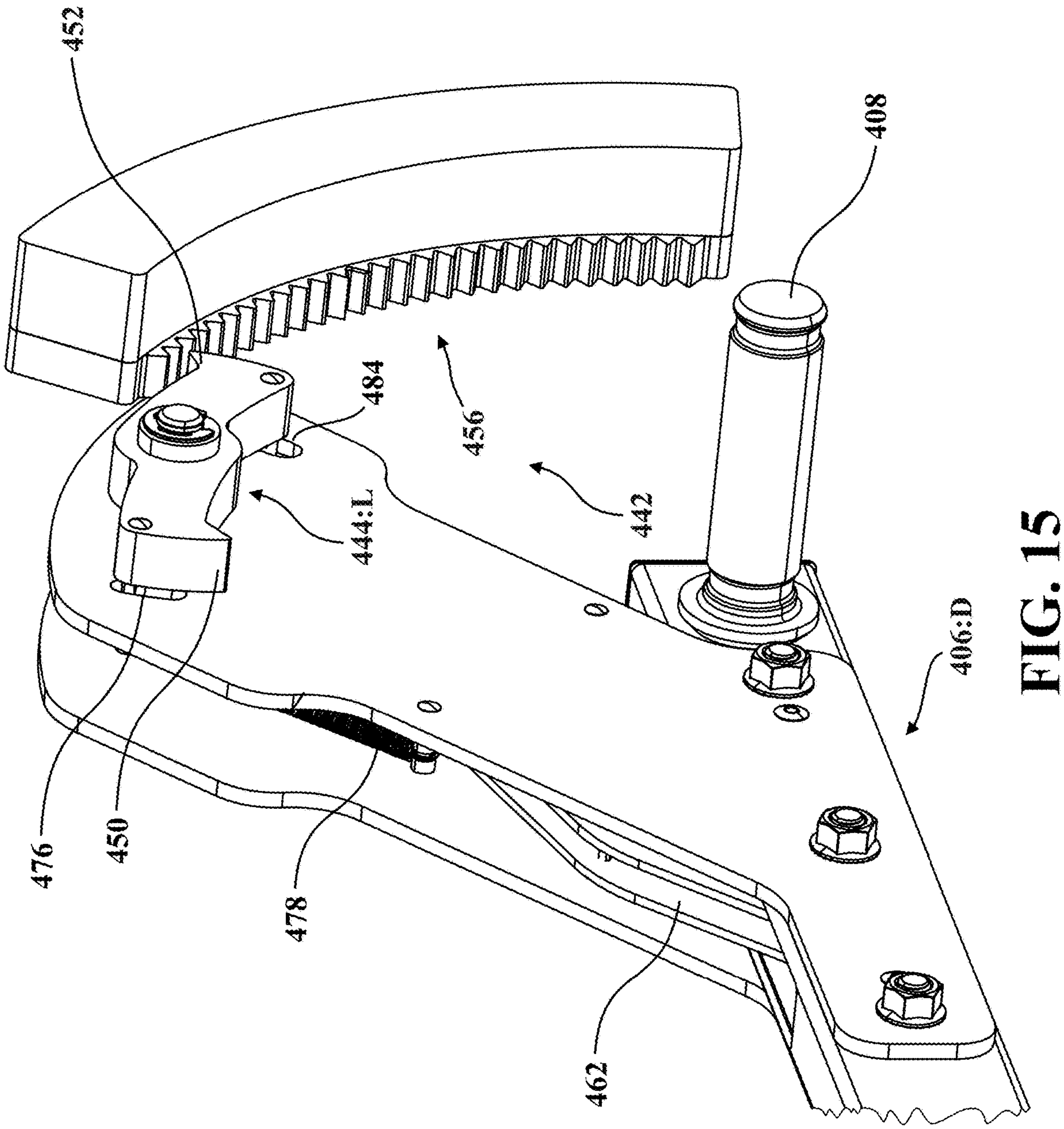
FIG. 15 is a perspective view of loading system with components hidden to reveal the ratchet assembly.

As best shown in FIGS. 17A through 17D, first arm 406 may further include a first biasing member 475 operatively attached to the linkage 462 (e.g., the second end portion 462B) to urge the linkage 462 toward the mounting axis 404 to bias the release handle 460 toward the disengaged position 460D. Additionally, as best shown in FIG. 14, the pawl 444 may include a first pawl projection 474 spaced from the pawl axis 446. The first pawl projection 474 may be disposed within a first constraining slot 476 defined by the first arm 406 to delimit rotation of the pawl 444 about the pawl axis 446. Furthermore, the first arm 406 may also further include a second biasing member 478. The second biasing member 478 may be operatively attached to the first pawl projection 474 at one end and operatively attached to the first arm 406 (e.g., attached to a stud 480 coupled to the first arm 406) at an opposing end such that the second biasing member 478 urges the pawl 444 toward the locked state 444L. In other words, the second biasing member 478 urges the pawl 444 in the first direction D1 about the pawl axis 446.

The pawl 444 may further include a second pawl projection 482 spaced from the pawl axis 446 and arranged opposite the first pawl projection 474. The second pawl projection 482 may be disposed within a second constraining slot 484 defined by the first arm 406. The second end portion 462B of the linkage 462 may be operatively attached to the second pawl projection 482 to move the pawl 444 from the locked state 444L to the unlocked state 444U in response to the release handle 460 moving from the disengaged position 460D to the engaged position 460E. In some versions, as best shown in the sequence between FIGS. 17A and 17B, the release mechanism 458 further includes a spring 486 interposed between the second pawl projection 482 and the second end portion 462B of the linkage 462 to allow relative movement between the second pawl projection 482 and the second end portion 462B of the linkage 462. The spring 486 may also urge the pawl 444 in the second direction D2, opposite the first direction D1, about the pawl axis 446.

Advantageously, allowing relative movement between the pawl 444 and the linkage 462 allows the pawl to move along the first and/or second plurality of teeth without the release handle 460 moving between the disengaged position 460D and the engaged position 460E with every engagement of the pawl 444 with the first and/or second plurality of teeth. Furthermore, the spring 486 may allow relative movement between the second pawl projection 482 and the second end portion 462B of the linkage 462 where an engagement torque experienced by the pawl 444 about the pawl axis 446 exceeds a threshold value. In other words, if the pawl 444 is experiencing significant torque about the pawl axis 446 due to engagement with first and/or second plurality of teeth, the spring 486 will not allow the pawl 444 to move from the locked state 444L to the unlocked state 444U until a user supports the first arm 406 adequately, thereby preventing harsh unintended movement of the first arm 406.

Figure 13:
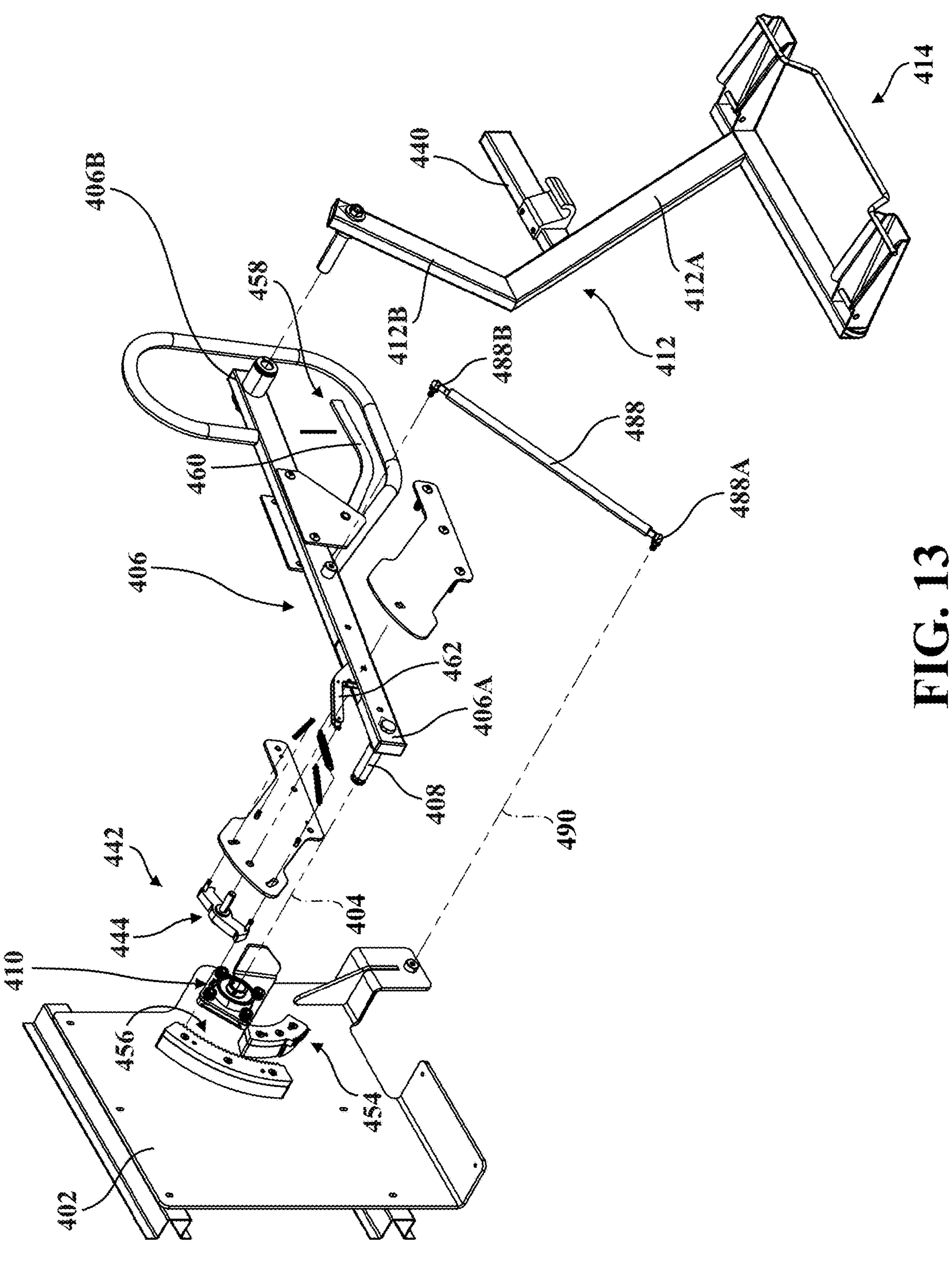
FIG. 13 is an exploded view of the loading system.
Figure 16A:
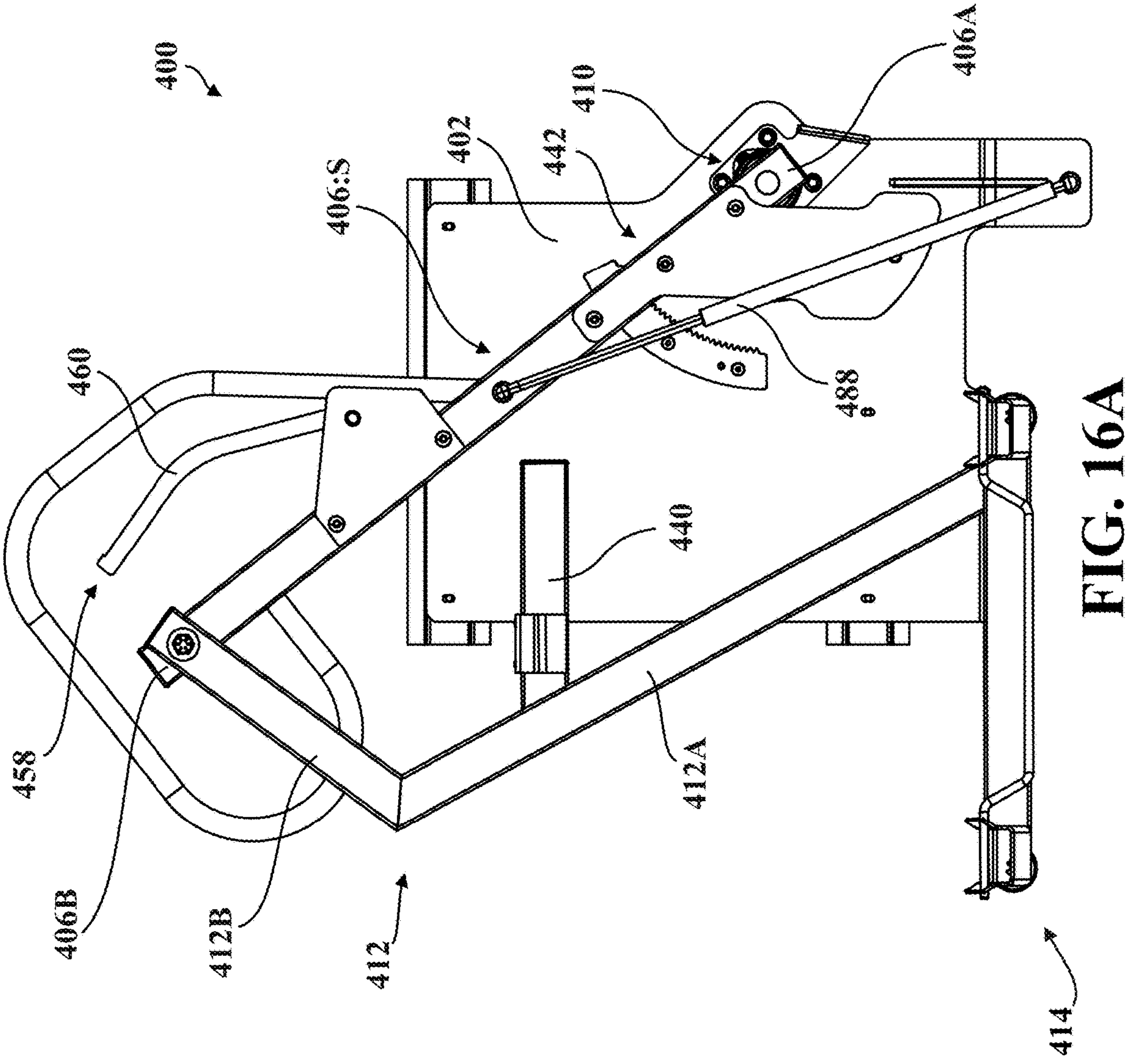
FIG. 16A is a front view of the loading system with the first arm in the stowed state.
Figure 16B:
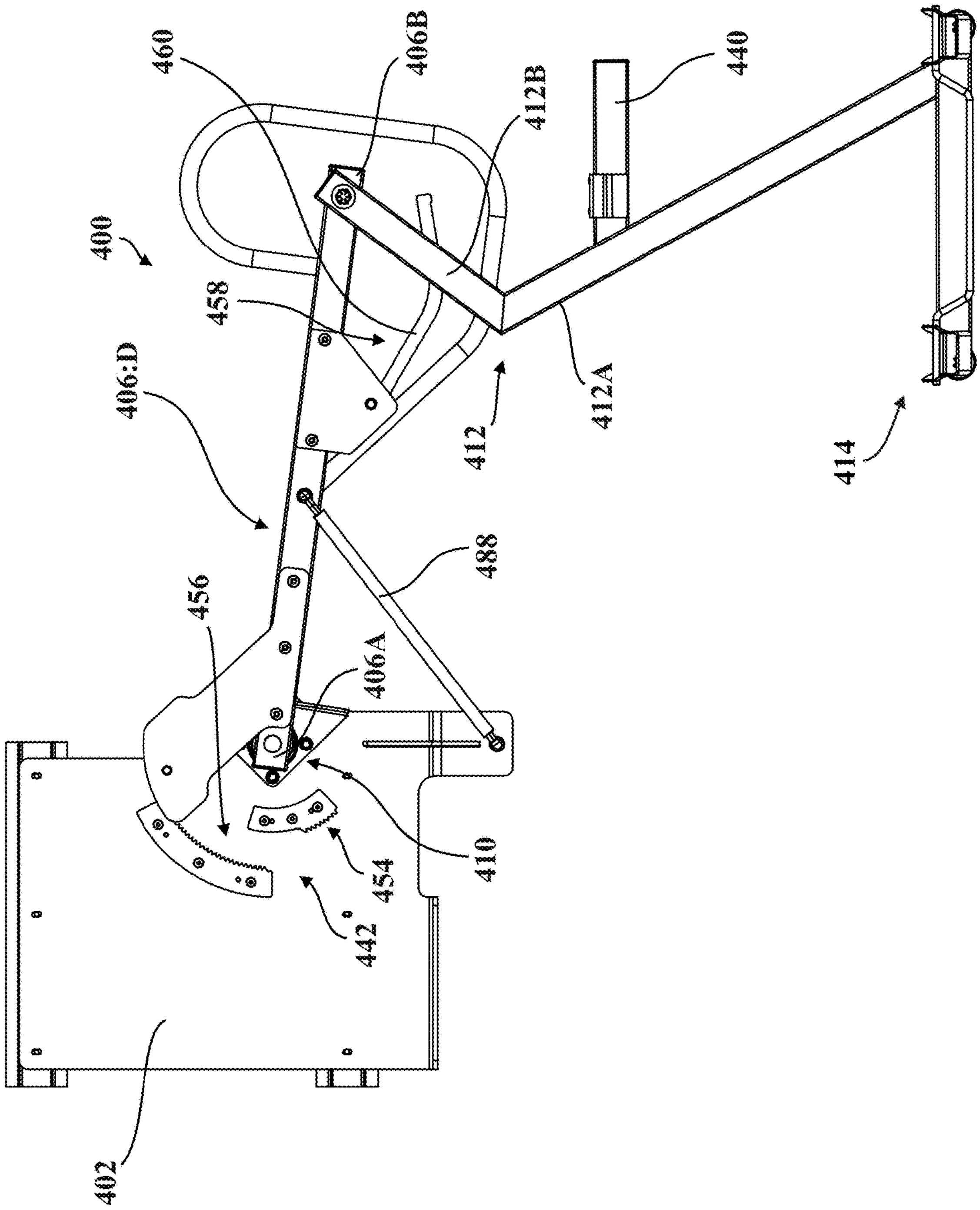
FIG. 16B is a front view of the loading with the first arm in the deployed state.

As best shown in FIGS. 13, 16A and 16B, in some versions, the loading system 400 also includes a damper 488. The damper 488 may extend between a pivot end 488A operatively attached to the brace 402 and an attachment end 488B operatively attached to the first arm 406. The damper 488 serves to control (i.e., slow) motion of the first arm 406 between the stowed state 406S and the deployed state 406D such that the first arm 406 does not harshly drop. In some configurations, the pivot end 488A of the damper 488 may be disposed for rotation about a pivot axis 490 that is spaced from the mounting axis 404 of the brace 402. For example, in the illustrated configuration, the pivot axis 490 is spaced below the mounting axis 404, but other arrangements are contemplated. In some versions, the damper 488 may be biased to urge the first arm 406 into an upright state (e.g., where the first arm 406 is arranged vertically) between the stowed state 406S and the deployed state 406D. In these examples, the damper 488 may be further defined as a gas spring or the like. Particularly, the gas spring may be in an extended position where the first arm 406 is in the upright state and may be arranged to be compressed (i.e., shortened) from the extended position where the first arm 406 moves away from the upright state toward either of the stowed state 406S (shown in FIG. 16A) or the deployed state 406D (shown in FIG. 16B).

Figure 24:
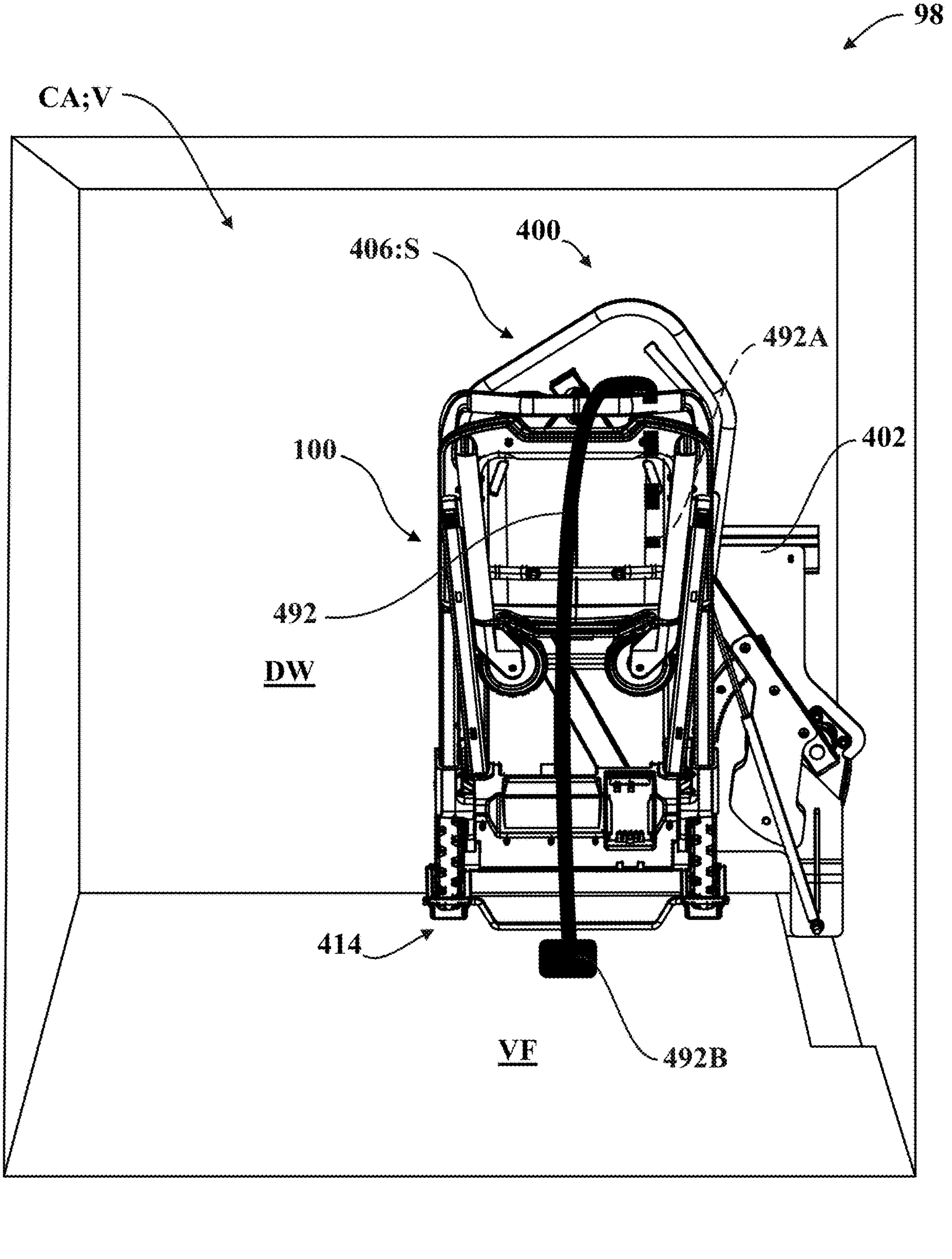
FIG. 24 is a perspective view of the loading system within a cargo area of the vehicle with the first arm in the stowed state and further including a harness for limiting movement of the patient transport apparatus within the cargo area of the vehicle.

Referring lastly to FIG. 24, in some versions, the loading system may include a harness 492. The harness 492 may be operatively attached to the brace 402 and arranged to engage the patient transport apparatus 100 where the first arm 406 is in the stowed state 406S to limit movement of the patient transport apparatus 100 within the cargo area CA of the vehicle V. The harness 492 may extend between a first portion 492A coupled to the brace 402 (illustrated in phantom in FIG. 24) and a second portion 492B configured to be coupled to a vehicle floor VF of the vehicle V. It is also contemplated that the first portion 492A of the harness 492 may also be operatively attached to the cargo area CA of the vehicle V, such as the divider wall DW. A variety of configurations for the harness 492 are contemplated. For example, the harness 492 may be comprised of webbing or the like, and may include a buckle or a ratchet strap mechanism for pulling the harness 492 tight to limit movement of the patient transport apparatus 100 within the cargo area CA of the vehicle V.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A loading system for loading and unloading a patient transport apparatus from a cargo area of a vehicle, the loading system comprising:
- a brace defining a mounting axis, the brace configured to be mounted to the cargo area of the vehicle;
- a first arm supported for rotation relative to the mounting axis between a stowed state and a deployed state;
- a second arm coupled to the first arm for pivotal movement relative to the first arm;
- a receptacle coupled to the second arm, the receptacle configured to receive and support the patient transport apparatus for movement relative to the cargo area of the vehicle as the first arm moves between the stowed state and the deployed state; and
- a ratchet assembly interposed between the brace and the first arm to selectively permit motion of the first arm between the stowed state and the deployed state, the ratchet assembly including:
  - a pawl supported for pivotal movement about a pawl axis between a locked state and an unlocked state, the pawl including a pawl body, a first pawl tooth extending from the pawl body in a first direction, and a second pawl tooth spaced from the first pawl tooth and extending from the pawl body in a second direction, opposite the first direction;
  - a first plurality of teeth arranged for engagement with the first pawl tooth where the pawl is in the locked state and the first arm is in the stowed state to retain the first arm in the stowed state; and
  - a second plurality of teeth spaced from the first plurality of teeth and arranged for engagement with the second pawl tooth where the pawl is in the locked state and the first arm is in the deployed state to retain the first arm in the deployed state.

II. The loading system according to clause I, further comprising a release mechanism operatively attached to the pawl to move the pawl from the locked state to the unlocked state in response to user engagement to permit movement of the first arm between the stowed state and the deployed state.

III. The loading system according to clause II, wherein the release mechanism includes:
- a release handle supported for pivotal movement relative to the first arm between an engaged position and a disengaged position; and
- a linkage supported for movement relative to the first arm and extending between a first end portion operatively attached to the release handle and a second end portion operatively attached to the pawl to move the pawl from the locked state to the unlocked state in response to the release handle moving from the disengaged position to the engaged position.

IV. The loading system according to clause III, wherein the first arm defines a linkage void and further includes one or more rollers disposed within the linkage void and arranged to support the linkage for movement relative to the first arm.

V. The loading system according to clause IV, wherein the linkage void defines a first wall arranged on one side of the mounting axis and a second wall, spaced from the first wall and arranged on the other side of the mounting axis, and wherein the linkage includes a first portion arranged adjacent to the first wall and a second portion arranged adjacent to the second wall and a bent portion between the first portion and the second portion.

VI. The loading system according to clause V, wherein the first portion of the linkage defines a slot defining an arc, and wherein the slot engages one of the one or more rollers to support the linkage for movement relative to the first arm.

VII. The loading system according to any of clauses IV-VI, wherein the first arm further includes a first biasing member operatively attached to the linkage to urge the linkage toward the mounting axis to bias the release handle toward the disengaged position.

VIII. The loading system according to any of clauses III-VII, wherein the pawl is supported for pivotal movement about the pawl axis by the first arm.

IX. The loading system according to clause VIII, wherein the pawl includes a first pawl projection spaced from the pawl axis, the first pawl projection disposed within a first constraining slot defined by the first arm.

X. The loading system according to clause IX, wherein the first arm includes a second biasing member operatively attached to the first pawl projection to urge the pawl toward the locked state.

XI. The loading system according to clause X, wherein the pawl includes a second pawl projection spaced from the pawl axis and arranged opposite the first pawl projection, the second pawl projection disposed within a second constraining slot defined by the first arm.

XII. The loading system according to clause XI, wherein the second end portion of the linkage is operatively attached to the second pawl projection to move the pawl from the locked state to the unlocked state in response to the release handle moving from the disengaged position to the engaged position.

XIII. The loading system according to clause XII, wherein the release mechanism further includes a spring interposed between the second pawl projection and the second end portion of the linkage to allow relative movement between the second pawl projection and the second end portion of the linkage.

XIV. The loading system according to clause XIII, wherein the spring allows relative movement between the second pawl projection and the second end portion of the linkage where an engagement torque experienced by the pawl about the pawl axis exceeds a threshold value.

XV. The loading system according to clause XIV, wherein the second biasing member urges the pawl in a first direction about the pawl axis and the spring urges the pawl in a second direction, opposite the first direction, about the pawl axis.

XVI. The loading system according to any of clauses I-XV, further comprising a damper extending between a pivot end operatively attached to the brace and an attachment end operatively attached to the first arm.

XVII. The loading system according to clause XVI, wherein the pivot end of the damper is disposed for rotation about a pivot axis spaced from the mounting axis.

XVIII. The loading system according to any of clauses XVI-XVII, wherein the damper is biased to urge the first arm to an upright state between the stowed state and the deployed state.

XIX. The loading system according to clause XVIII, wherein the damper is further defined as a gas spring.

XX. The loading system according to clause XIX, wherein the gas spring is in an extended position where the first arm is in the upright state, and wherein the gas spring is arranged to be compressed from the extended position where the first arm moves away from the upright state toward either of the stowed state and the deployed state.

XXI. The loading system according to any of clauses I-XX, wherein the first arm extends between a bottom end portion operatively attached to the brace and a top end portion operatively attached to the second arm.

XXII. The loading system according to clause XXI, wherein the bottom end portion defines a bottom projection operatively attached to the brace and supporting the first arm for rotation about the mounting axis.

XXIII. The loading system according to clause XXII, further comprising a bearing assembly interposed between the brace and the bottom projection of the first arm, the bearing assembly shaped to receive the bottom projection of the first arm to support the first arm for rotation about the mounting axis.

XXIV. The loading system according to any of clauses XXI-XXIII, further comprising a friction member interposed between the top end portion of the first arm and the second arm to at least partially inhibit rotation of the second arm relative to the top end portion of the first arm.

XXV. The loading system according to any of clauses XXI-XXIV, wherein the second arm includes a connection portion extending from the receptacle at an acute angle to define an access area sized to permit user engagement with a user interface of the patient transport apparatus, and an intermediate portion extending between the connection portion and the top end portion of the first arm.

XXVI. The loading system according to clause XXV, wherein the second arm further includes a support projection arranged to abut the patient transport apparatus to align the patient transport apparatus with the receptacle.

XXVII. The loading system according to any of clauses I-XXVI, wherein the pawl is supported for movement about the pawl axis by the first arm.

XXVIII. The loading system according to clause XXVII, wherein the first plurality of teeth and the second plurality of teeth are each operatively attached to the brace.

XXIX. The loading system according to clause XXVIII, wherein the first pawl tooth extends toward the mounting axis, and wherein the first plurality of teeth extend away from the mounting axis.

XXX. The loading system according to clause XXIX, wherein the second pawl tooth extends away from the mounting axis, and wherein the second plurality of teeth extend toward the mounting axis.

XXXI. The loading system according to any of clauses I-XXX, wherein the receptacle includes a base member extending between a first end and a second end, a first wheel tray operatively attached to the first end of the base member, and a second wheel tray operatively attached to the second end of the base member, wherein the first wheel tray and the second wheel tray are each arranged to receive a respective wheel of the patient transport apparatus and support the patient transport apparatus for movement relative to the cargo area of the vehicle as the first arm moves between the stowed state and the deployed state.

XXXII. The loading system according to clause XXXI, wherein each of the first wheel tray and the second wheel tray include lateral walls to constrain lateral movement of the respective wheels of the patient transport apparatus.

XXXIII. The loading system according to any of clauses XXXI-XXXII, wherein each of the first wheel tray and the second wheel tray include a tapered floor portion angled toward the base member to constrain fore and aft movement of the respective wheels of the patient transport apparatus.

XXXIV. The loading system according to any of clauses XXXI-XXXIII, wherein the receptacle further includes a first wheel chock member coupled to the first wheel tray to constrain the respective wheel of the patient transport apparatus relative to the first wheel tray.

XXXV. The loading system according to clause XXXIV, wherein the receptacle further includes a second wheel chock member coupled to the second wheel tray to constrain the respective wheel of the patient transport apparatus relative to the second wheel tray.

XXXVI. The loading system according to clause XXXV, wherein the receptacle further includes a step member extending between the first wheel chock member and the second wheel chock member, the step member arranged to be stepped on by a user to inhibit movement of the receptacle relative to a floor surface where the first arm is in the deployed state.

XXXVII. The loading system according to any of clauses I-XXXVI, further comprising a harness operatively attached to the brace and arranged to engage the patient transport apparatus where the first arm is in the stowed state to limit movement of the patient transport apparatus within the cargo area of the vehicle.

XXXVIII. The loading system according to clause XXXVII, wherein the harness extends between a first portion coupled to the brace and a second portion configured to be coupled to a floor of the vehicle.

XXXIX. A patient transport system comprising:

- a patient transport apparatus operable by a user for transporting a patient along stairs, the patient transport apparatus including:
  - a support structure;
  - a seat section coupled to the support structure for supporting the patient; and
  - a track assembly having a movable belt, the track assembly being operatively attached to the support structure and arranged for selective operation between a retracted position disposed adjacent to the support structure and a deployed position extending to engage stairs; and
- a loading system for loading and unloading the patient transport apparatus from a cargo area of a vehicle, the loading system including:
  - a brace defining a mounting axis, the brace configured to be mounted to the cargo area of the vehicle;
  - a first arm supported for rotation relative to the mounting axis between a stowed state and a deployed state;

a second arm coupled to the first arm for pivotal movement relative to the first arm;

a receptacle coupled to the second arm, the receptacle configured to receive and support the patient transport apparatus for movement relative to the cargo area of the vehicle as the first arm moves between the stowed state and the deployed state; and a ratchet assembly interposed between the brace and the first arm to selectively permit motion of the first arm between the stowed state and the deployed state.

XL. The patient transport system according to clause XXXIX, wherein the patient transport apparatus is operable between:

a stair configuration where the track assembly is in the deployed position for supporting the patient transport apparatus for movement along stairs and the seat section is arranged to support the patient, a chair configuration where the track assembly is in the retracted position and the seat section is arranged to support the patient, and a stowed configuration where the track assembly is in the retracted position and the seat section is folded upwards for storage; and wherein the receptacle is configured to receive and support the patient transport apparatus in either the chair configuration or the stowed configuration.

XLI. The patient transport system according to any of clauses XXXIX-XL, wherein the patient transport apparatus further comprises a drive system comprising a motor disposed in rotational communication with the belt of the track assembly to control movement of the patient transport apparatus along stairs when the track assembly operates in the deployed position.

XLII. The patient transport system of clause XLI, wherein the patient transport apparatus further comprises a user interface arranged for engagement by a user to selectively adjust operation of the drive system between an active state for controlling movement of the belt with the motor, and an inactive state.

XLIII. The patient transport system according to clause XLII, wherein the first arm extends between a bottom end portion operatively attached to the brace and a top end portion operatively attached to the second arm, and wherein the second arm includes a connection portion extending from the receptacle at an acute angle to define an access area sized to permit user engagement with the user interface of the patient transport apparatus, and an intermediate portion extending between the connection portion and the top end portion of the first arm.

XLIV. The patient transport system according to any of clauses XXXIX-XLIII, wherein the ratchet assembly of the loading system further comprises:

a pawl supported for pivotal movement about a pawl axis between a locked state and an unlocked state, the pawl including a pawl body, a first pawl tooth extending from the pawl body in a first direction, and a second pawl tooth spaced from the first pawl tooth and extending from the pawl body in a second direction, opposite the first direction;

a first plurality of teeth arranged for engagement with the first pawl tooth where the pawl is in the locked state and the first arm is in the stowed state to retain the first arm in the stowed state; and a second plurality of teeth spaced from the first plurality of teeth and arranged for engagement with the second pawl tooth where the pawl is in the locked state and the first arm is in the deployed state to retain the first arm in the deployed state.

XLV. The patient transport system according to clause XLIV, further comprising a release mechanism operatively attached to the pawl to move the pawl from the locked state to the unlocked state in response to user engagement to permit movement of the first arm between the stowed state and the deployed state.

XLVI. The patient transport system according to clause XLV, wherein the release mechanism includes:

a release handle supported for pivotal movement relative to the first arm between an engaged position and a disengaged position; and a linkage supported for movement relative to the first arm and extending between a first end portion operatively attached to the release handle and a second end portion operatively attached to the pawl to move the pawl from the locked state to the unlocked state in response to the release handle moving from the disengaged position to the engaged position.

XLVII. The patient transport system according to clause XLVI, wherein the first arm defines a linkage void and further includes one or more rollers disposed within the linkage void and arranged to support the linkage for movement relative to the first arm.

XLVIII. The patient transport system according to clause XLVII, wherein the linkage void defines a first wall arranged on one side of the mounting axis and a second wall, spaced from the first wall and arranged on the other side of the mounting axis, and wherein the linkage includes a first portion arranged adjacent to the first wall and a second portion arranged adjacent to the second wall and a bent portion between the first portion and the second portion.

XLIX. The patient transport system according to clause XLVIII, wherein the first portion of the linkage defines a slot defining an arc, and wherein the slot engages one of the one or more rollers to support the linkage for movement relative to the first arm.

L. The patient transport system according to any of clauses XLVI-XLIX wherein the first arm further includes a first biasing member operatively attached to the linkage to urge the linkage toward the mounting axis to bias the release handle toward the disengaged position.

LI. The patient transport system according to any of clauses XLVI-L, wherein the pawl is supported for pivotal movement about the pawl axis by the first arm.

LII. The patient transport system according to clause LI, wherein the pawl includes a first pawl projection spaced from the pawl axis, the first pawl projection disposed within a first constraining slot defined by the first arm.

LIII. The patient transport system according to clause LII, wherein the first arm includes a second biasing member operatively attached to the first pawl projection to urge the pawl toward the locked state.

LIV. The patient transport system according to clause LIII, wherein the pawl includes a second pawl projection spaced from the pawl axis and arranged opposite the first pawl projection, the second pawl projection disposed within a second constraining slot defined by the first arm.

LV. The patient transport system according to clause LIV, wherein the second end portion of the linkage is operatively attached to the second pawl projection to move the pawl from the locked state to the unlocked state in response to the release handle moving from the disengaged position to the engaged position.

LVI. The patient transport system according to clause LV, wherein the release mechanism further includes a spring interposed between the second pawl projection and the second end portion of the linkage to allow relative movement between the second pawl projection and the second end portion of the linkage.

LVII. The patient transport system according to clause LVI, wherein the spring allows relative movement between the second pawl projection and the second end portion of the linkage where an engagement torque experienced by the pawl about the pawl axis exceeds a threshold value.

LVIII. The patient transport system according to clause LVII, wherein the second biasing member urges the pawl in a first direction about the pawl axis and the spring urges the pawl in a second direction, opposite the first direction, about the pawl axis.

LIX. The patient transport system according to any of clauses XXXIX-LVIII, further comprising a damper extending between a pivot end operatively attached to the brace and an attachment end operatively attached to the first arm.

LX. The patient transport system according to clause LIX, wherein the pivot end of the damper is disposed for rotation about a pivot axis spaced from the mounting axis.

LXI. The patient transport system according to any of clauses LIX-LX, wherein the damper is biased to urge the first arm to an upright state between the stowed state and the deployed state.

LXII. The patient transport system according to clause LXI, wherein the damper is further defined as a gas spring.

LXIII. The patient transport system according to clause LXII, wherein the gas spring is in an extended position where the first arm is in the upright state, and wherein the gas spring is arranged to be compressed from the extended position where the first arm moves away from the upright state toward either of the stowed state and the deployed state.

LXIV. The patient transport system according to any of clauses XXXIX-LXIV, wherein the first arm extends between a bottom end portion operatively attached to the brace and a top end portion operatively attached to the second arm.

LXV. The patient transport system according to clause LXIV, wherein the bottom end portion defines a bottom projection operatively attached to the brace and supporting the first arm for rotation about the mounting axis.

LXVI. The patient transport system according to clause LXV, further comprising a bearing assembly interposed between the brace and the bottom projection of the first arm, the bearing assembly shaped to receive the bottom projection of the first arm to support the first arm for rotation about the mounting axis.

LXVII. The patient transport system according to any of clauses LXIV-LXVI, further comprising a friction member interposed between the top end portion of the first arm and the second arm to at least partially inhibit rotation of the second arm relative to the top end portion of the first arm.

LXVIII. The patient transport system according to clause LXVII, wherein the second arm further includes a support projection arranged to abut the patient transport apparatus to align the patient transport apparatus with the receptacle.

LXIX. The patient transport system according to any of clauses XLIV-LXVIII, wherein the pawl is supported for movement about the pawl axis by the first arm.

LXX. The patient transport system according to clause LXIX, wherein the first plurality of teeth and the second plurality of teeth are each operatively attached to the brace.

LXXI. The patient transport system according to clause LXX, wherein the first pawl tooth extends toward the mounting axis, and wherein the first plurality of teeth extend away from the mounting axis.

LXXII. The patient transport system according to clause LXXI, wherein the second pawl tooth extends away from the mounting axis, and wherein the second plurality of teeth extend toward the mounting axis.

LXXIII. The patient transport system according to clause LXXII, wherein the receptacle includes a base member extending between a first end and a second end, a first wheel tray operatively attached to the first end of the base member, and a second wheel tray operatively attached to the second end of the base member, wherein the first wheel tray and the second wheel tray are arranged to receive a respective wheel of the patient transport apparatus and support the patient transport apparatus for movement relative to the cargo area of the vehicle as the first arm moves between the stowed state and the deployed state.

LXXIV. The patient transport system according to clause LXXIII, wherein each of the first wheel tray and the second wheel tray include lateral walls to constrain lateral movement of the respective wheels of the patient transport apparatus.

LXXV. The patient transport system according to any of clauses LXXIII-LXXIV, wherein each of the first wheel tray and the second wheel tray include a tapered floor portion angled toward the base member to constrain fore and aft movement of the respective wheels of the patient transport apparatus.

LXXVI. The patient transport system according to any of clauses LXXIII-LXXV, wherein the receptacle further includes a first wheel chock member coupled to the first wheel tray to constrain the respective wheel of the patient transport apparatus relative to the first wheel tray.

LXXVII. The patient transport system according to clause LXXVI, wherein the receptacle further includes a second wheel chock member coupled to the second wheel tray to constrain the respective wheel of the patient transport apparatus relative to the second wheel tray.

LXXVIII. The patient transport system according to clause LXXVII, wherein the receptacle further includes a step member extending between the first wheel chock member and the second wheel chock member, the step member arranged to be stepped on by a user to inhibit movement of the receptacle relative to a floor surface where the first arm is in the deployed state.

LXXIX. The patient transport system according to any of clauses XXXIX-LXXVIII, further comprising a harness operatively attached to the brace and arranged to engage the patient transport apparatus where the first arm is in the stowed state to limit movement of the patient transport apparatus within the cargo area of the vehicle.

LXXX. The patient transport system according to clause LXXIX, wherein the harness extends between a first portion coupled to the brace and a second portion configured to be coupled to a floor of the vehicle.

LXXXI. A loading system according to clause XXXIX.

What is claimed is:

1. A patient transport system comprising:
a patient transport apparatus operable by a user for transporting a patient along stairs, the patient transport apparatus including:
a support structure,
a seat section coupled to the support structure for supporting the patient, and
a track assembly having a movable belt, the track assembly being operatively attached to the support structure and arranged for selective operation between a retracted position disposed adjacent to the support structure and a deployed position extending to engage stairs; and
a loading system for loading and unloading the patient transport apparatus from a cargo area of a vehicle, the loading system including:
a brace defining a mounting axis, the brace configured to be mounted to the cargo area of the vehicle,
a first arm supported for rotation relative to the mounting axis between a stowed state and a deployed state,
a second arm coupled to the first arm for pivotal movement relative to the first arm,
a receptacle coupled to the second arm, the receptacle configured to receive and support the patient transport apparatus for movement relative to the cargo area of the vehicle as the first arm moves between the stowed state and the deployed state, and
a ratchet assembly interposed between the brace and the first arm to selectively permit motion of the first arm between the stowed state and the deployed state.

2. The patient transport system according to claim 1, wherein the patient transport apparatus is operable between:
a stair configuration where the track assembly is in the deployed position for supporting the patient transport apparatus for movement along stairs and the seat section is arranged to support the patient,
a chair configuration where the track assembly is in the retracted position and the seat section is arranged to support the patient, and
a stowed configuration where the track assembly is in the retracted position and the seat section is folded upwards for storage; and
wherein the receptacle is configured to receive and support the patient transport apparatus in either the chair configuration or the stowed configuration.

3. The patient transport system according to claim 1, wherein the ratchet assembly of the loading system includes:
a pawl supported for pivotal movement about a pawl axis between a locked state and an unlocked state, the pawl including a pawl body, a first pawl tooth extending from the pawl body in a first direction, and a second pawl tooth spaced from the first pawl tooth and extending from the pawl body in a second direction, opposite the first direction;
a first plurality of teeth arranged for engagement with the first pawl tooth where the pawl is in the locked state and the first arm is in the stowed state to retain the first arm in the stowed state; and
a second plurality of teeth spaced from the first plurality of teeth and arranged for engagement with the second pawl tooth where the pawl is in the locked state and the first arm is in the deployed state to retain the first arm in the deployed state.

4. The patient transport system according to claim 3, further comprising a release mechanism operatively attached to the pawl to move the pawl from the locked state to the unlocked state in response to user engagement to permit movement of the first arm between the stowed state and the deployed state.

5. The patient transport system according to claim 4, wherein the release mechanism includes:
a release handle supported for pivotal movement relative to the first arm between an engaged position and a disengaged position; and
a linkage supported for movement relative to the first arm and extending between a first end portion operatively attached to the release handle and a second end portion operatively attached to the pawl to move the pawl from the locked state to the unlocked state in response to the release handle moving from the disengaged position to the engaged position.

6. The patient transport system according to claim 5, wherein the first arm defines a linkage void and further includes one or more rollers disposed within the linkage void and arranged to support the linkage for movement relative to the first arm.

7. The patient transport system according to claim 6, wherein the linkage void defines a first wall arranged on one side of the mounting axis and a second wall, spaced from the first wall and arranged on the other side of the mounting axis, and
wherein the linkage includes:
a first portion arranged adjacent to the first wall,
a second portion arranged adjacent to the second wall, and
a bent portion between the first portion and the second portion.

8. The patient transport system according to claim 5, wherein the first arm further includes a first biasing member operatively attached to the linkage to urge the linkage toward the mounting axis to bias the release handle toward the disengaged position.

9. The patient transport system according to claim 5, wherein the pawl is supported for pivotal movement about the pawl axis by the first arm; and
wherein the pawl includes:
a first pawl projection spaced from the pawl axis, the first pawl projection disposed within a first constraining slot defined by the first arm, and
a second pawl projection spaced from the pawl axis and arranged opposite the first pawl projection, the second pawl projection disposed within a second constraining slot defined by the first arm.

10. The patient transport system according to claim 9, wherein the first arm includes a second biasing member operatively attached to the first pawl projection to urge the pawl toward the locked state; and
wherein the second end portion of the linkage is operatively attached to the second pawl projection to move the pawl from the locked state to the unlocked state in response to the release handle moving from the disengaged position to the engaged position.

11. The patient transport system according to claim 3, wherein the first plurality of teeth and the second plurality of teeth are each operatively attached to the brace;

wherein the first pawl tooth extends toward the mounting axis, and wherein the first plurality of teeth extend away from the mounting axis; and wherein the second pawl tooth extends away from the mounting axis, and wherein the second plurality of teeth extend toward the mounting axis.

12. The patient transport system according to claim 11, wherein the receptacle includes:

a base member extending between a first end and a second end, a first wheel tray operatively attached to the first end of the base member, and a second wheel tray operatively attached to the second end of the base member; and wherein the first wheel tray and the second wheel tray are arranged to receive a respective wheel of the patient transport apparatus and support the patient transport apparatus for movement relative to the cargo area of the vehicle as the first arm moves between the stowed state and the deployed state.

13. The patient transport system according to claim 12, wherein each of the first wheel tray and the second wheel tray include:

lateral walls to constrain lateral movement of the respective wheels of the patient transport apparatus, and a tapered floor portion angled toward the base member to constrain fore and aft movement of the respective wheels of the patient transport apparatus.

14. The patient transport system according to claim 1, further comprising a harness operatively attached to the brace and arranged to engage the patient transport apparatus where the first arm is in the stowed state to limit movement of the patient transport apparatus within the cargo area of the vehicle.

15. The patient transport system according to claim 1, further comprising a damper extending between a pivot end operatively attached to the brace and an attachment end operatively attached to the first arm;

wherein the pivot end of the damper is disposed for rotation about a pivot axis spaced from the mounting axis; and wherein the damper is biased to urge the first arm to an upright state between the stowed state and the deployed state.

16. The patient transport system according to claim 15, wherein the damper is further defined as a gas spring;

wherein the gas spring is disposed in an extended position where the first arm is in the upright state; and wherein the gas spring is arranged to be compressed from the extended position where the first arm moves away from the upright state toward either of the stowed state and the deployed state.

17. The patient transport system according to claim 1, wherein the first arm extends between a bottom end portion operatively attached to the brace and a top end portion operatively attached to the second arm.

18. The patient transport system according to claim 17, wherein the bottom end portion defines a bottom projection operatively attached to the brace and supporting the first arm for rotation about the mounting axis; and further comprising a bearing assembly interposed between the brace and the bottom projection of the first arm, the bearing assembly shaped to receive the bottom projection of the first arm to support the first arm for rotation about the mounting axis.

19. The patient transport system according to claim 17, further comprising a friction member interposed between the top end portion of the first arm and the second arm to at least partially inhibit rotation of the second arm relative to the top end portion of the first arm.

20. The patient transport system according to claim 19, wherein the second arm further includes a support projection arranged to abut the patient transport apparatus to align the patient transport apparatus with the receptacle.

* * * * *